United States Patent
Shibahara et al.

(10) Patent No.: US 8,179,963 B2
(45) Date of Patent: May 15, 2012

(54) CODING MODE DETERMINING APPARATUS, IMAGE CODING APPARATUS, CODING MODE DETERMINING METHOD AND CODING MODE DETERMINING PROGRAM

(75) Inventors: Youji Shibahara, Sakai (JP); Shinya Kadono, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 1709 days.

(21) Appl. No.: 10/563,357

(22) PCT Filed: Jul. 23, 2004

(86) PCT No.: PCT/JP2004/010903
§ 371 (c)(1),
(2), (4) Date: Jun. 12, 2006

(87) PCT Pub. No.: WO2005/011286
PCT Pub. Date: Feb. 3, 2005

(65) Prior Publication Data
US 2007/0002948 A1 Jan. 4, 2007

(30) Foreign Application Priority Data

Jul. 24, 2003 (JP) .................................. 2003-278698

(51) Int. Cl.
*H04N 7/12* (2006.01)
*H04N 11/02* (2006.01)
*H04N 11/04* (2006.01)
(52) U.S. Cl. .............................. 375/240.12; 375/240.24
(58) Field of Classification Search ............. 375/240.12, 375/240.24
See application file for complete search history.

(56) References Cited

U.S. PATENT DOCUMENTS 5,453,799 A * 9/1995 Yang et al. .................... 348/699
5,719,630 A 2/1998 Senda
5,859,668 A * 1/1999 Aono et al. ............. 375/240.15
(Continued)

FOREIGN PATENT DOCUMENTS

CN 1226782 8/1999
(Continued)

OTHER PUBLICATIONS

"All about MPEG-4", 1$^{st}$ Ed. pp. 37-58 along with partial English translation.

(Continued)

*Primary Examiner* — Christopher S Kelley
*Assistant Examiner* — Chikaodili E Anyikire
(74) *Attorney, Agent, or Firm* — Wenderoth, Lind & Ponack, L.L.P.

(57) ABSTRACT

The invention provides an apparatus enabling a selection of an appropriate coding mod. This apparatus determines one of a plurality of candidate coding modes of an image block. A full-pel prediction step derives a coding cost of each coding mode, based on motion estimation with integer pixel accuracy for small blocks, which are obtained with division methods of each coding mode. A candidate division method selecting step selects a subset of candidate division methods of a plurality of coding modes, based on the coding costs derived by the full-pel prediction). A sub-pel prediction step derives a coding cost of each candidate division method, based on motion estimation with non-integer pixel accuracy for the small blocks obtained with a subset of the subset of candidate division methods. A division method determining step determines a division method of the image block, based on the coding costs derived by the sub-pel prediction.

37 Claims, 32 Drawing Sheets

U.S. PATENT DOCUMENTS

| | | |
|---|---|---|
| 6,353,683 B1 | 3/2002 | Horiike |
| 2002/0136301 A1 | 9/2002 | Yoneyama et al. |
| 2004/0202245 A1 | 10/2004 | Murakami et al. |
| 2005/0018772 A1* | 1/2005 | Sung et al. ............... 375/240.16 |

FOREIGN PATENT DOCUMENTS

| | | |
|---|---|---|
| JP | 07-203452 | 8/1995 |
| JP | 7-250328 | 9/1995 |
| JP | 9-65340 | 3/1997 |
| JP | 11-239352 | 8/1999 |
| JP | 11-243551 | 9/1999 |
| JP | 2000-102016 | 4/2000 |
| JP | 2001-61149 | 3/2001 |
| JP | 2003-174653 | 6/2003 |
| WO | 03/047272 A2 | 6/2003 |

OTHER PUBLICATIONS

Chinese Office Action (along with English language translation) issued Sep. 12, 2008 in the Chinese Application No. 200480021400.5.

* cited by examiner

CODING MODE DETERMINING APPARATUS, IMAGE CODING APPARATUS, CODING MODE DETERMINING METHOD AND CODING MODE DETERMINING PROGRAM

BACKGROUND OF THE INVENTION

1. Field of Invention

The present invention relates to coding mode determining apparatuses, image coding apparatuses, coding mode determining methods and coding mode determining programs.

2. Description of the Related Art

MPEG-4 has garnered attention as a key technology in the multimedia and internet age. MPEG-4 is characterized, for example, in that it has been improved in coding efficiency as compared with MPEG-½ in order to support application areas such as mobile communications and the Internet (see e.g., "All about MPEG-4", 1st Ed., written and edited by Sukeichi Miki, Kogyo Chosakai Publishing Inc., Sep. 30, 1998, p. 37-58).

In MPEG-4, a method called "AVC" has been established as a new highly efficient coding method. AVC is a coding method called "ISO MPEG-4 Part10 Advanced Video Coding" or "ITU-T H.264".

This method is aimed at achieving an improved coding efficiency, for example, by enabling motion estimation or DCT even for image blocks of 4×4 pixels, and selecting the image for motion estimation from a plurality of pictures. Since AVC is a multi-function coding method in which the techniques that have been used for conventional coding methods are adopted, the challenge is to realize its optimal use in accordance with the application areas.

For example, in MPEG-4, which was established prior to the establishment of AVC, there is a relatively small number of combinations of candidate coding modes (e.g., partition size, prediction direction and direct mode) for each macroblock, so that the processing load on the encoder is not large even when these candidates are fully covered and an optimal coding mode is searched for at the time of coding.

On the other hand, with AVC, it is possible to divide a macroblock of 16×16 pixels (hereinafter, referred to as "16× 16") into macroblock partitions (hereinafter, referred to as "small blocks") of 16×16, 16×8, 8×16 and 8×8, as shown in FIG. 25. Also, it is possible to divide a small block of 8×8 pixels into sub-macroblock partitions of 8×8, 8×4, 4×8 and 4×4.

Hereinafter, one small block divided into 16×16 is referred to as a small block Sb1, two small blocks divided into 16×8 as small blocks Sb2 and Sb3, two small blocks divided into 8×16 as small blocks Sb4 and Sb5, and four small blocks divided into 8×8 as small blocks Sb6 to Sb9.

Additionally, with AVC, it is possible to perform motion estimation for each of the small blocks Sb1 to Sb9 by referencing a reference picture, as shown in FIG. 26. The same also applies to each of the sub-macroblock partitions. Furthermore, with AVC, it is possible to perform inter prediction such as forward prediction (see FIG. 27(a)) in which a reference picture that temporally precedes a picture to be coded is referenced, backward prediction (see FIG. 27(b)) in which a reference picture that temporally follows a picture to be coded is referenced, or bi-directional prediction (see FIG. 27(c)) in which reference pictures that are on both sides of a picture to be coded are referenced, as shown in FIG. 27.

<Process of Conventional Encoder>

A process of a conventional encoder in which all the above-described coding modes are covered will be described with reference to FIGS. 28 and 29.

The conventional encoder carries out motion estimation for all of the small blocks obtained by dividing an image block with a plurality of candidate division methods. Furthermore, it selects the reference picture and the division method of the image blocks individually for each of the small blocks, and performs coding using the selected division method.

Here, at the time of selecting the reference picture and the division method for the image block for each of the small blocks, an amount called "coding cost" is used. The coding cost is an amount represented by the sum of the pixel differential value, (the sum of the absolute difference between small blocks and predicted image) and the code amount of motion information (e.g., motion vector or differential motion vector), and a smaller coding cost of each image block indicates a better coding efficiency of the image block. Further, the sum of the squared differences, or the sum of the absolute values of errors after performing Hadamard transform or DCT transform on the difference is sometimes used, instead of the sum of the absolute difference.

FIG. 28 is a block diagram showing a process flow of motion estimation for each of the small blocks. The process shown in FIG. 28 is performed for each of the small blocks of M×N ((M,N)=(16,16), (16,8), (8,16), (8,8)) obtained by dividing an image block of 16×16. The process flow of motion estimation shown in FIG. 28 includes a full-pel prediction step S300, a sub-pel prediction step S301 and a reference direction selecting step S302 for the small blocks.

The full-pel prediction step S300 carries out motion estimation with integer pixel accuracy for the small blocks of M×N using forward prediction and backward prediction (steps S305 and S306). Specifically, motion estimation is performed with integer pixel accuracy within a predetermined search range (e.g., ±32). That is, the motion vectors (hereinafter, referred to as "MV") $0f$ and $MV0b$ that result in the smallest coding cost are detected within a predetermined search range.

The sub-pel prediction step S301 carries out motion estimation with non-integer pixel accuracy for the small blocks of M×N using forward prediction, backward prediction and bi-directional prediction (steps S307 to S309). With the inter prediction of AVC, it is possible to perform motion estimation with non-integer pixel accuracy such as ½ pixel accuracy or ¼ pixel accuracy. Accordingly, a reference picture with non-integer pixel accuracy is generated with a filter, and motion estimation is performed for the generated reference picture.

In the forward prediction step S307, $MV2f$ is detected by a two-phase motion vector search. Specifically, taking $MV0f$, which has been detected in the full-pel prediction step S300, as the center, $MV1f$ (not shown), which results in the smallest coding cost, is determined from 9 points including the surrounding 8 neighboring ½ pixels (or ¼ pixels) and the central $MV0f$. Furthermore, taking $MV1f$ as the center, $MV2f$, which results in the smallest coding cost, is determined from 9 points including the surrounding 8 neighboring ½ pixels (or ¼ pixels) and the central $MV1f$. Further, although it was stated that motion estimation with integer pixel accuracy is carried out in the full-pel prediction, the mode selection method of the present invention can also be applied when pixel culling is performed, for example, when one pixel is culled in the horizontal direction.

In the backward prediction step S308, $MV2b$ is detected from $MV0b$, which has been detected in the full-pel prediction step S300, as in the forward prediction step S307.

Since the bi-directional prediction step S309 references two reference pictures, it involves a large processing amount. Accordingly, prediction is performed using MV2f and MV2b, which have been detected in the forward prediction step S307 and the backward prediction step S308, respectively. Specifically, the average of the reference areas on reference pictures indicated by MV2f and MV2b is used as a predicted image.

Additionally, the coding costs C0, C1 and C2 are derived in the forward prediction step S307, the backward prediction step S308 and the bi-directional prediction step S309, respectively.

The reference direction selecting step S302 selects, as the reference direction of the small blocks, the direction of the coding cost C0 to C2 that has the smallest coding cost, and outputs the smallest coding cost.

FIG. 29 is a block diagram showing a process flow of motion estimation for an image block. The process flow of motion estimation for an image block that is shown in FIG. 29 includes: a motion estimation step S315 of performing motion estimation for each of small blocks of M×N ((M,N)= (16,16), (16,8), (8,16), (8,8)) obtained by dividing an image block of 16×16 using four types of candidate division methods; a coding cost converting step S316 of deriving the coding cost of the image block for each of the candidate division methods, based on a result of the motion estimation for each of the small blocks; and a division method selecting step S317 of selecting the best division method based on the coding cost of the image block derived for each of the candidate division methods.

The motion estimation step S315 includes small block motion estimation steps S320 to S323, which correspond to the process flow of motion estimation for the small blocks that has been described with reference to FIG. 28. Here, in FIG. 29, the process blocks of the small block motion estimation steps S321 to S323 are connected with a plurality of arrows. For example, the process blocks are connected by two arrows in the small block motion estimation step S321 for 16×8. This indicates that each of the processes is carried out on the two small blocks Sb2 and Sb3, which divide an image block of 16×16 into blocks of 16×8. Similarly, the process blocks are connected by two arrows in the small block motion estimation step S322 for 8×16, and the process blocks are connected by four arrows in the small block motion estimation step S323 for 8×8. The contents of the respective processes of the process blocks are the same as those described with reference to FIG. 28, and therefore the description has been omitted here.

The coding cost converting step S316 includes MB cost converting steps S325 to S328. The MB cost converting steps S325 to S328 sum up the coding costs of the respective small blocks that have been output by the small block motion estimation steps S320 to 323 to derive the coding cost of the image block for each of the candidate division methods.

The division method selecting step S317 selects, from the coding costs of the respective candidate division methods that have been derived by the MB cost converting step S325 to S328, the candidate division method showing the smallest coding cost as the division method applied to the image block.

Furthermore, as shown in FIG. 30, a concept called an image block pair 73, consisting of two image blocks 71 and 72, is adopted in AVC, and it is possible to adaptively switch between field prediction and frame prediction for each image block pair 73. For example, in the case of field prediction, motion estimation is performed for each of the field structure blocks 75 and 76. In the case of frame prediction, motion estimation is performed for each of the frame structure blocks 77 and 78.

Further, there are a total of four types of coding modes of the image block pair 73, namely two types of coding picture structures (field and frame) and two types of coding prediction methods (intra and inter predictions). Conventionally, all of these have been taken into consideration, so that there has been the problem of a large processing amount. The processing load has been particularly larger in the case of intra prediction.

Here, a conventional coding mode determination is described. In the codecs prior to AVC, the concept of a MB pair (large block) does not exist and field and frame exist as the types of a MB (middle block). It has been common to cover four types, namely, intra/inter, and field/frame. As shown in FIG. 31, the coding mode determination is made up of a motion estimation step S81 and a picture structure-and-coding prediction method determining step S82. The estimation step S81 includes first to sixth estimation steps S811 to S816. The first estimation step S811 performs inter prediction on a frame structure block. The second estimation step S812 performs intra prediction on the frame structure block. The third estimation step S813 performs inter prediction on a field structure top MB. The fourth estimation step S814 performs inter prediction on a field structure bottom field. The coding cost derived by the third estimation step S813 and the coding cost derived by the fourth estimation step S814 are summed up, obtaining a coding cost derived from the inter prediction on the field structure block. The fifth estimation step S815 performs intra prediction on the field structure top field. The sixth estimation step S816 performs intra prediction on the field structure bottom field. The coding cost derived by the fifth estimation step S815 and the coding cost derived by the sixth estimation step S816 are summed up, obtaining a coding cost derived from the intra prediction on the field structure block.

The picture structure-and-coding prediction method determining step S82 selects the smallest coding cost from the above-described four types of coding costs.

If the concept of the above-described conventional technology is simply applied to AVC, then a process as shown in FIG. 32 is conceivable. In FIG. 32, the entire process is made up of a motion estimation step S81', a coding prediction method determining step S83 and a picture structure determining step S82' for a MB pair.

The motion estimation step S81' includes first to eighth estimation steps S811' to S818'. The first estimation step S811' performs inter prediction on a frame structure top MB 77, and the second estimation step S812' performs intra prediction on the frame structure top MB 77. The third estimation step S813' performs inter prediction on a frame structure bottom MB 78, and the fourth estimation step S814' performs intra prediction on the frame structure bottom MB 78. The fifth estimation step S815' performs inter prediction on a field structure top MB 75, and the sixth estimation step S816' performs intra prediction on the field structure top MB 75. The seventh estimation step S817' performs inter prediction on a field structure bottom MB 76, and the eighth estimation step S818' performs intra prediction on the field structure bottom MB 76.

The coding prediction method determining step S83 includes first to fourth prediction method determining steps S831 to S834. The first prediction method determining step S831 selects intra/inter for the frame structure top MB 77 by comparing the coding costs of the first estimation step S811' and the second estimation step S812'. The second prediction method determining step S832 selects intra/inter for the frame structure bottom MB 78 by comparing the coding costs of the third prediction step S813' and the fourth prediction step S814'. The coding costs of the frame structure top MB 77 and bottom MB 78, for which intra/inter has been selected, are summed up, obtaining the coding cost of the pair of frame structure blocks 77 and 78. The third prediction method determining step S833 selects intra/inter for the field structure top MB 75 by comparing the coding costs of the fifth estimation step S815' and the sixth estimation step S816'. The fourth prediction method determining step S834 selects intra/inter for the field structure bottom MB 76 by comparing the coding costs of the seventh estimation step S817' and the eighth estimation step S818'. The coding costs of the field structure top MB 75 and bottom MB 76, for which intra/inter has been selected, are summed up, obtaining the coding cost of the pair of field structure blocks 75 and 76.

The picture structure determining step S82' determines field/frame for the image block pair 73 (71 and 72) by comparing the coding cost of the pair of frame structure blocks 77 and 78 and the coding cost of the pair of field structure blocks 75 and 76.

Since the above-described process calculates the cost of each of field and frame for both intra prediction and inter prediction, it is possible to determine the coding picture structure and the coding prediction method such that the best compression rate is achieved even in the case of an image whose compression rate is improved only with one of inter prediction and intra prediction. On the other hand, however, intra prediction is performed a large number of times, resulting in an enormous processing amount.

BRIEF SUMMARY OF THE INVENTION

As described above, since AVC has a huge number of candidate coding modes for each macroblock (pair), the load of the processing amount on an encoder becomes large when all of the candidates are fully covered and an optimal coding mode is searched for.

Therefore, it is an object of the present invention to provide a coding mode determining apparatus, an image coding apparatus, a coding mode determining method and a coding mode determining program that enable selection of an appropriate coding mode with a smaller processing amount.

A coding mode determining apparatus according to a first aspect of the invention is an apparatus for determining at least one of a plurality of candidate coding modes of an image block, including: a simple motion estimation portion; a coding mode selecting portion; a complex motion estimation portion; and a coding mode determining portion. The simple motion estimation portion derives a coding cost of each of the coding modes, based on a simple motion estimation for small blocks, which are partitions of an image block that are obtained with each of the coding modes. The coding mode selecting portion selects a subset of the plurality of the coding modes, based on the coding costs derived by the simple motion estimation portion. The complex motion estimation portion derives a coding cost of each of the coding modes, based on a complex motion estimation for the small blocks obtained with at least a subset of the subset of coding modes. The coding mode determining portion determines a coding mode of the image block, based on the coding costs derived by the complex motion estimation portion.

Here, "complex motion estimation" refers to motion estimation that is more complex than simple motion estimation, which also applies to the following. For example, a complex motion estimation may be motion estimation with a finer accuracy (e.g., non-integer pixel accuracy such as ½ pixel accuracy and ¼ pixel accuracy) as compared to a simple motion estimation with integer pixel accuracy, motion estimation with a finer accuracy as compared to a non-integer pixel simple motion estimation, or motion estimation in which a finer image is referenced as compared to a simple motion estimation in which a reduced image (image from which pixel information has been culled) is referenced.

The coding cost is represented, for example, by the sum of the pixel differential value, (the sum of the absolute difference between a small block and a reference picture in motion estimation) and the code amount of motion information (e.g., motion vector or differential motion vector). The coding mode is, for example, the division method for the small block, the picture reference direction during motion estimation for the small block, or the coding picture structure of the small block.

In this apparatus, the coding mode selecting portion narrows down the coding modes based on the coding costs obtained by the simple motion estimation portion. Furthermore, the complex motion estimation portion performs a complex motion estimation for the small blocks with the narrowed coding modes. Here, a complex motion estimation involves a larger processing amount than a simple motion estimation for such a reason that it requires use of a filter; however, in this apparatus, it is not necessary to perform a complex motion estimation for all of the small blocks for determining the coding mode. Accordingly, it is possible to reduce the number of times of the complex motion estimation, thus making it possible to reduce the processing amount for coding mode determination. Moreover, since the complex motion estimation is performed for the necessary small blocks, it is possible to determine a coding mode with an appropriate coding efficiency.

In a coding mode determining apparatus according to a second aspect of the invention, which is based on the first aspect of the invention, when deriving a coding cost of each of the coding modes, the simple motion estimation portion performs a simple motion estimation in a plurality of picture reference directions on each of the small blocks obtained with each of the coding modes to calculate a coding cost, then selects a picture reference direction having the lowest coding cost for each individual small block, then sums up the coding costs of all of the small blocks relating to the selected picture reference directions for each of candidate division methods individually to derive a coding cost of the coding mode of each of the candidate division methods.

In this apparatus, the simple motion estimation portion selects a picture referencing direction having a lower coding cost for each of the small blocks, so that it is possible to achieve a combination of small blocks having the lowest coding cost in the coding mode of each of the candidate division methods.

In a coding mode determining apparatus according to a third aspect of the invention, which is based on the first aspect of the invention, when deriving a coding cost of each of the coding modes, the simple motion estimation portion performs a simple motion estimation in a plurality of picture reference directions on each of the small blocks obtained with each of the coding modes to calculate a coding cost, then converts the coding cost of each of the small blocks for each picture reference direction individually into a coding cost per image block to derive a coding cost of the coding mode of each of candidate division methods for each of the reference directions.

In this apparatus, the simple motion estimation portion converts the coding cost of each of the small blocks for each of the picture referencing directions into a coding cost per image block to derive a coding mode, so that coding modes of different picture reference directions for a single small block are also processed by the coding mode selecting portion.

In a coding mode determining apparatus according to a fourth aspect of the invention, which is based on the second or third aspects of the invention, the simple motion estimation in a plurality of picture reference directions in the simple motion estimation portion includes only forward prediction in which a temporally preceding picture is referenced, and backward prediction in which a temporally following picture is referenced. That is, this apparatus does not perform bi-directional prediction. It should be noted that the forward prediction and the backward prediction each include a plurality of predictions in which a plurality of pictures are referenced in the same direction, which also applies to the following.

In this apparatus, the simple motion estimation portion performs only forward prediction and backward prediction. Since it does not perform bi-directional prediction, it is possible to reduce the processing amount, making it possible to shorten the processing time of the simple motion estimation.

In a coding mode determining apparatus according to a fifth aspect of the invention, which is based on the second or third aspects of the invention, the simple motion estimation in a plurality of picture reference directions in the simple motion estimation portion includes forward prediction in which a temporally preceding picture is referenced, backward prediction in which a temporally following picture is referenced, and bi-directional prediction in which pictures that are on both sides in time are referenced.

In this apparatus, bi-directional prediction is performed, so that it is possible to improve the accuracy of the simple motion estimation. Accordingly, it is possible to select a more appropriate coding mode.

In a coding mode determining apparatus according to a sixth aspect of the invention, which is based on the second or third aspects of the invention, the simple motion estimation in a plurality of picture reference directions in the simple motion estimation portion includes forward prediction in which a temporally preceding picture is referenced, and backward prediction in which a temporally following picture is referenced. The simple motion estimation portion derives a coding cost where bi-directional prediction in which pictures that are on both sides in time are referenced is performed, based on the forward prediction and the backward prediction. For example, when the coding cost of forward prediction and the coding cost of backward prediction are values close to each other, it is estimated, for example, that the coding cost of bi-directional prediction is a value slightly smaller than the smaller one of the above-described coding costs.

In this apparatus, the prediction result of bi-directional prediction is estimated, so that it is not necessary to perform bi-directional prediction in the simple motion estimation portion, making it possible to reduce the processing amount. Further, by reflecting the prediction result on the coding costs obtained by the simple motion estimation portion, it is possible to readily obtain an effect similar to that achieved in the case of performing bi-directional prediction. Accordingly, it is possible to improve the coding efficiency easily.

In a coding mode determining apparatus according to a seventh aspect of the invention, which is based on the first to sixth aspects of the invention, the complex motion estimation portion determines a picture reference direction in the complex motion estimation, based on the simple motion estimation in the simple motion estimation portion. The complex motion estimation potion performs motion estimation by referencing pictures in the determined reference direction. That is, even when it is possible to perform forward prediction or backward prediction, it is not necessary to always perform motion estimation in all of the directions.

With this apparatus, it is possible to perform a complex motion estimation by referencing the necessary reference direction. Accordingly, it is possible to reduce the processing amount for the complex motion estimation, making it possible to shorten the processing time of the complex motion estimation.

In a coding mode determining apparatus according to an eighth aspect of the invention, which is based on the seventh aspect of the invention, as a result of the simple motion estimation for the small blocks in the simple motion estimation portion, the complex motion estimation portion selects both the forward prediction and the backward prediction when their coding costs are substantially the same, and selects the prediction that has the smaller coding cost when their coding costs are different.

With this apparatus, it is possible to select both the forward prediction and the backward prediction when their coding costs are substantially the same, and it is possible to additionally perform bi-directional prediction. Furthermore, when their coding costs are different, one of the forward prediction and backward prediction that has a lower coding cost is selected. This is because, if the coding cost of one of them is larger than the other, then the coding cost cannot be expected to be smaller in bi-directional prediction.

In a coding mode determining apparatus according to a ninth aspect of the invention, which is based on the first to eighth aspects of the invention, the complex motion estimation portion selects at least a further subset of the subset of coding modes, based on the simple motion estimation for the small blocks in the simple motion estimation portion. The complex motion estimation portion selects at least a subset of the subset of coding modes, based on the simple motion estimation for the small blocks.

With this apparatus, it is not necessary to perform a complex motion estimation for all of a subset of the coding modes selected from different coding modes, making it possible to reduce the processing amount. Furthermore, it is also possible to select at least a subset of the subset of the coding modes such that the processing amount is maintained constant.

In a coding mode determining apparatus according to a tenth aspect of the invention, which is based on the ninth aspect of the invention, the complex motion estimation portion selects each of the coding modes in ascending order of their coding costs, and terminates the selection immediately before the sum of the coding costs of the selected coding modes exceeds a margin for the processing amount.

With this apparatus, although the complex motion estimation portion may not select all of the coding modes selected by the coding mode selecting portion, this is not much of a problem since coding modes having a lower coding cost are selected even in that case.

In a coding mode determining apparatus according to an eleventh aspect of the invention, which is based on the first to tenth aspects of the invention, the simple motion estimation portion or the complex motion estimation portion changes a method of motion estimation in the simple motion estimation or the complex motion estimation in such a manner that a processing amount for the motion estimation process is maintained substantially constant.

For example, the coding mode determining apparatus changes the method of motion estimation in accordance with the image attribute of an image constituted by image blocks. Here, the image attribute is, for example, the size of the image, the coding method (e.g., the picture type (I-picture, P-picture, B-picture)) of the image, the format (e.g., the scanning method (progressive, interlace) and the chroma format) of the image, or the motion amount of the image.

The method of motion estimation refers to, for example, the number and the direction of reference pictures, the variation of the partition sizes for which motion estimation is performed, and the range for motion search.

With this apparatus, it is possible realize a process with an appropriate processing amount, improving the availability of the apparatus. Furthermore, as an associated effect, it is possible to perform a more appropriate motion estimation.

In a coding mode determining apparatus according to a twelfth aspect of the invention, which is based on the first to eleventh aspects of the invention, the simple motion estimation is motion estimation with integer pixel accuracy, and the complex motion estimation is motion estimation with non-integer pixel accuracy.

In this apparatus, the coding mode selecting portion narrows down the coding modes based on the coding costs obtained by the simple motion estimation portion. Furthermore, the complex motion estimation portion performs motion estimation with non-integer pixel accuracy for the small blocks with the narrowed coding modes. Here, although motion estimation with non-integer pixel accuracy requires use of a filter, and therefore involves a larger processing amount than motion estimation with integer pixel accuracy; however, in this apparatus, it is not necessary to perform motion estimation with non-integer pixel accuracy for all of the small blocks for determining the coding mode. Accordingly, it is possible to reduce the number of times of motion estimation with non-integer pixel accuracy, thus making it possible to reduce the processing amount for coding mode determination. Furthermore, since motion estimation with non-integer pixel accuracy is performed for the necessary small blocks, it is possible to determine a coding mode with an appropriate coding efficiency.

An integrated circuit according to a thirteenth aspect of the invention, which is based on the first to twelfth aspects of the invention includes the coding mode determining apparatus described in any of the first to twelfth aspects of the invention.

With this integrated circuit, it is possible to achieve an effect similar to that achieved with the coding mode determining apparatus described in any of the first to twelfth aspects of the invention.

An image coding apparatus according to a fourteenth aspect of the invention includes: the coding mode determining apparatus described in any of the first to twelfth aspects of the invention; and a coding apparatus. The coding apparatus codes an image block, based on a coding mode of the image block that is determined by the coding mode determining apparatus.

In this image coding apparatus, it is not necessary to perform a complex motion estimation for all of the partitions for determining the coding mode. Accordingly, it is possible to reduce the number of times of the complex motion estimation, thus reducing the processing amount for coding mode determination. Furthermore, since the complex motion estimation is performed for the necessary partitions, it is possible to determine a coding mode with an appropriate coding efficiently, and to perform coding.

An integrated circuit according to a fifteenth aspect of the invention includes the image coding apparatus described in the fourteenth aspect of the invention.

With this integrated circuit, it is possible to achieve an effect similar to that achieved with the image coding apparatus described in the fourteenth aspect of the invention.

A coding mode determining apparatus according to a sixteenth aspect of the invention is an apparatus for determining a coding mode of an image block, including: an inter prediction portion; a coding picture structure determining portion; an intra prediction portion; and a coding prediction method determining portion. The inter prediction portion performs inter prediction on each block of field structure blocks and frame structure blocks of the image block to derive a coding cost. The coding picture structure determining portion determines a coding picture structure of the image block, based on the coding costs obtained by the inter prediction portion. The intra prediction portion performs intra prediction on each of the blocks having the determined coding picture structure to derive a coding cost. The coding prediction method determining portion determines a coding prediction method for each of the blocks of the image block that have the determined coding picture structure by comparing the coding costs obtained with the inter prediction and the coding costs obtained with the intra prediction. Here, the coding picture structure is a picture structure for coding an image block, and means a field structure or a frame structure. The coding prediction method means inter prediction or intra prediction for coding an image block.

Here, the field structure block includes, for example, blocks constituted by a set of odd-numbered lines of an image block and blocks constituted by a set of even-numbered lines of the image block, which also applied to the following. The frame structure block is constituted by, for example, blocks containing consecutive lines of an image block, which also applies to the following.

In this apparatus, the intra prediction portion performs intra prediction only on each block having the coding picture structure determined by the coding picture structure determining portion, so that the intra prediction portion does not need to perform intra prediction on all of the field structure blocks and the frame structure blocks. Since the number of times of intra prediction, which has a high processing load, can be reduced in this way, it is possible to reduce the processing load for determining the coding prediction method for the image block.

In a coding mode determining apparatus according to a seventeenth aspect of the invention, which is based on the sixteenth aspect of the invention, the inter prediction portion sums up the respective coding costs of the blocks of the frame structure blocks to derive a coding cost of the frame structure blocks, and sums up the respective coding costs of the blocks of the field structure blocks to derive a coding cost of the field structure blocks.

In this apparatus, the inter prediction portion derives the coding cost for each picture structure by deriving and summing up the respective coding costs of the blocks of each of the picture structures.

In a coding mode determining apparatus according to a eighteenth aspect of the invention, which is based on the seventeenth aspect of the invention, the intra prediction portion performs intra prediction on each of the blocks having the determined coding picture structure to derive a coding cost. The coding prediction method determining portion compares the coding costs derived in the inter prediction portion and the coding costs derived in the intra prediction portion for each of the blocks having the determined coding picture structure to determine a coding prediction method for each of the blocks.

In this apparatus, the intra prediction portion performs intra prediction on each of the blocks having the determined coding picture structure to derive a coding cost, so that it is not necessary to perform intra prediction on all of the field structure blocks and the frame structure blocks. Since the number of times of intra prediction, which has a high processing load, can be reduced in this way, it is possible to reduce the processing load for determining the coding prediction method for an image block, and also to reduce the overall processing amount of the coding apparatus.

In a coding mode determining apparatus according to a nineteenth aspect of the invention, which is based on the sixteenth to eighteenth aspects of the invention, the image block is a block pair consisting of two square blocks.

In this apparatus, the block pair consists of two square blocks, so that it is possible to process each of the field structure blocks and the frame structure blocks as a square block.

An integrated circuit according to a twentieth aspect of the invention includes the coding mode determining apparatus described in any of the sixteenth to nineteenth aspects of the invention.

With this integrated circuit, it is possible to achieve an effect similar to that achieved with the coding mode determining apparatus described in any of the sixteenth to nineteenth aspects of the invention.

An image coding apparatus according to a twenty-first aspect of the invention includes: the coding mode determining apparatus described in any of the sixteenth to nineteenth aspects of the invention; and a coding apparatus that codes an image block based on a coding mode of the image block that is determined by the coding mode determining apparatus.

In this apparatus, the intra prediction portion performs intra prediction only on blocks having the picture structure determined by the picture structure determining portion, so that the intra prediction portion does not need to perform intra prediction on all of the field structure blocks and the frame structure blocks. Since the number of times of intra prediction, which has a high processing load, can be reduced in this way, it is possible to reduce the processing amount for determining the coding prediction method for an image block.

An integrated circuit according to a twenty-second aspect of the invention includes the image coding apparatus described in the twenty-first aspect of the invention.

With this integrated circuit, it is possible to achieve an effect similar to that achieved with the image coding apparatus described in the twenty-first aspect of the invention.

A coding mode determining apparatus according to a twenty-third aspect of the invention is an apparatus for determining a coding mode of an image block, including: a simple motion estimation portion; and a coding picture structure determining portion. The simple motion estimation portion performs a simple motion estimation for each block of field structure blocks and frame structure blocks of the image block to derive a coding cost. The coding picture structure determining portion determines a coding picture structure by comparing the coding costs of the field structure blocks and the frame structure blocks of the image block, based on the coding costs obtained by the simple motion estimation portion.

In this apparatus, the coding mode (specifically, the coding picture structure) of an image block is determined based on a simple motion estimation. Accordingly, it is possible to reduce the processing amount for determining the coding mode.

In a coding mode determining apparatus according to a twenty-fourth aspect of the invention, which is based on the twenty-third aspect of the invention, the simple motion estimation portion performs simple inter prediction and simple intra prediction on each of the blocks, then selects one of the simple inter prediction and the simple intra prediction for each of the blocks by comparing the coding costs of the simple inter prediction and the coding costs of the simple intra prediction, and further sums up the respective coding costs of the blocks for each of the picture structures to derive a coding cost of the frame structure blocks and a coding cost of the field structure blocks.

In this apparatus, the simple motion estimation portion derives the coding cost of the frame structure blocks and the coding cost of the field structure blocks, using inter prediction and intra prediction, so that it is possible to determine a coding picture structure such that the best compression rate is achieved even in the case of an image block whose compression rate is improved only with one of inter prediction and intra prediction.

In a coding mode determining apparatus according to a twenty-fifth aspect of the invention, which is based on the twenty-fourth aspect of the invention, the simple inter prediction is inter prediction with integer pixel accuracy.

In this apparatus, the simple motion estimation portion can perform inter prediction with integer pixel accuracy and simple intra prediction.

In a coding mode determining apparatus according to a twenty-sixth aspect of the invention, which is based on the twenty-third to twenty-fifth aspects of the invention, the image block is a block pair consisting of two square blocks.

In this apparatus, the block pair consists of two square blocks, so that it is possible to process each of the field structure blocks and the frame structure blocks as a square block.

An integrated circuit according to a twenty-seventh aspect of the invention includes the coding mode determining apparatus described in any of the twenty-third to twenty-sixth aspects of the invention.

With this integrated circuit, it is possible to achieve an effect similar to that achieved with the coding mode determining apparatus described in any of the twenty-third to twenty-sixth aspects of the invention.

An image coding apparatus according to a twenty-eighth aspect of the invention includes: the coding mode determining apparatus described in any of the twenty-third to twenty-sixth aspects of the invention; a complex motion estimation portion that performs a complex motion estimation for an image block having a coding picture structure determined by the coding mode determining apparatus; and a coding portion that codes the image block based on a prediction result obtained by the complex motion estimation portion.

In this apparatus, since an image block is coded with the complex motion estimation, the compression efficiency is improved. Moreover, here, the complex motion estimation is performed only for an image block having the coding picture structure determined by the coding mode determining apparatus, so that it is possible to reduce the number of times of the complex motion estimation to a smaller number than in the past.

In an image coding apparatus according to a twenty-ninth aspect of the invention, which is based on the twenty-eighth aspect of the invention, the complex motion estimation, portion performs complex inter prediction or complex intra prediction on each block having the determined coding picture structure.

With this apparatus, it is possible to improve the compression efficiency even for an image block whose compression rate is improved only with one of inter prediction or intra prediction.

In an image coding apparatus according to a thirtieth aspect of the invention, which is based on the twenty-ninth aspect of the invention, the complex inter prediction is inter prediction with non-integer pixel accuracy.

With this apparatus, it is possible to perform complex inter prediction, using inter prediction with non-integer pixel accuracy.

An integrated circuit according to a thirty-first aspect of the invention, which is based on the twenty-eighth to thirtieth aspects of the invention includes the image coding apparatus described in any of the twenty-eighth to thirtieth aspects of the invention.

With this integrated circuit, it is possible to achieve an effect similar to that achieved with the image coding apparatus described in any of the twenty-eighth to thirtieth aspects of the invention.

A coding mode determining method according to a thirty-second aspect of the invention is a coding mode determining method for determining at least one of a plurality of candidate coding modes of an image block, including: a simple motion estimation step; a coding mode selecting step; a complex motion estimation step; and a coding mode determining step. The simple motion estimation step derives a coding cost of each of the coding modes, based on a simple motion estimation for small blocks, which are partitions of an image block that are obtained with each of the coding modes. The coding mode selecting step selects a subset of the plurality of the coding modes, based on the coding costs derived by the simple motion estimation step. The complex motion estimation step derives a coding cost of each of the coding modes, based on a complex motion estimation for the small blocks obtained with at least a subset of the subset of coding modes. The coding mode determining step determines a coding mode of the image block, based on the coding costs derived by the complex motion estimation step.

In this method, the coding mode selecting step narrows down the coding modes based on the coding costs obtained by the simple motion estimation step. Furthermore, the complex motion estimation step performs a complex motion estimation for the small blocks with the narrowed coding modes. Here, a complex motion estimation involves a larger processing amount than a simple motion estimation for such a reason that it requires use of a filter; however, in this method, it is not necessary to perform a complex motion estimation for all of the small blocks for determining the coding mode. Accordingly, it is possible to reduce the number of times of the complex motion estimation, thus making it possible to reduce the processing amount for coding mode determination. Moreover, since the complex motion estimation is performed for the necessary small blocks, it is possible to determine a coding mode with an appropriate coding efficiency.

A coding mode determining method according to a thirty-third aspect of the invention is a coding mode determining method for determining a coding mode of an image block, including: an inter prediction step; a coding picture structure determining step; an intra prediction step; and a coding prediction method determining step. The inter prediction step performs inter prediction on each block of field structure blocks and frame structure blocks of the image block to derive a coding cost. The coding picture structure determining step determines a coding picture structure of the image block based on the coding costs obtained by the inter prediction step. The intra prediction step performs intra prediction on each of the blocks having the determined coding picture structure to derive a coding cost. The coding prediction method determining step determines a coding prediction method for each of the blocks of the image block that have the determined coding picture structure by comparing the coding costs obtained with the inter prediction and the coding costs obtained with the intra prediction.

In this method, the intra prediction step performs intra prediction only on each block having the coding picture structure determined by the coding picture structure determining step, so that the intra prediction step does not need to perform intra prediction on all of the field structure blocks and the frame structure blocks. Since the number of times of intra prediction, which has a high processing load, can be reduced in this way, it is possible to reduce the processing load for determining the coding prediction method for the image block.

A coding mode determining method according to a thirty-fourth aspect of the invention is a coding mode determining method for determining a coding mode of an image block, including: a simple motion estimation step; and a coding picture structure determining step. The simple motion estimation step performs a simple motion estimation for each block of field structure blocks and frame structure blocks of the image block to derive a coding cost. The coding picture structure determining step determines a coding picture structure by comparing the coding costs of the field structure blocks and the frame structure blocks of the image block, based on the coding costs obtained by the simple motion estimation step.

In this method, the coding mode (specifically, the coding picture structure) of an image block is determined based on a simple motion estimation. Accordingly, it is possible to reduce the processing amount for determining the coding mode.

A coding mode determining program according to a thirty-fifth aspect of the invention lets a computer perform the following method. A coding mode determining method for determining at least one of a plurality of candidate coding modes of an image block, including: a simple motion estimation step; a coding mode selecting step; a complex motion estimation step; and a coding mode determining step. The simple motion estimation step derives a coding cost of each of the coding modes, based on a simple motion estimation for small blocks, which are partitions of an image block that are obtained with each of the coding modes. The coding mode selecting step selects a subset of the plurality of the coding modes, based on the coding costs derived by the simple motion estimation step. The complex motion estimation step derives a coding cost of each of the coding modes, based on a complex motion estimation for the small blocks obtained with at least a subset of the subset of coding modes. The coding mode determining step determines a coding mode of the image block, based on the coding costs derived by the complex motion estimation step.

In this program, the coding mode selecting step narrows down the coding modes based on the coding costs obtained by the simple motion estimation step. Furthermore, the complex motion estimation step performs a complex motion estimation for the small blocks with the narrowed coding modes. Here, a complex motion estimation involves a larger processing amount than a simple motion estimation for such a reason that it requires use of a filter; however, in this program, it is not necessary to perform a complex motion estimation for all of the small blocks for determining the coding mode. Accordingly, it is possible to reduce the number of times of the complex motion estimation, thus making it possible to reduce the processing amount for coding mode determination. Moreover, since the complex motion estimation is performed for the necessary small blocks, it is possible to determine a coding mode with an appropriate coding efficiency.

A coding mode determining program according to a thirty-sixth aspect of the invention lets a computer perform the following method. A coding mode determining method for determining a coding mode of an image block, including: an inter prediction step; a coding picture structure determining step; an intra prediction step; and a coding prediction method determining step. The inter prediction step performs inter prediction on each block of field structure blocks and frame structure blocks of the image block to derive a coding cost. The coding picture structure determining step determines a coding picture structure of the image block based on the coding costs obtained by the inter prediction step. The intra prediction step performs intra prediction on each of the blocks having the determined coding picture structure to derive a coding cost. The coding prediction method determining step determines a coding prediction method for each of the blocks of the image block that have the determined coding picture structure by comparing the coding costs obtained with the inter prediction and the coding costs obtained with the intra prediction.

In this program, the intra prediction step performs intra prediction only on each block having the coding picture structure determined by the coding picture structure determining step, so that the intra prediction step does not need to perform intra prediction on all of the field structure blocks and the frame structure blocks. Since the number of times of intra prediction, which has a high processing load, can be reduced in this way, it is possible to reduce the processing load for determining the coding prediction method for the image block.

A coding mode determining program according to a thirty-seventh aspect of the invention lets a computer perform the following method. A coding mode determining method for determining a coding mode of an image block, including: a simple motion estimation step; and a coding picture structure determining step. The simple motion estimation step performs a simple motion estimation for each block of field structure blocks and frame structure blocks of the image block to derive a coding cost. The coding picture structure determining step determines a coding picture structure by comparing the coding costs of the field structure blocks and the frame structure blocks of the image block, based on the coding costs obtained by the simple motion estimation step.

In this program, the coding mode (specifically, the coding picture structure) of an image block is determined based on a simple motion estimation. Accordingly, it is possible to reduce the processing amount for determining the coding mode.

As described above, the present invention can provide a coding mode determining apparatus, an image coding apparatus, a coding mode determining method and a coding mode determining program that enable selection of an appropriate coding mode with a smaller processing amount.

DETAILED DESCRIPTION OF THE INVENTION

First Embodiment

An encoder according to a first embodiment of the present invention will be described with reference to FIGS. 1 to 15.

Figure 1:
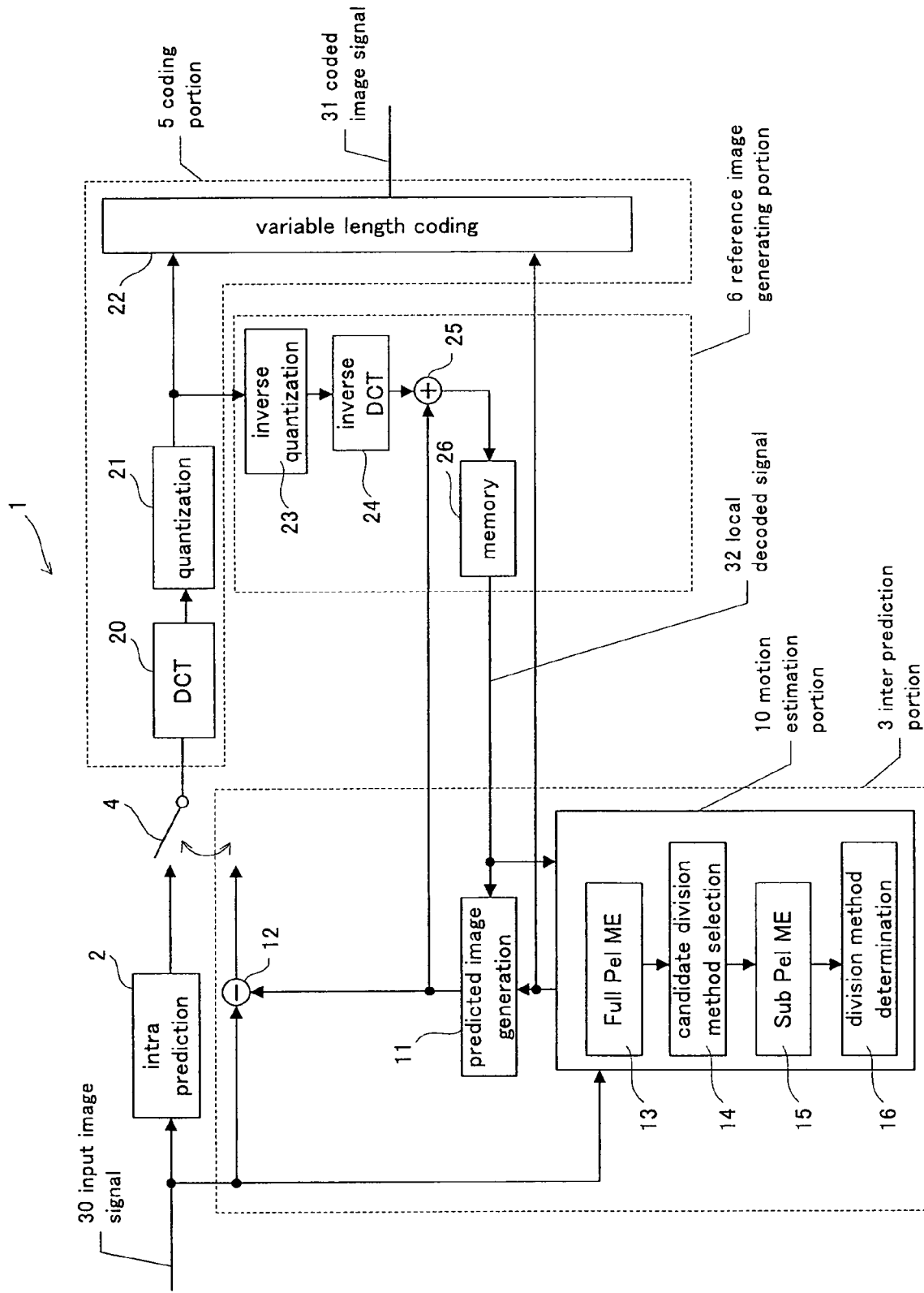
FIG. 1 is a diagram showing the configuration of an image coding apparatus according to one embodiment of the present invention.

FIG. 1 is a block diagram illustrating the configuration of an encoder 1 according to the first embodiment of the present invention. The encoder 1 is, for example, an image coding apparatus for coding an input image signal 30 with MPEG-4 and outputting it as a coded image signal 31, and is included in a personal computer (PC), a mobile phone or the like.

<Configuration of Encoder 1>

The encoder 1 shown in FIG. 1 includes: an intra prediction portion 2 that performs intra prediction of the input image signal 30; an inter prediction portion 3 that performs inter prediction of the input image signal 30; a switching portion 4 that switches between a prediction result of intra prediction and a prediction result of inter prediction; a coding portion 5 that codes an output from the switching portion 4 and outputs the coded image signal 31; and a reference image generating portion 6 that generates a local decoded signal 32 of the input image signal 30.

The intra prediction portion 2 performs intra prediction on the input image signal 30 for each image block, and outputs a differential signal with an intra-predicted image to the switching portion 4.

The inter prediction portion 3 receives the input image signal 30 as a first input and the local decoded signal 32 as a second input, and outputs a result of inter prediction to the switching portion 4. Furthermore, the inter prediction portion 3 outputs, as a second output, information relating to coding, such as a motion vector, of the inter prediction result to the coding portion 5.

The inter prediction portion 3 is made up of: a motion estimation portion 10 that receives the input image signal 30 as a first input and the local decoded signal 32 as a second input and that performs motion estimation; a predicted image generating portion 11 that receives an output from the motion estimation portion 10 as a first input and the local decoded signal 32 as a second input and that outputs a predicted image; and a subtractor 12 that receives the input image signal 30 as a first input and an output from the predicted image generating portion 11 as a second input. Further, of the output from the motion estimation portion 10, coding information such as the motion vector or the coding mode is also supplied to an input of a variable length coding portion 22, which will be described later.

The motion estimation portion 10 is mainly provided with a full-pel prediction portion 13, a candidate division method selecting portion 14, a sub-pel prediction portion 15 and a division method determining portion 16 (the operation will be described later).

The switching portion 4 receives a result of intra prediction as a first input and a result of inter prediction as a second input, and outputs one of these inputs to the coding portion 5.

The coding portion 5 receives an output from the switching portion 4 as a first input, and outputs the coded image signal 31 through a DCT (discrete cosine transform) portion 20, a quantization portion 21 and the variable length coding portion 22.

In the reference image generating portion 6, an output from the quantization portion 21 is input to an inverse quantization portion 23, and an output from the inverse quantization portion 23 is supplied to a first input to an adder 25 through an inverse DCT portion 24. The adder 25 receives an output from the predicted image generating portion 11 as a second input, and outputs a result of addition to a memory 26. The memory 26 outputs the local decoded signal 32 as the second input to the predicted image generating portion 11 and as the second input to the motion estimation portion 10.

<Operation of Encoder 1>

Next, the operation of the encoder 1 will be described. First, the input image signal 30 is input for each image block, which is a basic unit of a coding process.

An image block to be intra-coded is intra-predicted in the intra prediction portion 2, using the pixel coefficients of another image block in the same picture. The intra-predicted image block is subjected to discrete cosine transform (DCT) in the DCT portion 20, quantized in the quantization portion 21, and variable length coded in the variable length coding portion 22.

On the other hand, the DCT coefficients quantized in the quantization portion 21 are inversely quantized in the inverse quantization portion 23, subjected to inverse DCT in the inverse DCT portion 24, locally decoded, and stored as the local decoded signal 32 in the memory 26. The local decoded signal 32 stored in the memory 26 is used when an image block is inter-coded in the inter prediction portion 3.

An image block to be inter-coded is subjected to motion estimation in the motion estimation portion 10. The detailed operation of the motion estimation portion 10 here will be described later.

The predicted image generating portion 11 generates a predicted image based on a result of motion estimation in the motion estimation portion 10 and the local decoded signal 32 stored in the memory 26. The subtractor 12 determines a differential image block from the difference between the image block and the generated predicted image. The differential image block is subjected to discrete cosine transform in the DCT portion 20, and quantized in the quantization portion 21. The differential image block that has been subjected to discrete cosine transform and quantization is variable length coded in the variable length coding portion 22, together with the motion estimation result and others.

<Operation of Motion Estimation Portion 10>

The motion estimation portion 10 determines the coding mode (e.g., the division method and the prediction direction of an image block) of an image block that results in the smallest coding cost, and derives a motion vector.

Figure 2:
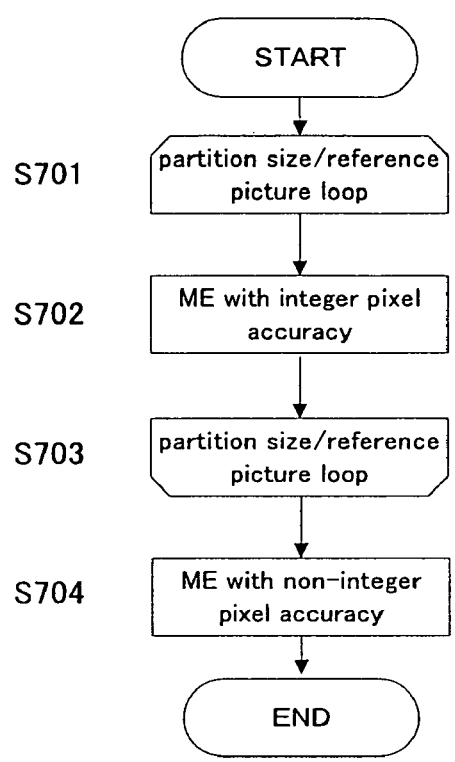
FIG. 2 is a process flow chart of a motion estimation portion according to the present invention.

The feature of the motion estimation portion 10 will be described with reference to FIG. 2. The motion estimation portion 10 performs motion estimation with integer pixel accuracy for all of the partition sizes of an image block and all of the reference pictures during motion estimation (steps S701 to S703). Furthermore, based on a result of integer accuracy motion estimation, it selects candidates for a partition size and a reference picture that reduce the coding cost, and carries out motion estimation with non-integer pixel accuracy for the selected candidates (step S704).

Accordingly, it is not necessary to perform motion estimation with non-integer pixel accuracy for all of the partition sizes and all of the reference pictures, thus making it possible to reduce the processing amount for determining the partition size and the reference picture for coding. Furthermore, since motion estimation with non-integer pixel accuracy is carried out on the selected candidates, it is possible to realize an appropriate coding efficiency.

The operation of the motion estimation portion 10 will be described further with reference to FIG. 3.

Figure 3:
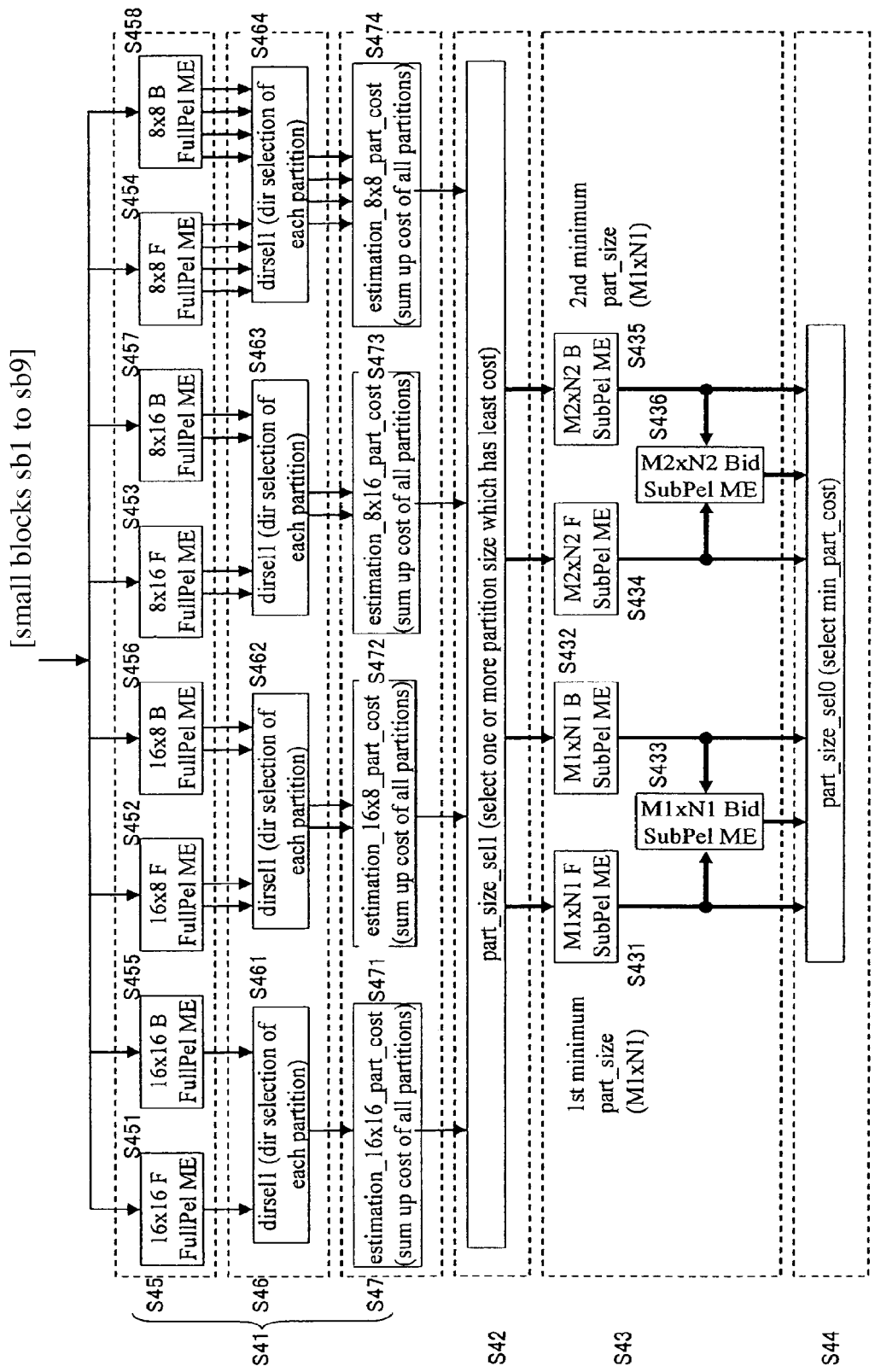
FIG. 3 is a diagram showing a process flow of the motion estimation portion according to the present invention.

FIG. 3 is a block diagram showing a process flow of coding mode determination for an image block. The process flow of coding mode determination for an image block shown in FIG. 3 is made up of: a full-pel prediction step S41, which is performed by the full-pel prediction portion 13; a candidate division method selecting step S42, which is performed by the candidate division method selecting portion 14; a sub-pel prediction step S43, which is performed by the sub-pel prediction portion 15; and a division method determining step S44, which is performed by the division method determining portion 16.

The full-pel prediction step S41 includes a small block full-pel prediction step S45, a prediction direction selecting step S46 and a coding cost deriving step S47.

The small block full-pel prediction step S45 performs motion estimation with integer pixel accuracy for each of the small blocks Sb1 to Sb9 of M×N ((M,N)=(16,16),(16,8),(8,16),(8,8)) (see FIG. 25), obtained by dividing an image block of 16×16 with four types of candidate division methods, to derive the coding cost and the motion vector for each of the small blocks. Specifically, forward prediction steps S451 to S454 and backward prediction steps S455 to S458 are carried out on each of the small blocks Sb1 to Sb9. That is, in the forward prediction steps S451 to S454 and the backward prediction steps S455 to S458, the process is carried out a number of times that corresponds to the number of the small blocks divided with each of the candidate division methods. In FIG. 3, this number of times is indicated by the number of arrows from the process blocks.

The prediction direction selecting step S46 selects a subset of a plurality of coding modes based on the coding costs derived by the full-pel prediction step S45. Specifically, the prediction direction selecting step S46 selects a prediction direction (a picture reference direction) that reduces the coding cost for each of the small blocks by comparing the coding costs of the forward prediction steps S451 to S454 and the coding costs of the backward prediction steps S455 to S458.

The coding cost deriving step S47 sums up the coding costs of the prediction direction selected by the prediction direction selecting step S46 for each of the candidate division methods to derive the coding cost per image block. Here, the full-pel prediction step S45 selects the picture reference direction having the lower coding cost for each of the small blocks, and it is therefore possible to achieve a combination of small blocks having the lowest coding cost in the coding mode of each of the candidate division methods.

The candidate division method selecting step S42 selects the two types of candidate division methods with the smallest coding cost by comparing the coding costs per image block derived by the coding cost deriving step S47.

Figure 28:
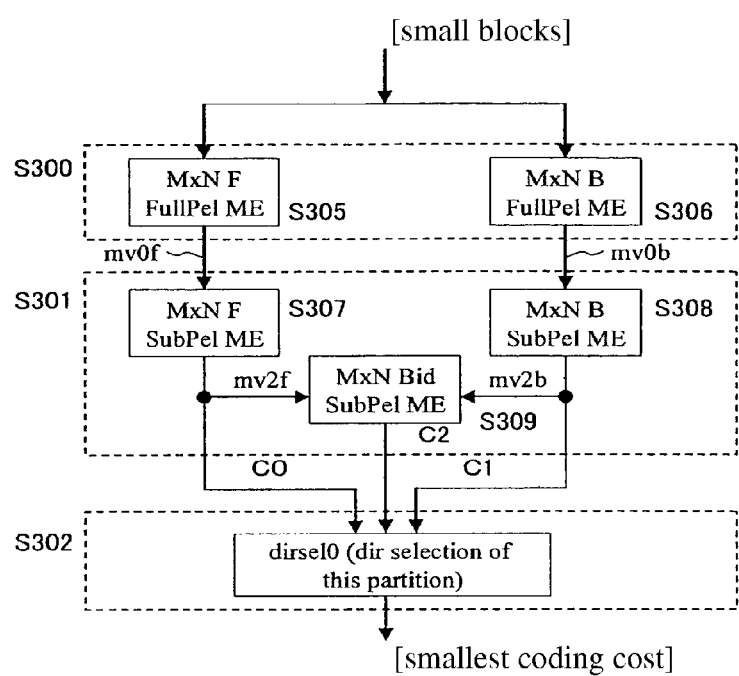
FIG. 28 is a diagram showing a conventional process flow of motion estimation.
Figure 29:
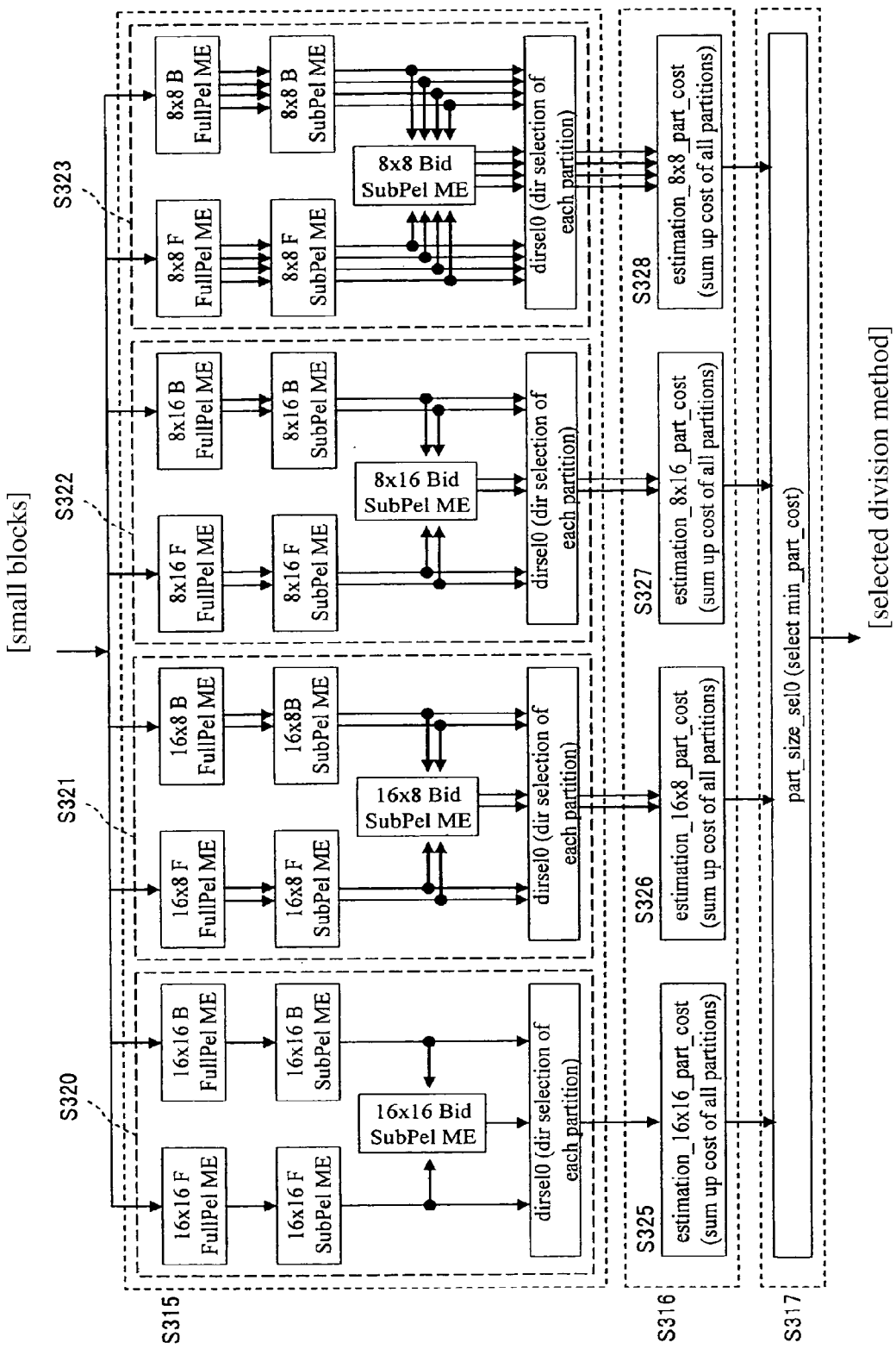
FIG. 29 is a diagram showing a conventional process flow of motion estimation.

The sub-pel prediction step S43 performs motion estimation with non-integer pixel accuracy for each of the small blocks divided with the two types of candidate division methods selected in the candidate division method selecting step S42. Here, motion estimation with non-integer pixel accuracy is carried out in the same manner as in the sub-pel prediction step S301, described with reference to FIG. 28. That is, motion estimation with non-integer pixel accuracy is performed for each of the small blocks divided with the selected two types of candidate division methods, based on the motion vectors derived in the small block full-pel prediction step S45. Furthermore, in the sub-pel prediction step S43, forward prediction steps S431 and S434, backward prediction steps S432 and S435, and bi-directional prediction steps S433 and S436 are performed for each of the small blocks. Consequently, the coding costs of three types of prediction directions are derived for each of the small blocks. Further, in the forward prediction steps S431 and S434, the backward prediction steps S432 and S435, and the bi-directional prediction steps S433 and S436, the process is carried out a number of times according to the number of the small blocks divided with each of the selected two types of candidate division methods.

The division method determining step S44 determines the prediction direction for each of the small blocks, based on the smallest coding cost for each of the small blocks divided with the two types of candidate division methods selected in the candidate division method selecting step S42, and derives the coding cost per image block. Furthermore, it determines the candidate division method having the smallest coding cost as the division method for the image block by comparing the derived coding costs per image block for the two types of candidate division methods. At the same time, the motion vectors for the small blocks can be obtained.

Figure 4:
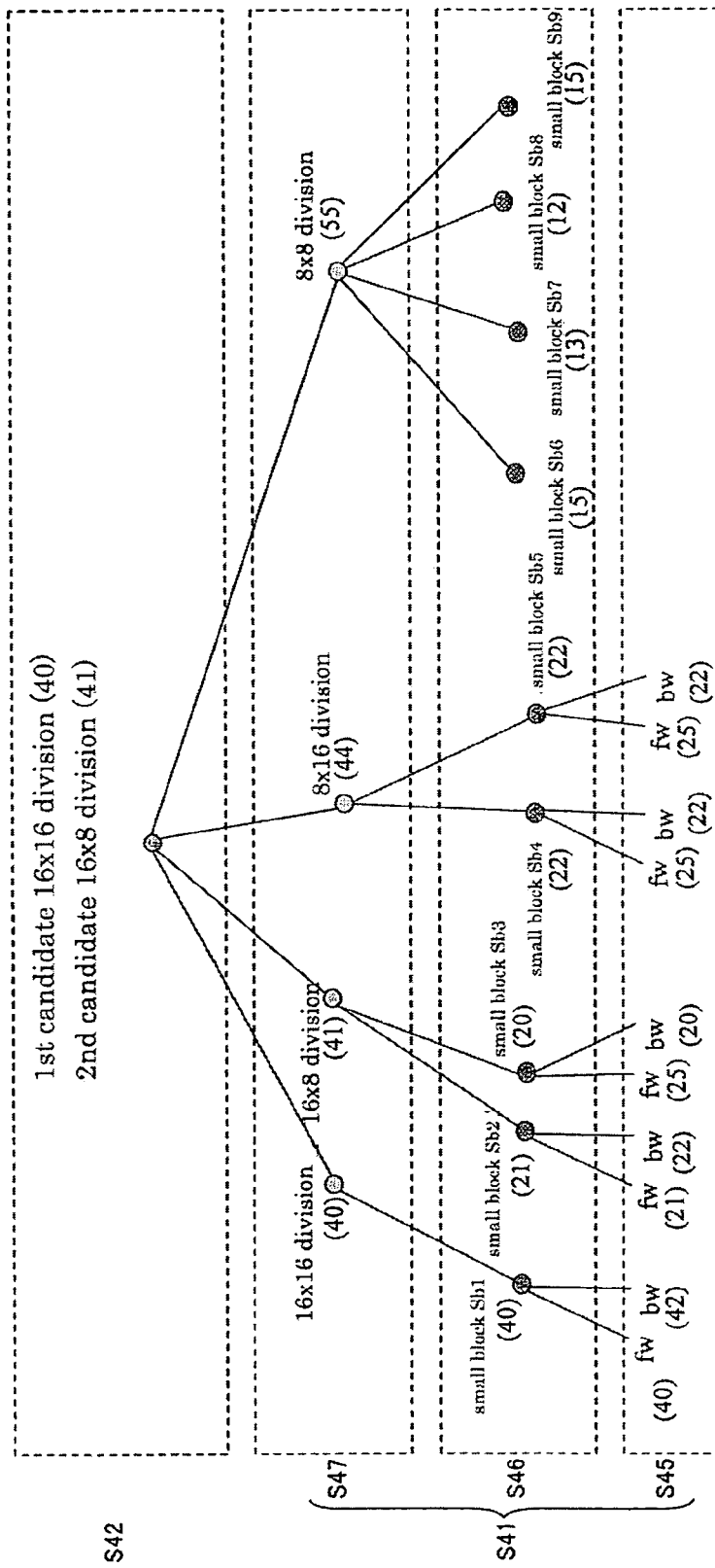
FIG. 4 is a diagram showing a method for selecting candidate division methods that is performed by a candidate division method selecting portion according to the present invention.

The process of the full-pel prediction step S41 and the candidate division method selecting step S42 will be further described in detail with reference to FIG. 4. It should be noted that as described above, the full-pel prediction step S41 includes the small block full-pel prediction step S45, the prediction direction selecting step S46 and the coding cost deriving step S47.

The small block full-pel prediction step S45 performs forward prediction (denoted as "fw" in FIG. 4) and backward prediction (denoted as "bw" in FIG. 4) with integer pixel accuracy for all of the small blocks Sb1 to Sb9 to derive the coding cost for each of the reference directions. FIG. 4 shows an example of each of the coding costs. For example, in the case of the small block Sb2, the coding cost of the forward prediction is (21), and the coding cost of the backward prediction is (22).

The prediction direction selecting step S46 selects a prediction direction having an even smaller coding cost by comparing the coding costs of the forward prediction and the backward prediction for each of the small blocks. For example, in the case of the small block Sb2, the forward prediction is selected.

The coding cost deriving step S47 derives the coding cost per image block based on the coding costs of the respective small blocks that have been selected by the prediction direction selecting step S46. For example, in the case of the 16×8 division method, the forward prediction is selected for the small block Sb2 and the backward prediction is selected for the small block Sb3; accordingly, the coding cost for the 16×16 image block is (41).

The candidate division method selecting step S42 selects the two types of candidate division methods with the smallest coding cost by comparing the coding costs per image block derived by the full-pel prediction step S41 for each of the candidate division methods. In FIG. 4, the 16×16 division method (coding cost (40)) and the 16×8 division method (coding cost (41)) are selected as the candidate division methods.

<Effect of Encoder 1>

In the encoder 1, the candidate division method selecting step S42 narrows down the candidate division methods based on the coding costs obtained by the full-pel prediction step S41. Furthermore, the sub-pel prediction step S43 performs sub-pel prediction on the small blocks of the narrowed candidate division methods. Here, sub-pel prediction requires use of a filter and therefore involves a larger processing amount than full-pel prediction; however, in this apparatus, it is not necessary to perform sub-pel prediction on all of the small blocks Sb1 to Sb9 for determining the coding mode. Accordingly, it is possible to decrease the number of times of sub-pel prediction, thus reducing the processing amount for coding mode determination. Furthermore, since sub-pel prediction is carried out on the necessary small blocks, it is possible to determine a coding mode with an appropriate coding efficiency.

Modified Example of Encoder 1

The present invention is not limited to the above-described embodiment, and various changes or modifications can be made without departing from the scope of the present invention.

(1) Modified Example of Full-Pel Prediction Portion 13

1-1

In the above-described embodiment, it was described that the full-pel prediction portion 13 that performs the full-pel prediction step S41 performs the forward prediction steps S451 to S454 and the backward prediction steps S455 to S458 on each of the small blocks Sb1 to Sb9 (hereinafter, referred to as "first full-pel prediction method"). In this case, bi-directional prediction is not carried out, and it is therefore possible to reduce the processing amount, and to shorten the processing time of full-pel prediction.

Here, the full-pel prediction step S41 may further perform bi-directional prediction to derive the coding cost (hereinafter, referred to as "second full-pel prediction method"). In this case, bi-directional prediction is performed, and it is therefore possible to improve the accuracy of full-pel prediction. Accordingly, it is possible to select a more appropriate coding mode. Further, it may estimate the coding cost for the case of performing bi-directional prediction, based on the coding costs derived by the forward prediction steps S451 to S454 and the backward prediction steps S455 to S458 (hereinafter, referred to as "third full-pel prediction method"). In this apparatus, the prediction result of bi-directional prediction is estimated, so that it is not necessary to carry out bi-directional prediction in the full-pel prediction portion 13, making it possible to reduce the processing amount. Further, by reflecting the prediction result on the coding costs obtained by the full-pel prediction portion 13, it is possible to readily obtain an effect similar to that achieved in the case of performing bi-directional prediction. Accordingly, it is possible to improve the coding efficiency easily.

Figure 5:
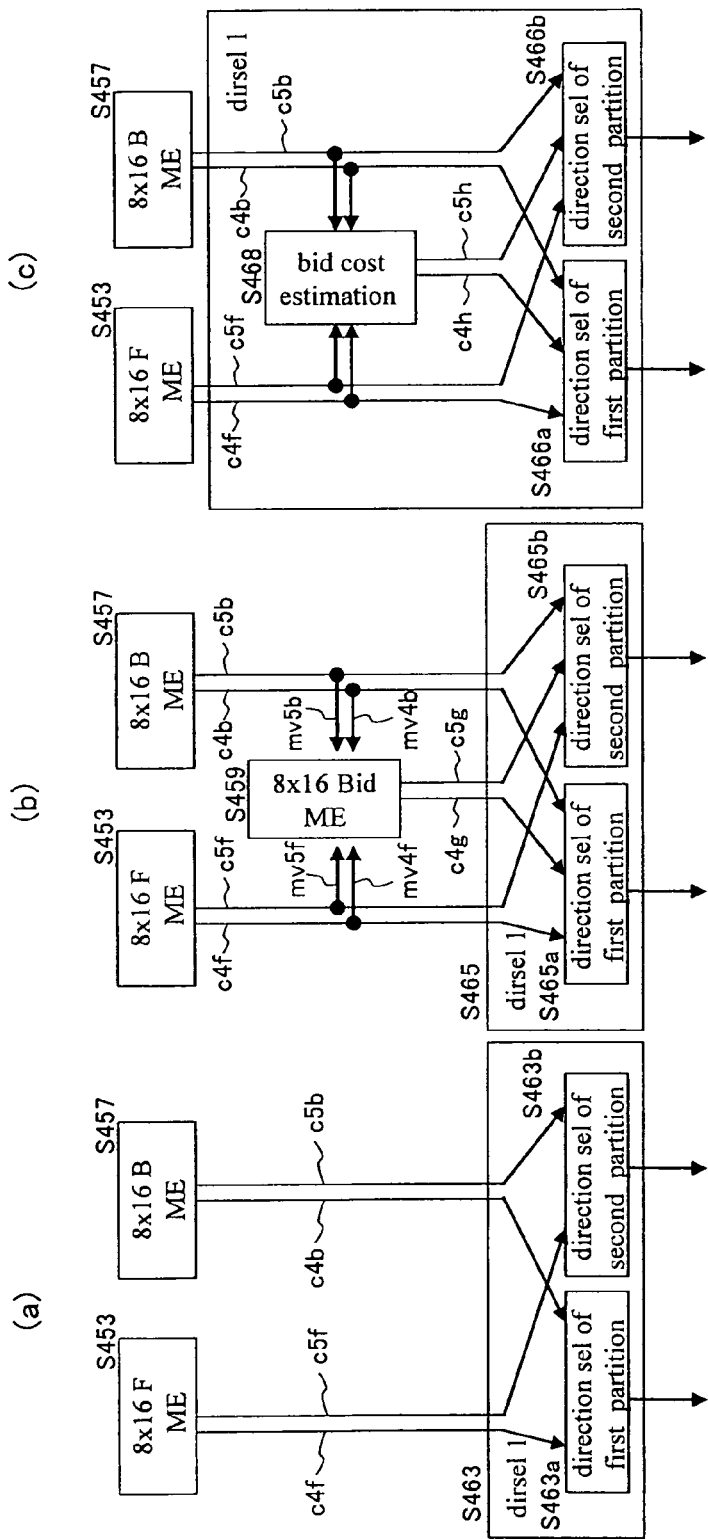
FIG. 5 is a diagram showing a process flow of a full-pel prediction portion.

The first to third full-pel prediction methods performed for the small blocks Sb4 and Sb5 of 8×16 (see FIG. 25), obtained by dividing an image block of 16×16 into two, will be described with reference to FIG. 5.

FIG. 5(a) shows a process flow illustrating the first full-pel prediction method. In the first full-pel prediction method, a forward prediction step S453 and a backward prediction step S457 are performed for the small blocks Sb4 and Sb5, and coding costs $C4f$ and $C5f$ for the small block Sb4 and Sb5 are derived by the forward prediction step S453, and coding costs $C4b$ and $C5b$ for the small blocks Sb4 and Sb5 are derived by the backward prediction step S457. The derived coding costs $C4f$, $C5f$, $C4b$ and $C5b$ are compared in a small block prediction method selecting step S463 (see FIG. 3), which corresponds to the prediction method selecting step S46 for each small block, for each of the small blocks, and prediction directions with the smallest coding cost are selected. More specifically, in the small block prediction method selecting step S463, the coding costs $C4f$ and $C4b$ for the small block Sb4 are compared in a comparison step S463a, the coding costs $C5f$ and $C5b$ for the small block Sb5 are compared in a comparison step S463b, and the prediction direction having an even smaller coding cost is selected for each of the small blocks.

FIG. 5(b) is a process flow illustrating the second full-pel prediction method. The difference to the first full-pel prediction method is that a bi-directional prediction step S459 is carried out. For example, a prediction utilizing $MV4f$ and $MV4b$, which are the motion vectors detected in the forward prediction step S453 and the backward prediction step S457, is performed for the small block Sb4. Specifically, a coding cost $C4g$ of the bi-directional prediction step S459 is derived, using a predicted image obtained by averaging the reference areas on reference pictures indicated by $MV4f$ and $MV4b$. Similarly, a coding cost $C5g$ is derived for the small block Sb5, utilizing $MV5f$ and $MV5b$.

The derived coding costs $C4g$ and $C5g$ of the bi-directional prediction step S459 are compared with the coding costs $C4f$, $C5f$, $C4b$ and $C5b$ of the forward prediction step S453 and the backward prediction step S457 in a small block prediction method selecting step S465, which is a modified example of the small block prediction method selecting step S463. Specifically, the coding costs $C4f$, $C4b$ and $C4g$ for the small block Sb4 are compared in a comparison step S465a, and the coding costs $C5f$, $C5b$ and $C5g$ for the small block Sb5 are compared in a comparison step S465b. As a result, a prediction direction having the smallest coding cost is selected for each of the small blocks.

With the second full-pel prediction method, it is possible to realize more accurate motion detection for small blocks, so that the coding efficiency can be expected to improve.

FIG. 5(c) is a process flow illustrating the third full-pel prediction method. The difference to the first full-pel prediction method is that a coding cost estimating step S468 for obtaining a coding cost for the case of performing bi-directional prediction is performed.

The coding cost estimating step S468 derives estimated coding costs $C4h$ and $C5h$, which are the estimated values of the coding costs in the case of performing bi-directional prediction, based on the coding costs $C4f$, $C5f$, $C4b$ and $C5b$ of the forward prediction step S453 and the backward prediction step S457. Specifically, when the coding costs $C4f$ and $C4b$ for the small block Sb4 are "values close to each other", the estimated coding cost $C4h$ is estimated to be slightly smaller than the smaller one of the coding costs $C4f$ and $C4b$; for example, it is estimated to be 90% of the value of the smaller coding cost.

Here, with regard to "values close to each other", the coding costs $C4f$ and $C4b$ are determined to be "values close to each other", for example, when the expression: $abs([C4f]-[C4b])*K < abs(abs([C4f])+abs([C4b])$ is true. Here, $[C4f]$ and $[C4b]$ represent the values of the coding costs $C4f$ and $C4b$, respectively, and K represents a predetermined constant.

Furthermore, the estimated coding costs $C4h$ and $C5h$ are compared with the coding costs $C4f$, $C5f$, $C4b$ and $C5b$ in comparison steps S466a and S466b, which are modified examples of the comparison steps S463a and S463b. Specifically, the estimated coding cost $C4h$ is compared with the coding costs $C4f$ and $C4b$ in the comparison step S466a, and the estimated coding cost $C5h$ is compared with the coding costs $C5f$ and $C5b$ in the comparison step S466b. As a result, a prediction direction having the smallest coding cost is selected for each of the small blocks.

With the third full-pel prediction method, it is not necessary to perform bi-directional prediction, thus making it possible to reduce the processing amount. Furthermore, it is possible to readily achieve an effect similar to that obtained when performing bi-directional prediction. Accordingly, the coding efficiency can be improved easily.

1-2

In the above-described embodiment, the small block full-pel prediction step S45 and the prediction direction selecting step S46 may be performed either in series or parallel.

Figure 6:
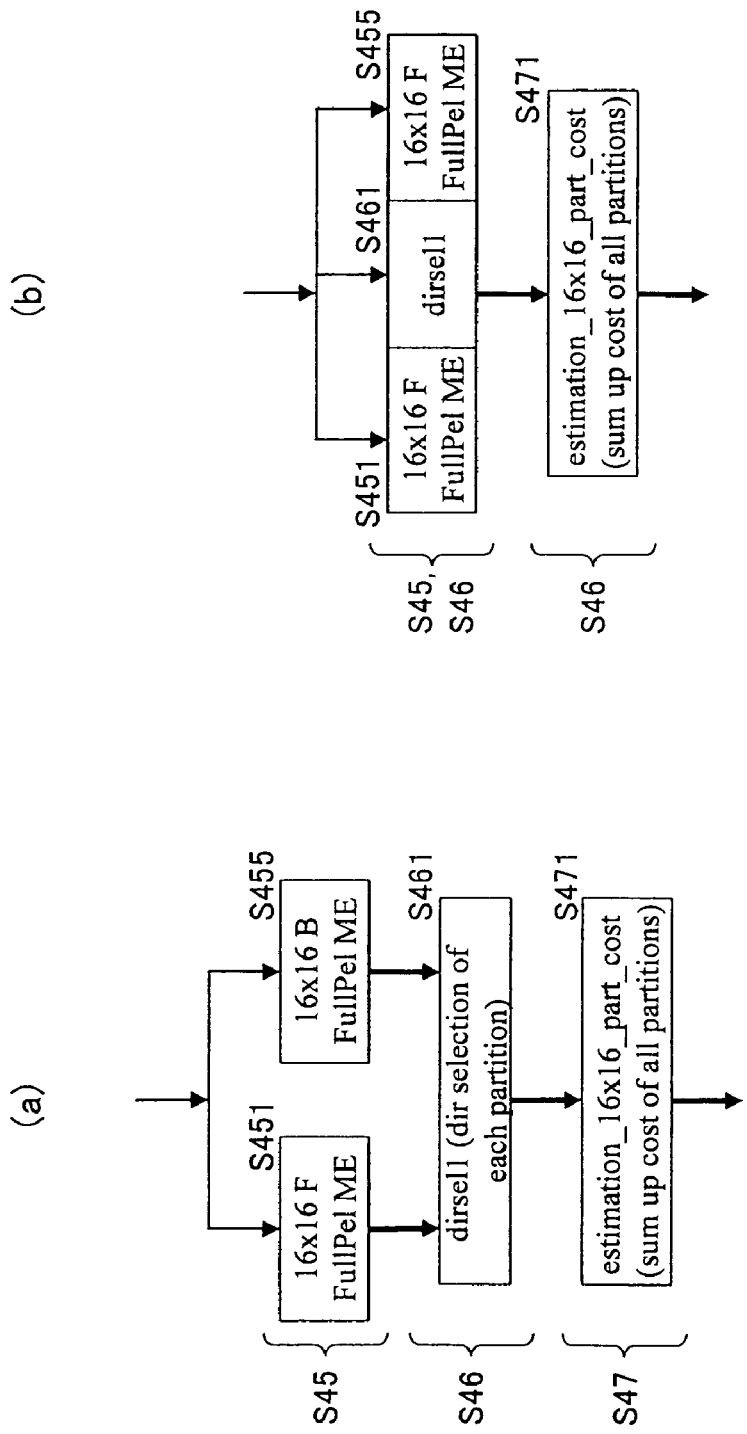
FIG. 6 is a diagram showing a process flow of the full-pel prediction portion.

The processing order between the small block full-pel prediction step S45 and the prediction direction selecting step S46 for the small block Sb1 of 16×16 (see FIG. 25), obtained by partitioning an image block of 16×16 as one, will be described with reference to FIG. 6.

FIG. 6(a) shows a process flow in the case of performing the small block full-pel prediction step S45 and the prediction direction selecting step S46 in series. The detailed description has been omitted, since it has already been given in the above-described embodiment with reference to FIG. 3.

FIG. 6(b) shows a process flow in the case of performing the small block full-pel prediction step S45 and the prediction direction selecting step S46 in parallel. Here, the forward prediction step S451, the backward prediction step S455 and the comparison of the respective coding costs are performed in parallel. Specifically, two reference pictures are stored in the memory 26 of the encoder 1 for the forward prediction step S451 and the backward prediction step S455, and motion estimation and calculation of the coding costs are performed in parallel. The best values obtained in the first several cost calculations are compared, and the motion estimation for the reference direction having a larger coding cost is terminated.

Usually, motion estimation performs calculation of the coding cost on the most promising search start location and its vicinity, and selects the best candidates among them. At this occasion, calculation of the coding cost is performed at least from 10 to 1000 times. In the case of the present invention, a motion estimation process that is not necessary for selection of the prediction direction can be terminated in the middle, and it is therefore possible to reduce the processing amount for full-pel prediction.

Here, motion estimation may be carried out using two reference pictures from which pixel information has been culled, in order to make the allocation amount of the memory 26 the same as that in the case of storing a single reference picture.

Additionally, the small block full-pel prediction step S45 and the prediction direction selecting step S46 may be performed in parallel, not only for each of the small blocks, but for the small blocks all together as well.

The processing order between the small block full-pel prediction step S45 and the prediction direction selecting step S46 for the small blocks Sb1 to Sb9 all together in the case of dividing an image block of 16×16 with four types of division methods will be described with reference to FIG. 7.

Figure 7:
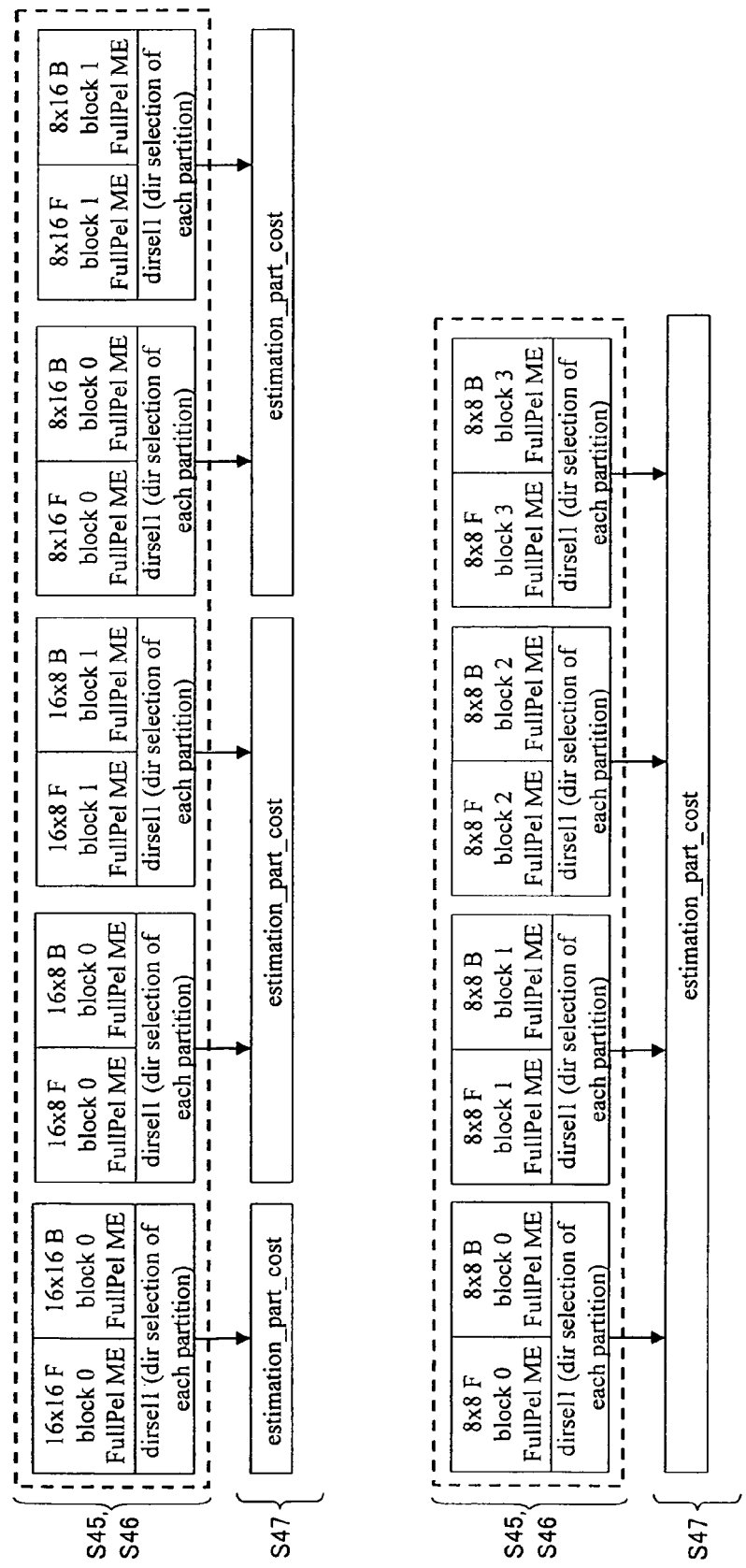
FIG. 7 is a diagram showing a modified example of the process flow of the full-pel prediction portion.

In FIG. 7, the small block full-pel prediction step S45 and the prediction direction selecting step S46 are performed in parallel for all of the small blocks Sb1 to Sb9. In addition, as described with reference to FIG. 6(b), the motion estimation process for the unnecessary prediction direction is terminated for each of the small blocks. Furthermore, the motion estimation process for small blocks whose coding costs are not small is terminated by comparing the coding costs for each of the small blocks.

That is, it is possible not only to terminate the motion estimation process for the unnecessary prediction direction for each of the small blocks, but also to terminate the motion estimation process for small blocks that are unnecessary for selection of the division method. Accordingly, it is possible to further reduce the unnecessary motion estimation process, thus further reducing the processing amount for full-pel prediction.

1-3

In the above-described embodiment, the small block full-pel prediction step S45 and the prediction direction selecting step S46 may be performed in series for each of the small blocks.

Figure 8:
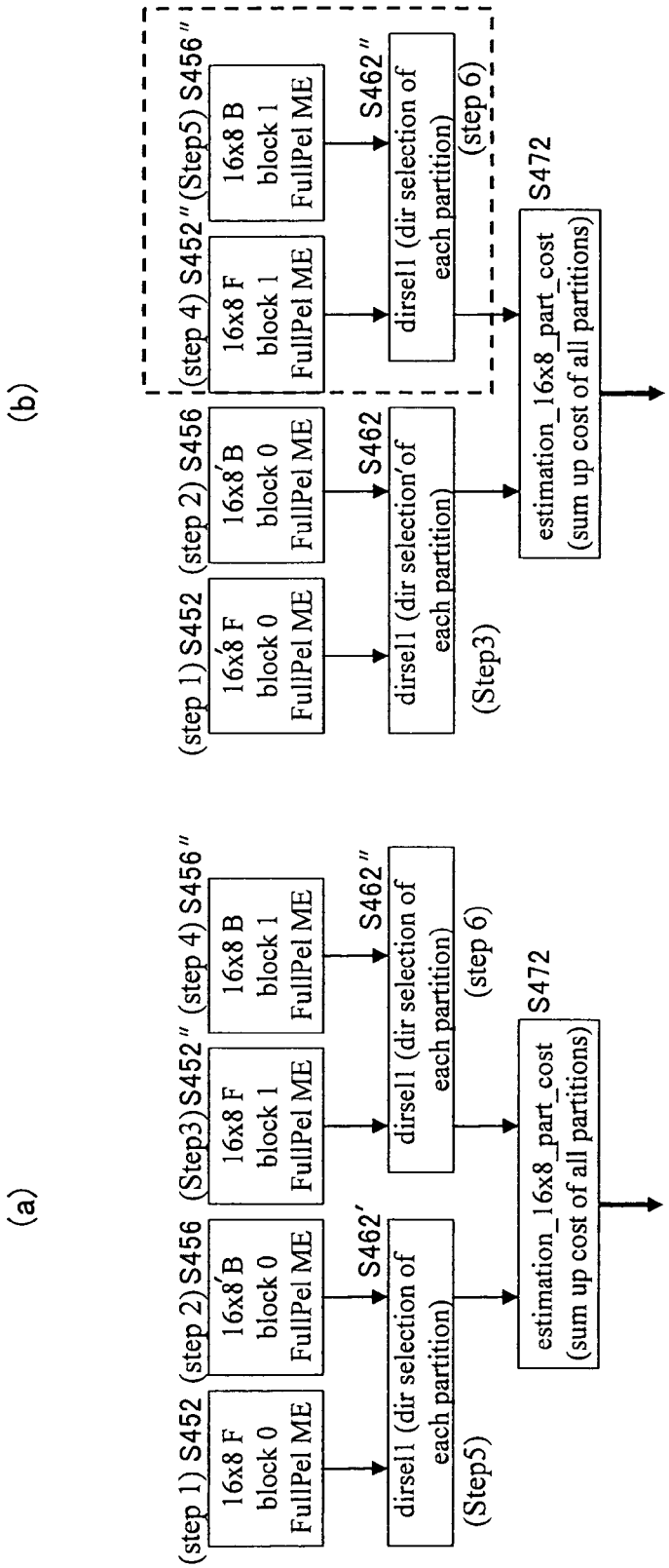
FIG. 8 is a diagram showing a modified example of the process flow of the full-pel prediction portion.

The processing order between the small block full-pel prediction step S45 and the prediction direction selecting step S46 for the small blocks Sb2 and Sb3 of 16×8 (see FIG. 25), obtained by dividing an image block of 16×16 into two, will be described with reference to FIG. 8.

When the small block full-pel prediction step S45 and the prediction direction selecting step S46 are performed in series (see FIG. 8(a)), the forward prediction step S452, the backward prediction step S456 and the small block prediction method selecting step S463, which corresponds to the prediction method selecting step S46 for each of the small blocks, are carried out in the following order: Forward prediction step S452' for the small block Sb2, backward prediction step S456' for the small block Sb2, forward prediction step S452" for the small block Sb3, backward prediction step S456" for the small block Sb3, small block prediction method selecting step S462', which corresponds to the prediction method selecting step S46 for the small block Sb2, and small block prediction method selecting step S462" for the small block Sb3.

On the other hand, when the small block full-pel prediction step S45 and the prediction direction selecting step S46 are performed in series for each of the small blocks (see FIG. 8(b)), the process for the small block Sb2 is performed first, and then the process for the small block Sb3 is performed. That is, the forward prediction step S452', the backward prediction step S456' and the small block prediction method selecting step S462' are performed for the small block Sb2 first. Thereafter, the forward prediction step S452", the backward prediction step S456" and the small block prediction method selecting step S462" are performed for the small block Sb3. In this case, the process for each of the small blocks may also be performed in parallel, as described under (1-2). For example, the forward prediction step S452", the backward prediction step S456" and the small block prediction method selecting step S462" may be performed in parallel for the small block Sb3.

1-4

Figure 9:
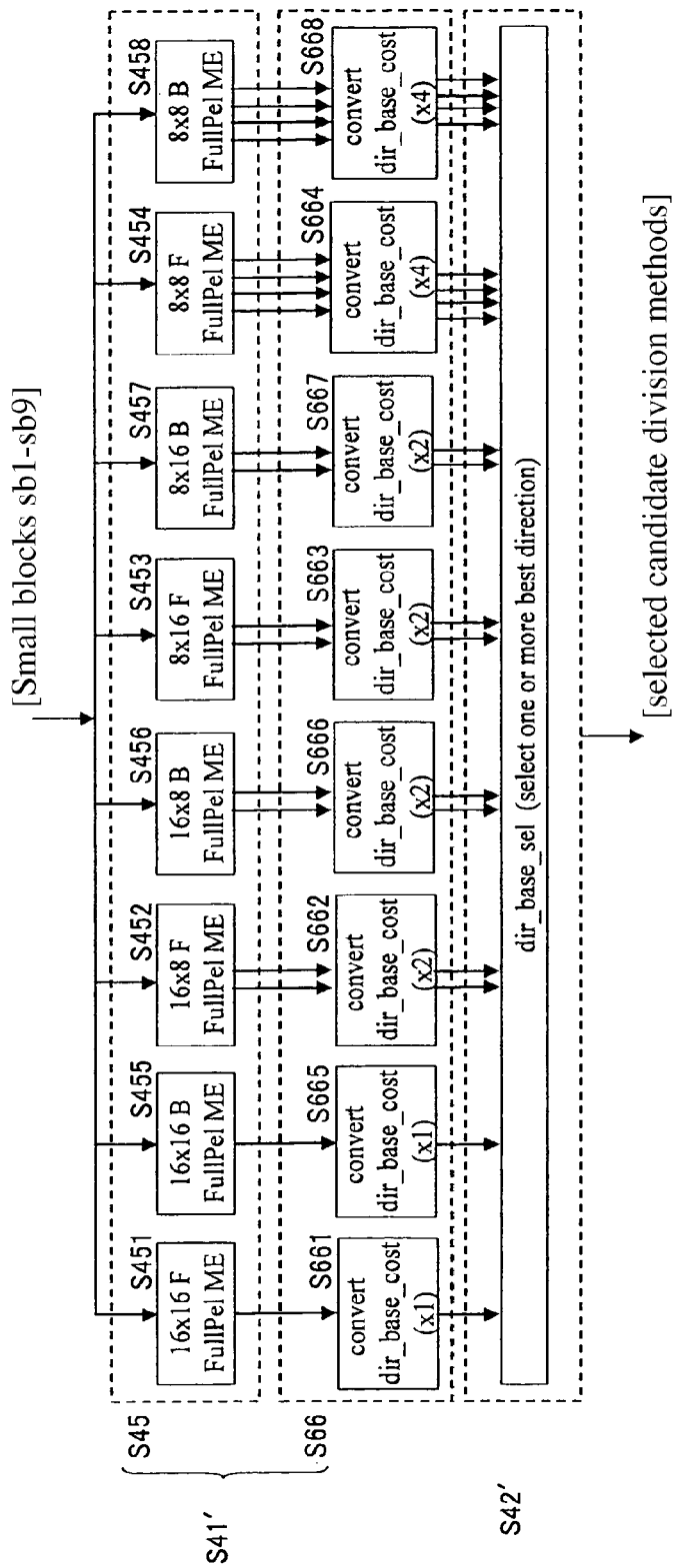
FIG. 9 is a diagram showing a modified example of the process flow of the full-pel prediction portion and the candidate division method selecting portion.
Figure 10:
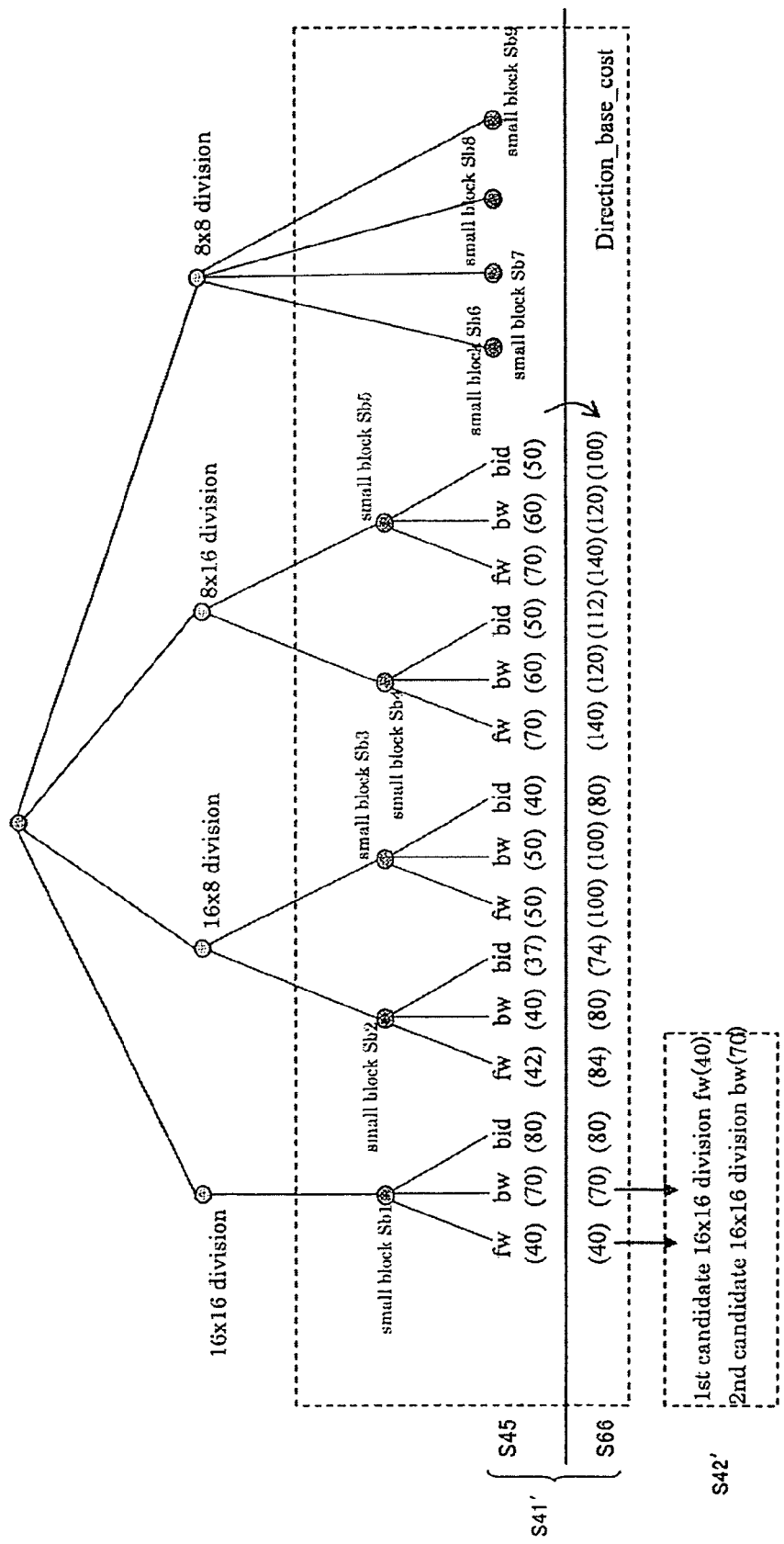
FIG. 10 is a diagram showing a coding cost conversion and a method for selecting candidate division methods that are performed by a coding cost converting portion and the candidate division method selecting portion.
Figure 11:
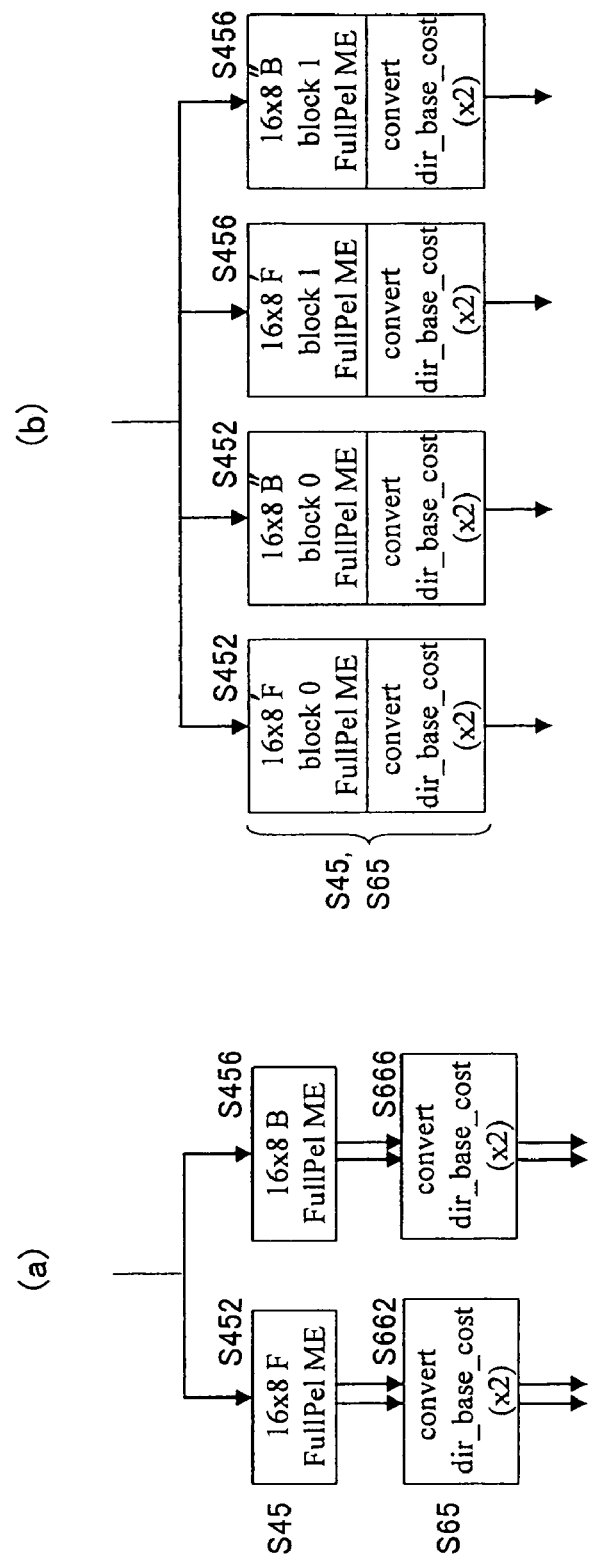
FIG. 11 is a diagram showing modified examples of the process flow of the full-pel prediction portion and the coding cost converting portion.
Figure 12:
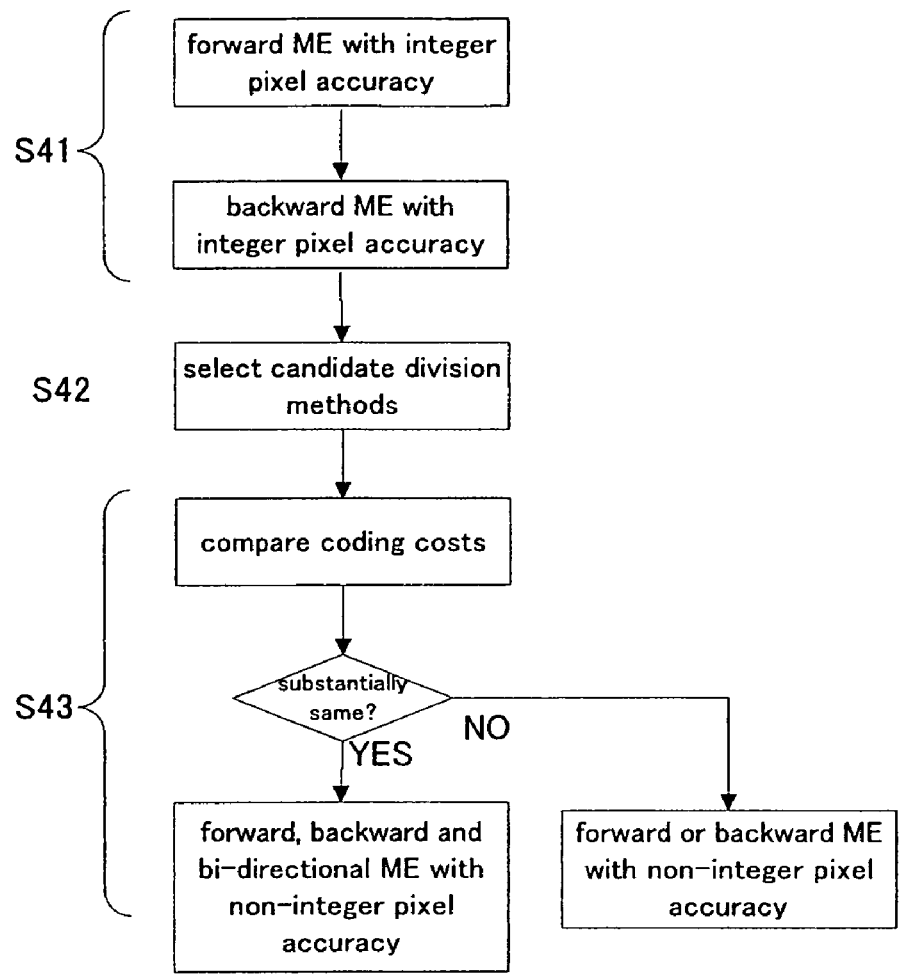
FIG. 12 is a process flow chart according to a first embodiment of the present invention.

A modified example of the full-pel prediction portion 13 will be described with reference to FIGS. 9 and 10. FIG. 9 is a block diagram showing a process flow of the coding mode determination for an image block. The process flow of the coding mode determination for an image block shown in FIG. 9 includes a full-pel prediction step S41', which is performed by the full-pel prediction portion 13, and a candidate division method selecting step S42', which is performed by the candidate division method selecting portion 14.

The full-pel prediction step S41' includes the small block full-pel prediction step S45 and a coding cost converting step S66.

The small block full-pel prediction step S45 performs motion estimation with integer pixel accuracy for each of the small blocks Sb1 to Sb9 of M×N ((M,N)=(16,16),(16,8),(8,16),(8,8)) (see FIG. 25), obtained by dividing an image block of 16×16 with four types of candidate division methods, to derive the coding cost and the motion vector for each of the small blocks. Specifically, the forward prediction steps S451 to S454 and the backward prediction steps S455 to S458 are performed for each of the small blocks Sb1 to Sb9. That is, in the forward prediction steps S451 to S454 and the backward prediction steps S455 to S458, the process is carried out a number of that corresponds to the number of the small blocks divided by each of the candidate division methods. In FIG. 9, this number of times is indicated by the number of arrows from the process blocks.

The coding cost converting step S66 separately converts each of the coding costs obtained by the forward prediction steps S451 to S454 and the coding costs obtained by the backward prediction steps S455 to S458 into a coding cost per image block. Specifically, the coding cost converted for each image block is a value obtained by multiplying the coding cost for each prediction method of each small block that is obtained by the small block full-pel prediction step S45, by the number of divisions of the partition concerned.

The candidate division method selecting step S42' selects the two types of candidate division methods having the smallest coding cost by comparing the coding costs per image block derived by the coding cost deriving step S47.

The process of the full-pel prediction step S41' and the candidate division method selecting step S42' will be further described in detail with reference to FIG. 10. It should be noted that as described above, the full-pel prediction step S41' includes the small block full-pel prediction step S45 and the coding cost converting step S66.

The small block full-pel prediction step S45 performs forward prediction (denoted as "fw" in FIG. 10), backward prediction (denoted as "bw" in FIG. 10) and bi-directional prediction (denoted as "bid" in FIG. 10) with integer pixel accuracy for all of the small blocks Sb1 to Sb9 to derive the coding cost for each of the reference directions. FIG. 10 shows an example of each of the coding costs. For example, in the case of the small block Sb1, the coding cost of the forward prediction is (40), and the coding cost of the backward prediction is (70).

The coding cost converting step S66 separately converts each of the coding costs obtained by the forward prediction steps S451 to S454 and the coding costs obtained by the backward prediction steps S455 to S458 into a coding cost per image block. Specifically, the coding costs of fw, bw and bid of Sb1 are multiplied by one, the coding costs of fw, bw and bid of Sb2 to Sb5 are multiplied by two, and the coding costs of fw, bw and bid of Sb6 to Sb9 are multiplied by four.

In the above-described embodiment, it was described that the full-pel prediction portion 13, which performs the full-pel prediction step S41', performs only the forward prediction steps S451 to S454 and the backward prediction steps S455 to S458 on each of the small blocks Sb1 to Sb9, as shown in FIG. 11(a) (hereinafter, referred to as "first full-pel prediction method"). Here, the full-pel prediction step S41' may further perform bi-directional prediction to derive the coding costs (hereinafter, referred to as "second full-pel prediction method"). Further, it may estimate the coding costs in the case of performing bi-directional prediction, based on the coding costs derived by the forward prediction steps S451 to S454 and the backward prediction steps S455 to S458 (hereinafter, referred to as "third full-pel prediction method").

The candidate division method selecting step S42' selects the two types of candidate division methods having the smallest coding cost by comparing the coding costs per image block derived by the full-pel prediction step S41'. In FIG. 10, fw of the 16×16 division method (coding cost (40)) and bw of the 16×16 (coding cost (70)) division method are selected as the candidate division methods.

<Effect of Encoder 1>

In the encoder 1, the candidate division method selecting step S42' selects the two types of candidate division methods having the smallest coding cost by comparing the coding costs per image block derived by the full-pel prediction step S41', and it is therefore not necessary to perform sub-pel prediction on all of the small blocks Sb1 to Sb9. Accordingly, it is possible to decrease the number of times of sub-pel prediction, thus reducing the processing amount. Furthermore, since sub-pel prediction is performed for the necessary small blocks, it is possible to maintain the coding efficiency.

Particularly, in contrast to the above-described embodiment, the prediction directions for each of the division methods are not narrowed down before the candidate division method selecting step S42' in this embodiment; that is, each of the coding costs is subjected to comparison for each of the prediction directions of each of the division methods in the candidate division method selecting step S42'. In other words, the full-pel prediction portion 13 converts the coding costs of each small block for each of the picture reference directions into the coding cost per image block to derive the coding mode, so that coding modes of different picture reference directions for a single small block are also subjected to comparison in the candidate division method selecting step S42. Therefore, in the case of the image block according to the embodiment shown in FIG. 10, fw of the 16×16 division method (coding cost(40)), which is the smallest coding cost, and bw of the 16×16 division method (coding cost(70)) are selected as the two types of candidate division methods. In the case of applying the apparatus of the above-described embodiment to the image block of this embodiment, bw is discarded for the 16×16 division method in the full-pel prediction step S41, so that the 16×8 division (bid for sb2, bid for sb3, and the coding cost is 77) is selected as the second candidate.

Additionally, as shown in FIG. 11(b), the coding cost converting step S66 may be performed in the small block full-pel prediction step S45. For example, since the conversion process for coding is simple calculation such as multiplying by two or four, this may be merged into the small block full-pel prediction step S45. Further, the converted value may be calculated for each single search location in the small block full-pel prediction step S45, or may be determined after the small block full-pel prediction step S45.

(2) Modified Example of Candidate Division Method Selecting Portion 14

The candidate division methods selected by the candidate division method selecting step S42 are not limited to two types. One to three types of candidate division methods may be selected from four types of candidate division methods.

(3) Modified Example of Sub-Pel Prediction Portion 15

3-1

In the above-described embodiment, it was described that the sub-pel prediction step S43 performs sub-pel prediction in the three types of prediction directions, namely, forward prediction, backward prediction and bi-directional prediction for each of the small blocks divided with the two types of candidate division methods selected in the candidate division method selecting step S42.

Here, the sub-pel prediction step S43 may determine which of the three prediction directions should be actually carried out for each of the candidate division methods based on a result of the motion estimation by the full-pel prediction step S41, and may perform sub-pel prediction only on the determined direction. This will be described with reference to FIG. 12.

First, the full-pel prediction step S41 performs forward and backward motion estimations with integer pixel accuracy for each of the partitions. The candidate division method selecting step S42 selects candidate division methods based on the motion estimations with integer pixel accuracy in the full-pel prediction step S41. Furthermore, the sub-pel prediction step S43 determines the prediction direction for sub-pel prediction on the small blocks divided with the candidate division methods selected in the candidate division method selecting step S42.

More specifically, the prediction direction is determined according to the following three cases.

The first case is a case where the coding cost of the forward prediction and the coding cost of the backward prediction substantially match. In this case, motion estimation with non-integer pixel accuracy is performed for three types of prediction directions, namely, forward prediction, backward prediction and bi-directional prediction. Alternatively, in this case, motion estimation with non-integer pixel accuracy may be performed only for two types of prediction directions, namely, forward prediction and backward prediction.

The second case is a case where different to the first case, the coding cost of the forward prediction is smaller than the coding cost of the backward prediction. In this case, motion estimation with non-integer pixel accuracy with forward prediction is performed, and motion estimations with non-integer pixel accuracy with backward prediction and bi-directional prediction are not performed.

The third case is a case where different to the first case the coding cost of the forward prediction is larger than the coding cost of the backward prediction. In this case, the motion estimation with non-integer pixel accuracy with backward prediction is performed, and the motion estimations with non-integer pixel accuracy with forward prediction and bi-directional prediction are not performed.

The reason that only the prediction direction having the smaller coding cost is selected when the coding cost of the forward prediction and the coding cost of the backward prediction are different as in the second and the third cases is that, if the coding cost of one of them is larger than the other, then the coding cost cannot be expected to become smaller in bi-directional prediction.

As described above, by making a determination according to the above-described three cases, it is possible to perform motion estimation with non-integer pixel accuracy by referencing the necessary reference direction, so that it is possible to reduce the processing amount for sub-pel prediction, thus shortening the processing time of sub-pel prediction.

3-2

In addition to the determination according to (3-1) above, the sub-pel prediction step S43 may further perform sub-pel prediction for a subset of the candidate division methods selected in the candidate division method selecting step S42. That is, in this case, a subset of the candidate division methods selected in the candidate division method selecting step S42 may not be subjected to sub-pel prediction. That is, it is not necessary to carry out sub-pel prediction for all of the coding modes selected from a plurality of coding modes, thus making it possible to reduce the processing amount. Furthermore, it is also possible to select at least a subset of the subset of coding modes such that the processing amount is maintained constant.

For example, based on the prediction direction determined according to (3-1) above, the necessary processing amount is estimated for each of the small blocks that are subjected to sub-pel prediction. Furthermore, the candidates for small blocks on which sub-pel prediction is performed are narrowed down in such a manner that the total necessary processing amount for the entire image block does not exceed the margin for the processing amount allocated to sub-pel prediction of the image block. Therefore, although the sub-pel prediction step S43 may not select all of the coding modes (specifically, the candidate division methods) selected by the candidate division method selecting step S42, this is not much of a problem since candidate division methods having the lower coding cost are selected even in that case.

Figure 13:
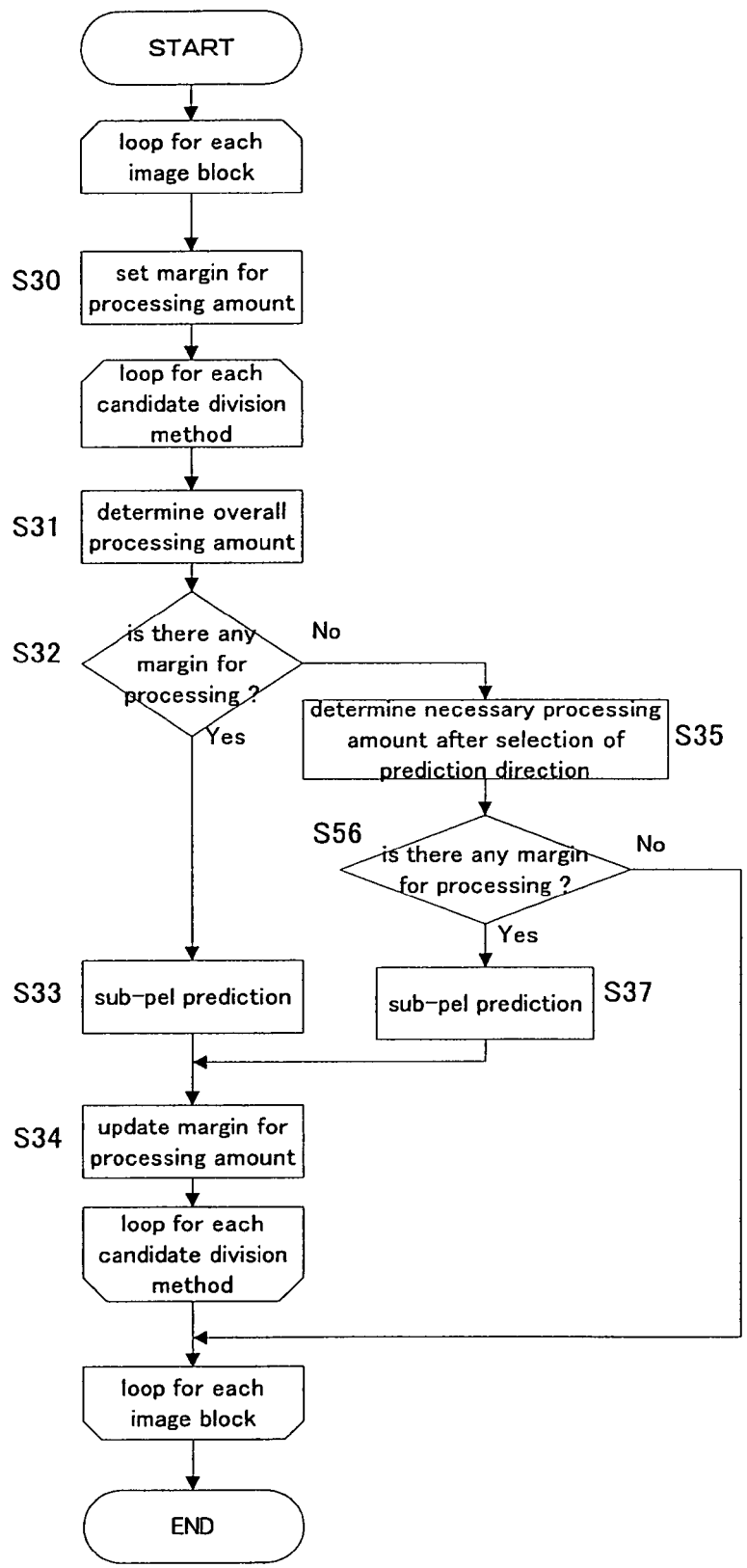
FIG. 13 is a process flow of a sub-pel prediction portion according to the first embodiment of the present invention.

This will be described more specifically using a process flow of the operation of sub-pel prediction shown in FIG. 13. For the sake of explanation, the following description is based on the assumption that the necessary processing amount for the small block Sb1 of 16×16 per prediction direction is [4], each of the necessary processing amounts for the small blocks Sb2 to Sb5 of 16×8 and 8×16 is [2], and each of the necessary processing amounts for the small blocks Sb6 to Sb9 of 8×8 is [1]. This is because the necessary processing amount of sub-pel prediction for a small block per prediction direction is proportional to the number of pixels of the small block.

The process is performed for each image block (steps S30 to S37). First, the processing amount allocated to sub-pel prediction on an image block of 16×16 is set as a margin for the processing amount (step S30). Next, the process for each candidate division method is performed (steps S31 to S37).

The process for each candidate division method is carried out for the candidate division methods selected in the candidate division method selecting step S42, in ascending order of their coding costs obtained by the full-pel prediction. With the method described under (3-1), the prediction direction of sub-pel prediction is selected for each of the small blocks, and the necessary processing amount of sub-pel prediction for each small block is estimated. Furthermore, the estimated necessary processing amounts for the respective small blocks are summed up for each candidate division method, and the overall necessary processing amount for the candidate division method is calculated (step S31).

For example, when a single prediction direction is selected for the small block Sb2 of 16×8 (e.g., the second case or the third case of (3-1)), a value of [2], obtained by multiplying a necessary processing amount of [2] for the small block Sb2 per prediction direction by a constant of [1] determined from the prediction direction, is calculated as the necessary processing amount for the small block Sb2. Furthermore, when three prediction directions are selected (e.g., the first case of (3-1)), a value of [4], obtained by multiplying a necessary processing amount of [2] for the small block Sb2 per prediction direction by a constant of [2] determined from the prediction direction, is calculated as the necessary processing amount for the small block Sb2. Here, the reason why the constant determined from the prediction direction is [2] when three prediction directions are selected is that the prediction can be carried out using the results of forward prediction and backward prediction, without performing the motion estimation process for bi-directional prediction (the method described with reference to FIG. 5(b) or 5(c) can be used for sub-pel prediction). The thus estimated necessary processing amounts for the respective small blocks are summed up for each division method, and the necessary processing amount for the candidate division method is calculated.

The calculated necessary processing amount is compared with the margin for the processing amount set in the step S30, and, if the necessary processing amount is not larger than the margin for the processing amount, then it is determined that there is a margin for processing (step S32).

If it is determined that there is no margin for processing, then a single prediction direction that is determined to exhibit the smallest coding cost based on full-pel prediction is selected for each of the small blocks (step S35), the necessary processing amounts for the respective small blocks are summed up for each candidate division method, and the necessary processing amount for the candidate division method is calculated (step S35). For example, for the small blocks Sb2 and Sb3 of 16×8, necessary processing amounts of [2] of the small block Sb2 and Sb3 per prediction direction are summed up, and the necessary processing amount for the 16×8 candidate division method is calculated as [4]. The calculated necessary processing amount is compared with the margin for the processing amount set in the step S30, and, if the necessary processing amount is smaller than the margin for the processing amount, then it is determined that there is a margin for processing (step S36).

If it is determined that there is a margin for processing, then sub-pel prediction is performed for a single prediction direction that is determined to exhibit the smallest coding cost based on full-pel prediction (step S37). Further, the difference between the margin for the processing amount and the necessary processing amount for the candidate division method that has been calculated in the step S35 is set as a margin for the processing amount (step S34), and the process for the next candidate division method is started.

If it is determined that there is no margin for processing in the step S36, then no sub-pel prediction is performed, and the process of the next image block is started.

3-2-1

Next, a first specific example will be described with reference to FIG. 14. In this specific example, in the candidate division method selecting step S42, the 16×16 division method (coding cost (40)) is selected as the first candidate, and the 16×8 division method (coding cost (43)) is selected as the second candidate.

Figure 14:
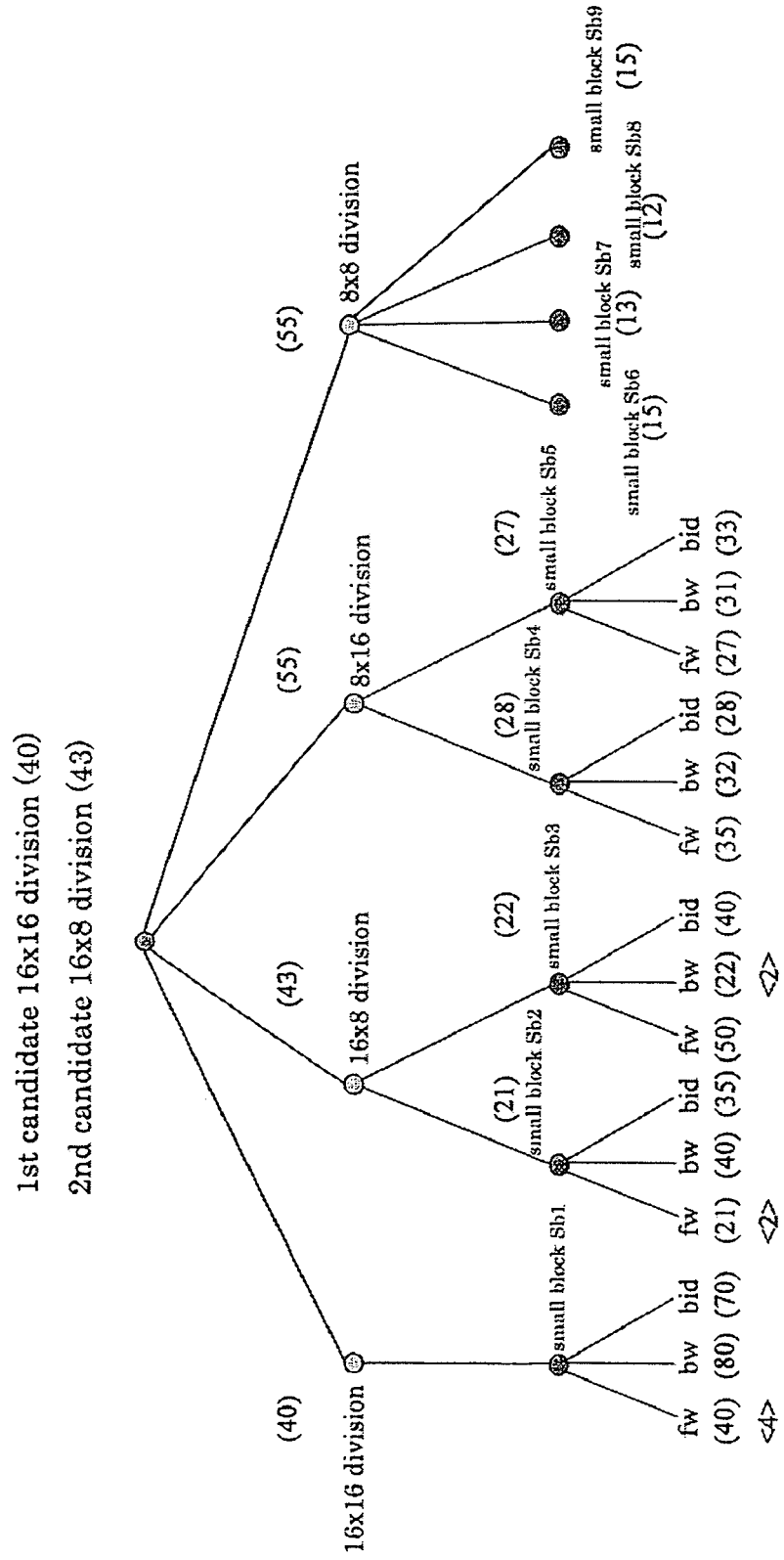
FIG. 14 is a diagram showing an example of a processing amount allocation for sub-pel prediction.

As shown in FIG. 14, the process is performed for each image block (steps S30 to S37). First, the processing amount allocated to sub-pel prediction on an image block of 16×16 is set as a margin for the processing amount of [8] (step S30). Next, the process for each candidate division method is performed (steps S31 to S37).

The process for each candidate division method is performed for the candidate division methods selected in the candidate division method selecting step S42, in ascending order of their coding costs obtained by the full-pel prediction.

First, the 16×16 division method (coding cost (40)) is subjected to the process. Specifically, in the 16×16 division method, the prediction direction of sub-pel prediction for the small block Sb1 is selected first with the method described under (3-1). This case is the second case, in which the coding cost of the forward prediction fw is smaller than the coding cost of the backward prediction bw. Therefore, motion estimation with non-integer pixel accuracy is performed with forward prediction, and motion estimation with non-integer pixel accuracy is not performed with backward prediction and bi-directional prediction. As a result, a necessary processing amount of [4] for sub-pel prediction on the small block Sb1 is estimated. Further, a necessary processing amount of [4] for the 16×16 division method is calculated (step S31).

The calculated necessary processing amount [4] is compared with the margin for the processing amount [8] set in the step S30, and it is determined that there is a margin for processing, since the necessary processing amount [4] is not larger than the margin for the processing amount [8] (step S32).

In this case, sub-pel prediction is performed for the small block Sb1 for the prediction direction (fw) selected according to (3-1) (step S33). Furthermore, the difference between the margin for the processing amount [8] and the necessary processing amount [4] for the candidate division method is set as a margin for the processing amount of [4] (step S34).

Next, the 16×8 division method (coding cost (42)) is subjected to the process. Specifically, in the 16×8 division method, as the second case, the prediction direction of sub-pel prediction for the small block Sb2 is selected (fw) with the method described under (3-1) first, and a necessary processing amount of [2] for sub-pel prediction on the small block Sb2 is estimated. Further, as the third case, the prediction direction of sub-pel prediction on the small block Sb3 is selected (bw), and a necessary processing amount of [2] for sub-pel prediction on the small block Sb3 is estimated. Moreover, the estimated necessary processing amounts [2] of the small block Sb2 and the small block Sb3 are summed up, and a necessary processing amount of [4] for the 16×8 candidate division method is calculated (step S31).

The calculated necessary processing amount [4] is compared with the margin for the processing amount [4] set in the step S34, and it is determined that there is a margin for processing, since the necessary processing amount [4] is not larger than the margin for the processing amount [4] (step S32).

In this case, sub-pel prediction is performed for the small block Sb2 for the prediction direction (fw) selected according to (3-1), and furthermore, sub-pel prediction is performed for the small block Sb3 for the prediction direction (bw) selected according to (3-1) (step S33).

Further, the difference between the margin for the processing amount [4] and the necessary processing amount [4] for candidate division method that has been set in the step S35 is set as a margin for the processing amount (step S34). However, since the value is [0], no process is performed for the next candidate division method.

3-2-2

Next, a second specific example will be described with reference to FIG. 15. In this specific example, in the candidate division method selecting step S42, the 16×16 division method (coding cost (40)) is selected as the first candidate, and the 16×8 division method (coding cost (43)) is selected as the second candidate.

Figure 15:
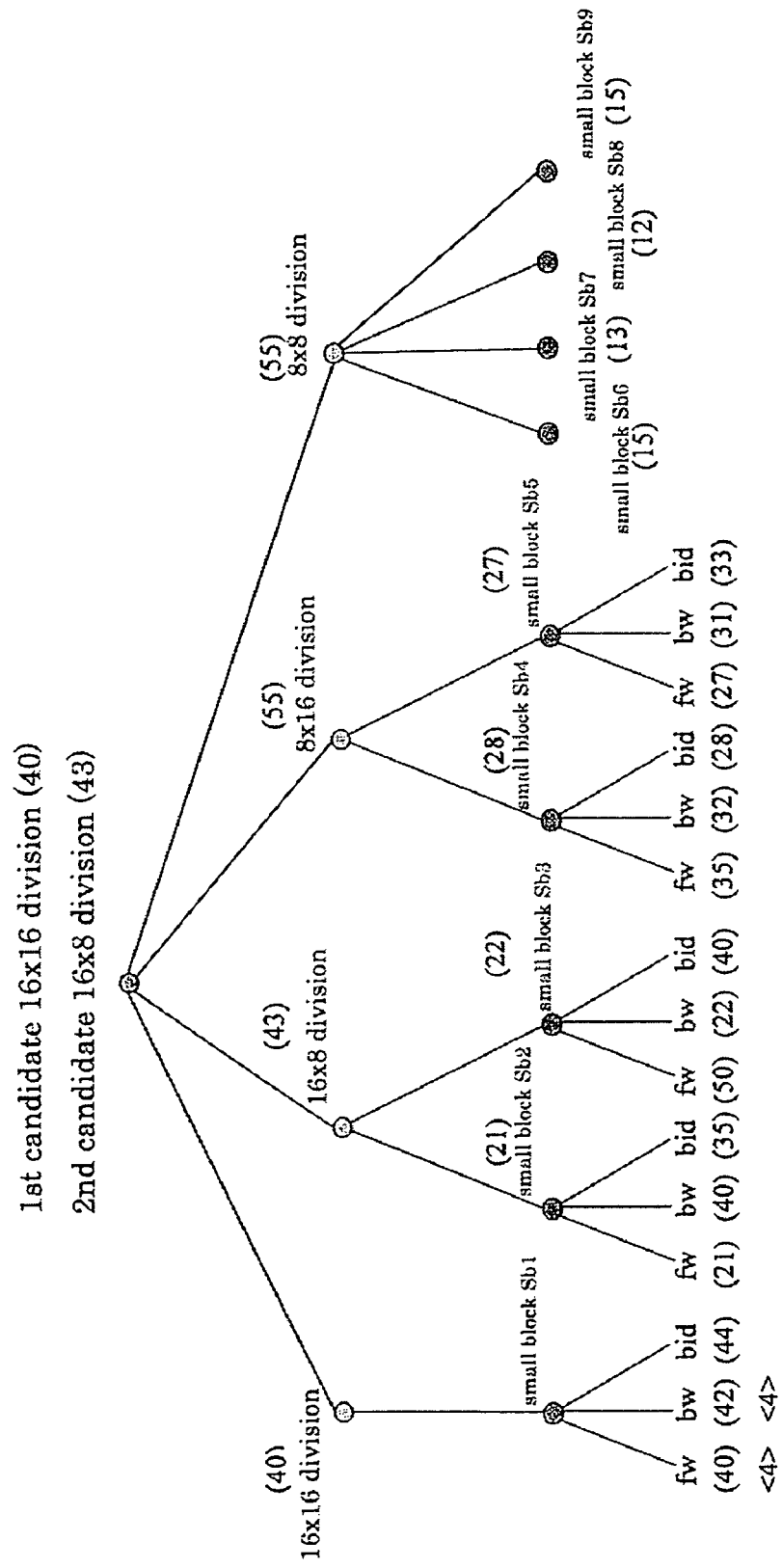
FIG. 15 is a diagram showing an example of a processing amount allocation for sub-pel prediction.

As shown in FIG. 15, the process is performed for each image block (steps S30 to S37). First, the processing amount allocated to sub-pel prediction on an image block of 16×16 is set as a margin for the processing amount of [8] (step S30). Next, the process for each candidate division method is performed (steps S31 to S37).

The process for each candidate division method is performed for the candidate division methods selected in the candidate division method selecting step S42, in ascending order of their coding costs obtained by the full-pel prediction.

First, the 16×16 division method (coding cost (40)) is subjected to the process. Specifically, in the 16×16 division method, the prediction direction of sub-pel prediction on the small block Sb1 is selected with the method described under (3-1) first. This is the first case, in which the coding cost of the forward prediction fw and the coding cost of the backward prediction bw substantially match. Therefore, motion estimation with non-integer pixel accuracy is performed for the two types of prediction directions of the forward prediction fw and the backward prediction bw. As a result, a necessary processing amount of [4] for sub-pel prediction on the forward prediction fw for the small block Sb1 and a necessary processing amount of [4] for sub-pel prediction for the forward prediction bw on the small block Sb1 are estimated. The estimated necessary processing amounts [4] for the small block Sb1 are summed up for each candidate division method, and a necessary processing amount of [8] for the candidate division method is calculated (step S31).

The calculated necessary processing amount [4] is compared with the margin for the processing amount [8] set in the step S30, and it is determined that there is a margin for processing, since the necessary processing amount [4] is not larger than the margin for the processing amount [8] (step S32).

In this case, sub-pel prediction is performed for the small block Sb1 for the prediction direction (fw) selected according to (3-1), and furthermore, sub-pel prediction is performed for the small block Sb1 for the prediction direction (bw) (step S33).

Further, the difference between the margin for the processing amount [8] and the necessary processing amount [8] for the candidate division method that has been set in the step S55 is set as a margin for the processing amount (step S34). However, since this value is [0], no process is performed for the next candidate division method.

In this specific example, although the 16×8 division method (coding cost (42)) is a candidate division method selected in the candidate division method selecting step S42, sub-pel prediction is not performed for this method.

Effect of (3-2)

With this sub-pel prediction portion 15, it is possible to control the processing amount for sub-pel prediction. In particular, performing control to minimize the processing amount provides the effect of shortening the processing time in the case of a software encoder, and the effect of saving the power consumption in the case of a hardware encoder. Moreover, when it is necessary to maintain the processing time constant, for example, in the case of a real-time encoder, it is possible to increase the compression capability by allocating the margin for the processing amount to other candidates.

3-3

In the above-described embodiment, it was described as follows. That is, the division method determining step S44 determines the prediction direction of each small block, based on the smallest coding cost of each of the small blocks divided with the two types of candidate division methods selected in the candidate division method selecting step S42, and derives the coding cost per image block. Furthermore, it determines the candidate division method having the smallest coding cost as the division method for the image block by comparing the derived coding costs per image block for the two types of candidate division methods.

Here, the candidate division methods selected by the candidate division method selecting step S42 are not limited to two types, and a larger number of candidates may be selected.

Additionally, the division method determining step S44 may select a larger number of division methods for the image block, instead of determining a single division method. For example, the division method determining step S44 may select two coding modes, and another step may determine the final coding mode.

(4) Other Modified Examples 4-1

It was described that the full-pel prediction portion 13 performs motion estimation with integer pixel accuracy, and the sub-pel prediction portion 15 performs motion estimation with non-integer pixel accuracy. Here, the accuracy of motion estimation is not limited to these.

For example, the full-pel prediction portion 13 may perform a simple motion estimation, and the sub-pel prediction portion 15 may perform a complex motion estimation.

More specifically, "complex motion estimation" refers to motion estimation that is more complex than a simple motion estimation. For example, the complex motion estimation may be motion estimation with a finer accuracy (e.g., non-integer pixel accuracy such as ½ pixel accuracy and ¼ pixel accuracy) as compared to a simple motion estimation with integer pixel accuracy, motion estimation with a finer accuracy as compared to a simple motion estimation with non-integer pixel accuracy, or motion estimation in which a finer image is referenced as compared to a simple motion estimation in which a reduced image (image from which pixel information has been culled) is referenced.

Moreover, the simple motion estimation may be motion estimation with, for example, two pixel accuracy or ½ pixel accuracy for a reduced image.

Accordingly, it is possible to reduce the processing amount for the complex motion estimation, and to enjoy the effect of an appropriate motion estimation by the complex motion estimation.

In addition, although the coding mode is selected with motion estimation with two phases, the selection may be performed with a larger number of phases.

For example, the coding mode may be selected with motion estimation with three accuracy phases of, for example, integer pixel accuracy, ½ pixel accuracy and ¼ pixel accuracy.

4-2

The full-pel prediction portion 13 or the sub-pel prediction portion 15 may change the method of motion estimation in such a manner that the processing amount for each motion estimation is maintained constant.

Conventionally, a predetermined processing time is allocated to each motion estimation process, and the motion estimation process is performed for fixedly selected partition sizes and reference pictures within such a predetermined processing time. In this case, the processing time is allocated assuming a case where the processing amount is largest (the worst case), so that, if the object of process is not the worst case, then a margin is produced in the processing time, hindering the efficient motion estimation process.

Therefore, in the present invention, an efficient motion estimation process is performed by changing the method of motion estimation when there is a margin for processing. Here, whether there is any margin for processing is determined, for example, according to the image attribute of an input image constituted by image blocks. The image attribute is, for example, the size of the image, the coding method (e.g., the picture type (I-picture, P-picture, B-picture)) of the image, the format (e.g., the scanning method (progressive, interlaced) and the chroma format) of the image, or the motion amount of the image.

4-2-1

For example, the method of motion estimation (e.g., the number and the direction of reference pictures, the variation of the partition sizes for which motion estimation is performed, and the range for motion search) is changed such that the product of the size of an input image constituted by image blocks, the number of the reference pictures and the number of the partition sizes is substantially constant. More specifically, when the size of an input image is small, it is possible to perform the process of full-pel prediction or sub-pel prediction more accurately, by increasing the number of the reference pictures or the number of the partition sizes.

4-2-2

Further, the processing amount for motion estimation for each picture may be maintained substantially constant, for example by rendering the number of the reference pictures for B-pictures smaller than those for P-pictures. More specifically, the following variations are conceivable. <1> The preceding four pictures are referenced for P-pictures, and the preceding two pictures and subsequent two pictures are referenced for B-pictures. <2> The preceding three pictures are referenced for P-pictures, and the preceding two pictures and subsequent one picture are referenced for B-pictures. <3> The preceding two pictures are referenced for P-pictures, and the preceding one picture and subsequent one picture are referenced for B-pictures.

4-2-3

The processing amount for motion estimation for each picture may also be maintained substantially constant, for example, by rendering the number of partition sizes of B-pictures smaller than that of P-pictures. More specifically, the following variations are conceivable. <1> The preceding one picture is referenced for P-pictures, and prediction is performed for four partition sizes of 16×16, 16×8, 8×16 and 8×8. On the other hand, two of the above-described four sizes are selected for B-pictures, and forward prediction and backward prediction are performed for both of them. <2> The subsequent one picture is referenced for P-pictures, and prediction is performed for four partition sizes of 16×16, 16×8, 8×16 and 8×8. On the other hand, two of the above-described four sizes are selected for B-pictures, and forward prediction and backward prediction are performed for both of them.

4-2-4

Furthermore, for example, when the input image is an interlaced image, the number of reference pictures or the number of partition sizes may be smaller than those for a progressive image. The reason is that, in the case of interlacing, it is necessary to reference two fields, namely, a top field and a bottom field. More specifically, the following variations are conceivable. <1> In the case of P-pictures, the preceding two frames are referenced for progressive P-pictures, and the preceding two fields (corresponding to one frame in terms of time) are referenced for interlaced P-pictures. <2> In the case of P-pictures, the preceding one frame is referenced for progressive P-pictures, and prediction is performed for four types of partition sizes (from 16×16 to 8×8). The preceding two fields (corresponding to one frame in terms of time) are referenced for interlaced P-pictures, and prediction is performed for two types of partition sizes for each of them.

4-2-5

Furthermore, the number of reference pictures or the number of partition sizes may be varied in accordance with the motion of the image, for example. For a motion vector search, there is a method in which the processing time for searching is influenced by the magnitude of the motion vector. In the case of using such a method, when the motion is small, the processing time for each partition size and each reference picture is short. For this reason, when the motion is small, motion estimation may be carried out using a larger number of partition sizes and reference pictures. When the motion is large, on the other hand, the processing time for each motion estimation is long. Therefore, when the motion becomes large, the number of reference pictures or the number of partition sizes may be decreased.

Second Embodiment

An encoder according to a second embodiment of the present invention will be described with reference to FIGS. 16 and 17.

Figure 16:
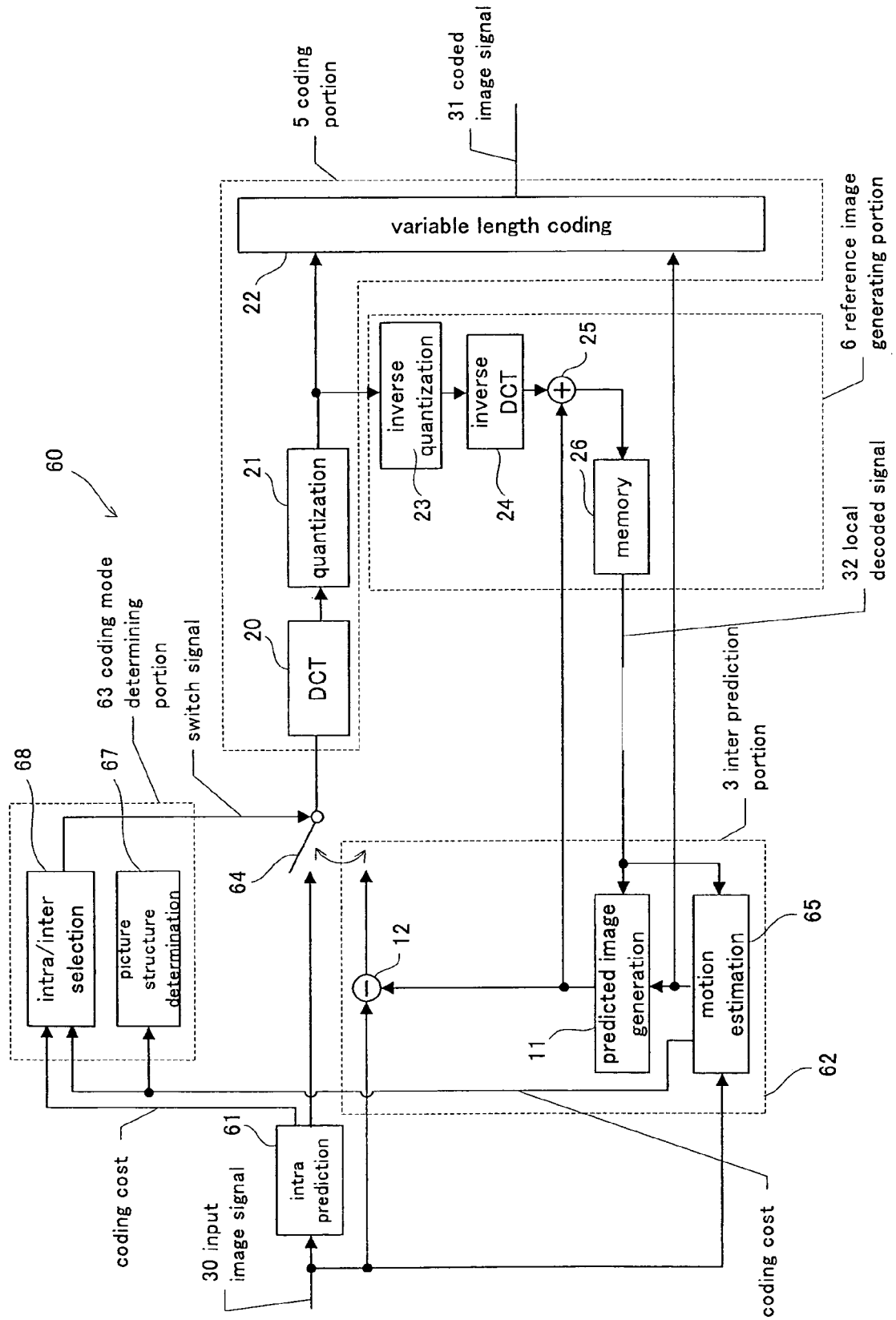
FIG. 16 is a diagram showing the configuration of an image coding apparatus according to a second embodiment of the present invention.

FIG. 16 is a block diagram illustrating the configuration of an encoder 60 according to the second embodiment of the present invention. The encoder 60 is, for example, an image coding apparatus for coding an input image signal 30 with MPEG-4, and outputting it as a coded image signal 31, and is included in a personal computer (PC), a mobile phone or the like. It is also an apparatus for coding the input image signal 30 for each image block pair 73, which has been introduced in AVC (see FIG. 30).

<Configuration of Encoder 60>

The encoder 60 shown in FIG. 16 includes: an intra prediction portion 61 that performs intra prediction of the input image signal 30; an inter prediction portion 62 that performs inter prediction of the input image signal 30; a coding mode determining portion 63; a switching portion 64 that switches between a prediction result of intra prediction and a prediction result of inter prediction; a coding portion 5 that codes an output from the switching portion 64 and outputs the coded image signal 31; and a reference image generating portion 6 that generates a local decoded signal 32 of the input image signal 30.

The intra prediction portion 61 is controlled by a control portion (not shown), and performs intra prediction on a block (a field structure block or a frame structure block) having the picture structure determined by a coding picture structure determining portion 67. As a result, the intra prediction portion 61 performs intra prediction of the input image signal 30 for each image block, and outputs a result of the intra prediction to the switching portion 64.

The inter prediction portion 62 receives the input image signal 30 as a first input and the local decoded signal 32 as a second input, and outputs a result of the inter prediction to the switching portion 64. Furthermore, the inter prediction portion 62 outputs, as a second output, information relating to coding, such as the motion vector, of the inter prediction result to the coding portion 5.

The inter prediction portion 62 includes: a motion estimation portion 65 that receives the input image signal 30 as a first input and the local decoded signal 32 as a second input and that performs motion estimation; a predicted image generating portion 11 that receives an output from the motion estimation portion 65 as a first input and the local decoded signal 32 as a second input and that outputs a predicted image; and a subtractor 12 that receives the input image signal 30 as a first input and an output from the predicted image generating portion 11 as a second input. The motion estimation portion 65 performs motion estimation to derive a coding cost. Further, of the output from the motion estimation portion 65, coding information such as the motion vector or the coding mode is also supplied to an input to a variable length coding portion 22.

The switching portion 64 receives a result of the intra prediction as a first input and a result of the inter prediction as a second input, and outputs one of the inputs to the coding portion 5, in accordance with a switch signal from the coding mode determining portion 63.

The configuration and the function of the coding portion 5 and the reference image generating portion 6 are the same as those in the above-described embodiment, and therefore the description has been omitted here.

The coding mode determining portion 63 includes a coding picture structure determining portion 67 and an intra/inter selecting portion 68. The coding picture structure determining portion 67 receives the coding cost information from the motion estimation portion 65 as an input. The coding picture structure determining portion 67 sums up the coding costs for the top and the bottom of each of the coding picture structures to determine the coding picture structure. The coding picture structure determining portion 67 outputs the determined coding picture structure to the intra/inter selecting portion 68.

The intra/inter selecting portion 68 receives, as inputs, the coding cost of intra prediction from the intra prediction portion 61 and the coding cost for inter prediction from the inter prediction portion 62. The intra/inter selecting portion 68 compares the coding costs for the intra prediction and the inter prediction to determine the coding mode. The intra/inter selecting portion 68 notifies the switching portion 64 of this result. Consequently, the switching portion 64 operates.

The control portion may be included in the coding mode determining portion 63.

Figure 17:
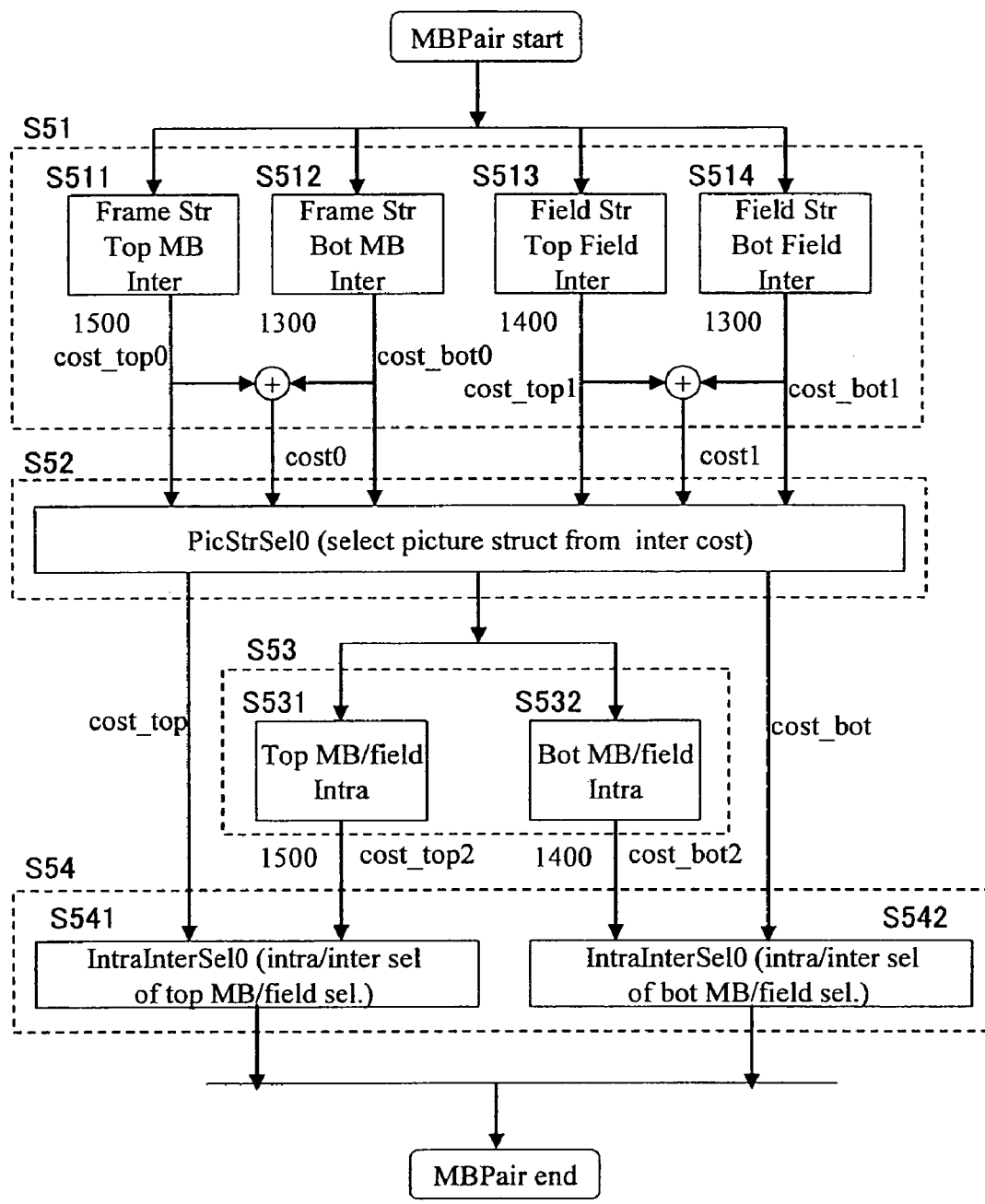
FIG. 17 is a diagram showing a process flow of an intra prediction portion, a motion estimation portion and a coding mode determining portion.

FIG. 17 is a block diagram showing a process flow of the coding mode determination (the coding picture structure determination and the coding prediction direction determination for an image block pair). The process flow shown in FIG. 17 includes an inter prediction step S51, performed by the motion estimation portion 65, a coding picture structure determining step S52, performed by the coding picture structure determining portion 67, an intra prediction step S53, performed by the intra prediction portion 61, and a coding prediction method determining step S54, performed by the intra/inter selecting portion 68.

Figure 30:
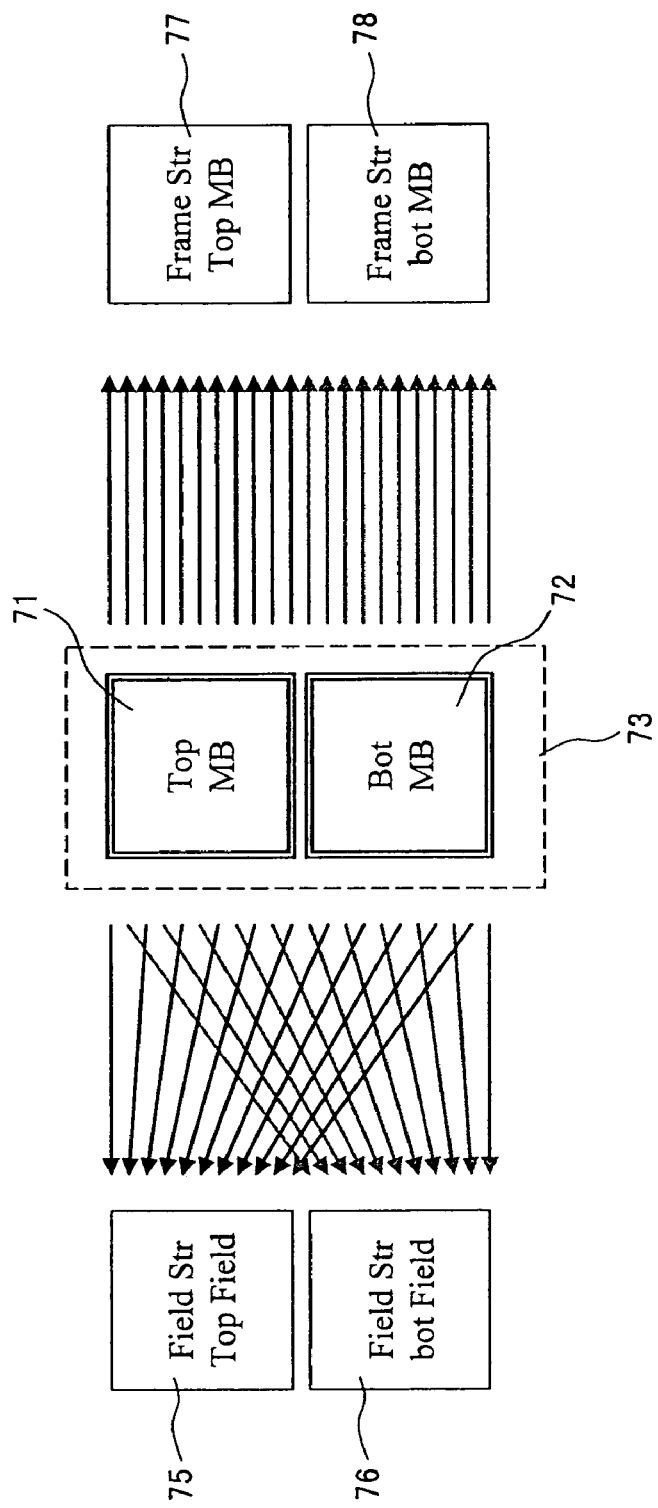
FIG. 30 is a diagram for illustrating the concept of an image block pair in MPEG-4AVC.
Figure 31:
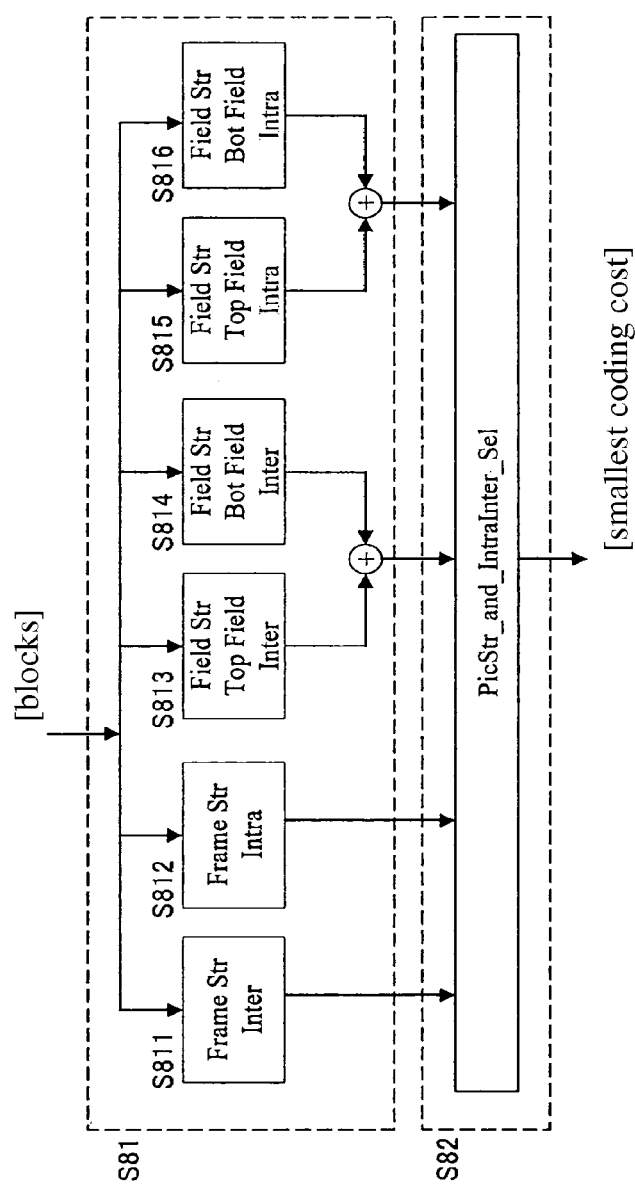
FIG. 31 is a diagram showing a conventional process flow of a coding picture structure determination and a coding prediction method determination.
Figure 32:
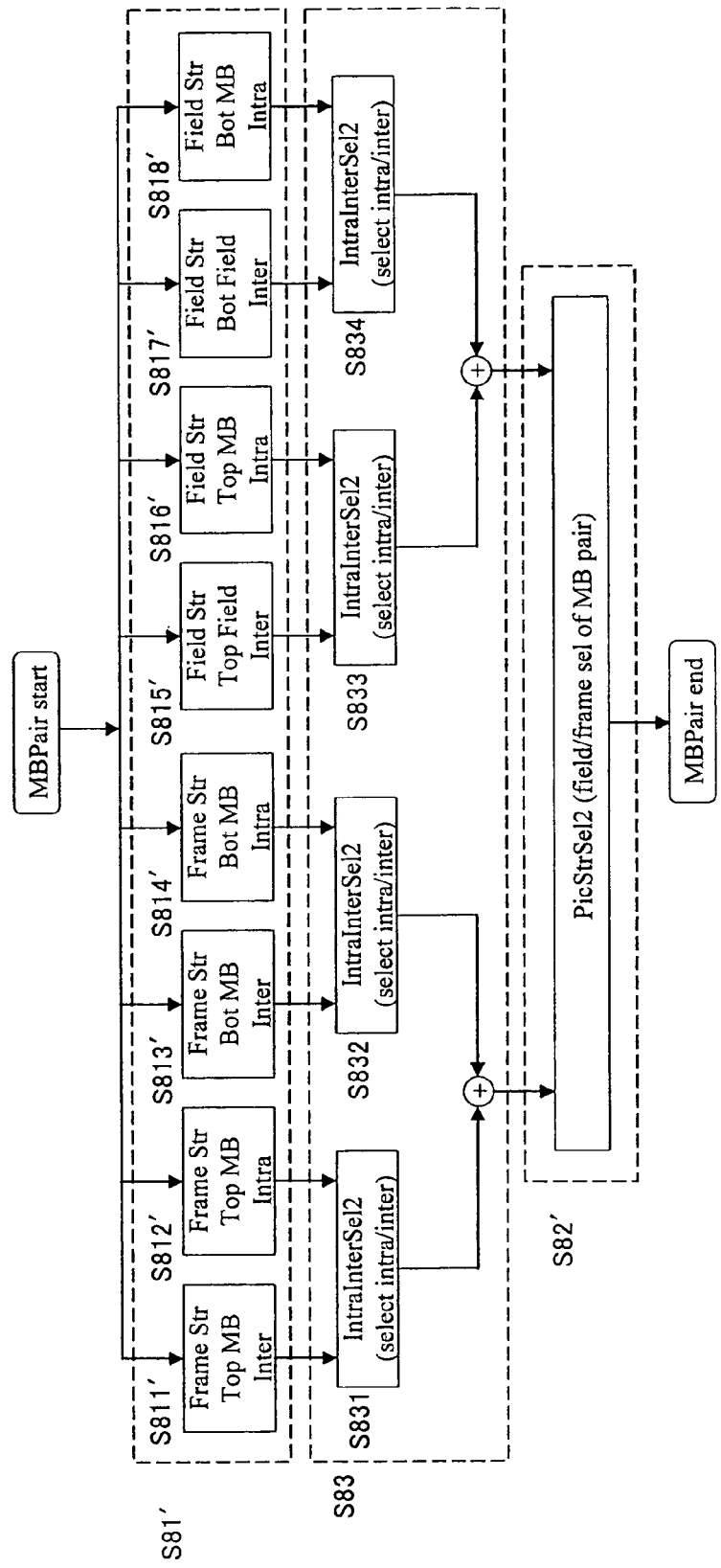
FIG. 32 is a diagram showing a process flow of a coding picture structure determination and a coding prediction method determination, which is not part of the prior art, but designed on the assumption that the prior art is applied to MPEG-4AVC.

The inter prediction step S51 derives a result of motion estimation for a pair of field structure blocks 75 and 76 and a pair of frame structure blocks 77 and 78 of the image block pair 73 (see FIG. 30). Specifically, the inter prediction step S51 includes a first inter prediction step S511 for a frame structure top MB 77, and a second inter prediction step S512 for a frame structure bottom MB 78. The first inter prediction step S511 performs inter prediction on the frame structure top MB 77 to derive a coding cost (cost top0). The second inter prediction step S512 performs inter prediction on the bottom MB 78 of the pair of frame structure blocks to derive a coding cost (cost bot0). Each of the coding costs cost top0 and cost bot0 is sent to the coding picture structure determining step S52. Furthermore, the coding costs cost top0 and cost bot0 are summed up, obtaining a coding cost of cost0 of the pair of frame structure blocks 77 and 78, and this is sent to the coding picture structure determining step S52. In this embodiment, cost top0 is 1500, cost bot0 is 1300, and cost0 is 2800. The inter prediction step S51 further includes a third inter prediction step S513 for the top MB 75 of the pair of field structure blocks 75 and 76, and a fourth inter prediction step S514 for the bottom MB 76. The third inter prediction step S513 performs inter prediction on the top MB 75 of the pair of field structure blocks 75 and 76 to derive a coding cost (cost top1). The fourth inter prediction step S514 performs inter prediction on the bottom MB 76 of the pair of field structure blocks 75 and 76 to derive a coding cost (cost bot1). Each of the coding costs cost top1 and cost bot1 is sent to the coding picture structure determining step S52. Furthermore, the coding costs cost top1 and cost bot1 are summed up, obtaining a coding cost of cost1 of the pair of field structure blocks 75 and 76, and this is sent to the coding picture structure determining step S52. In this embodiment, cost top1 is 1400, cost bot1 is 1300 and cost1 is 2700.

It should be noted that the first to fourth inter prediction steps S511 to S514 represent the entire motion estimation operation including the 16×16 division method, the 16×8 division method, the 8×16 division method and the 8×8 division method, respectively. That is, the first embodiment of the present invention can be applied to the first to fourth inter prediction steps S511 to S514. Furthermore, although the first to fourth inter prediction steps S511 to S514 may perform both full-pel prediction and sub-pel prediction, they may perform only full-pel prediction, in order to reduce the processing amount.

As described above, although only inter prediction is performed for deriving the coding cost of the coding picture structure, it is possible to achieve a sufficient accuracy, since the accuracy of judgment with inter prediction is higher than that with intra prediction.

The coding picture structure determining step S52 determines the coding picture structure of the image block pair 73 based on a result of motion estimation. Specifically, the coding picture structure determining step S52 selects frame/field by comparing the coding cost cost0 of the pair of frame structure blocks 77 and 78 and the coding cost cost1 of the pair of field structure blocks 75 and 76 that have been sent from the inter prediction step S51. In this embodiment, the coding cost cost1 (2700) of the pair of field structure blocks 75 and 76 is smaller than the coding cost cost0 (2800) of the pair of frame structure blocks 77 and 78, so that field is selected. Consequently, the inter coding cost cost top1 of the top MB 75 and the inter coding cost cost bot1 of the bottom MB 76 of the pair of field structure blocks 75 and 76 are supplied to the coding prediction method determining step S54.

The intra prediction step S53 derives a result of intra prediction on the block pair having the determined coding picture structure. Specifically, the intra prediction step S53 includes a first intra prediction step S531 for the top MB, and a second intra prediction step S532 for the bottom MB. The first intra prediction step S531 derives an intra coding cost of cost top2 for the top MB 75 of the selected pair of coding picture structure blocks (in this case, the pair of field structure blocks 75 and 76), and supplies it to the coding prediction method determining step S54. The second intra prediction step S532 derives an intra coding cost of cost bot2 for the bottom MB 76 of the selected pair of coding picture structure blocks (in this case, the pair of field structure blocks 75 and 76), and supplies it to the coding prediction method determining step S54. In this embodiment, cost top2 is 1500, and cost bot2 is 1400. Additionally, the intra prediction may be a process whose accuracy is lowered by culling pixels so as to reduce the processing amount. Furthermore, the intra for 4×4 may be omitted.

The coding prediction method determining step S54 determines the coding prediction method for each of the pair of blocks having the determined coding picture structure, based on a result of the inter prediction and a result of the intra prediction. Specifically, the coding prediction method determining step S54 includes a first coding prediction method determining step S541 for the top MB, and a second coding prediction method determining step S542 for the bottom MB. The first coding prediction method determining step S541 selects intra/inter for the top MB by comparing the inter coding cost for the top MB (specifically, the inter coding cost cost top1 of the top MB 75 of the pair of field structure blocks 75 and 76) that has been sent from the coding picture structure determining step S52 and the intra coding cost cost top2 for the top MB 75 that has been sent from the first intra prediction step S531. In this case, the inter coding cost cost top1 (1400) is smaller than the intra coding cost cost top2 (1500), and inter is selected. The second coding prediction method determining step S542 selects intra/inter for the bottom MB 76 by comparing the inter coding cost for the bottom MB (specifically, the inter coding cost cost bot1 for the bottom MB 76 of the pair of field structure blocks 75 and 76) that has been sent from the coding picture structure determining step S52 and the intra coding cost cost bot2 for the bottom MB 76 that has been sent from the second intra prediction step S532. In this case, since the inter coding cost cost bot1 (1300) is smaller than the intra coding cost cost bot2 (1400), inter is selected.

Although the coding prediction method (intra/inter) is the same for the top MB and the bottom MB in this embodiment, it may be different. However, the top MB and the bottom MB may not be coded with different coding picture structures. This is because the coding picture structure is determined in the coding picture structure determining step S52.

In this embodiment, the intra prediction step S53 performs intra prediction only on the image block pair having the coding picture structure determined by the coding picture structure determining step S52, so that the intra prediction step S53 does not need to perform intra prediction on all of the field structure blocks and the frame structure blocks. Since the number of times of intra prediction, which has a high processing load, can be reduced in this way, it is possible to reduce the processing load for determining the coding prediction method of the image block pair.

Modified Example

In the second embodiment, the contents described in the first embodiment may be applied by appropriately varying them. Here, a modified example peculiar to the second embodiment will be described.

(1)

In the above-described embodiment, it was described that the first to fourth inter prediction steps S511 to S514 may perform both full-pel prediction and sub-pel prediction.

Figure 18:
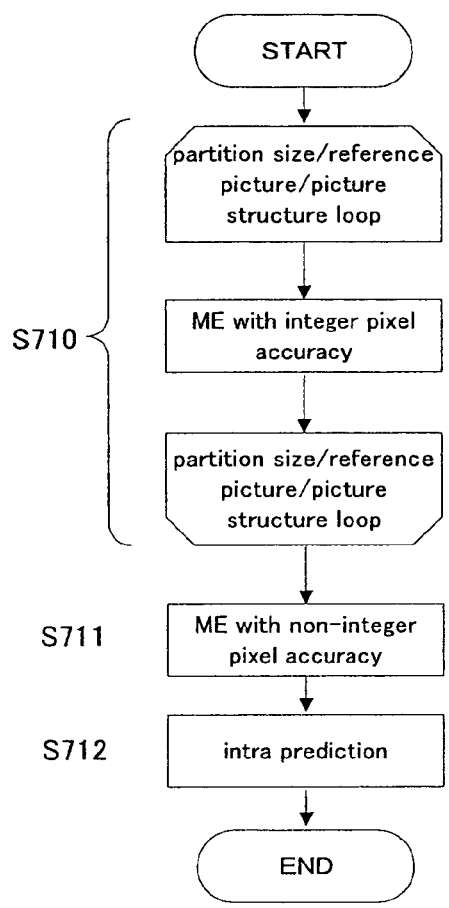
FIG. 18 is a process flow chart according to the second embodiment of the present invention.

Here, in the case of performing both full-pel prediction and sub-pel prediction, the sub-pel prediction may be performed for combinations of the partition size, the reference picture and the picture structure that have been narrowed down with the full-pel prediction. More specifically, as shown in FIG. 18, appropriate combinations of the partition size, the reference picture and the picture structure may be selected with motion estimation with integer pixel accuracy (step S710), and the selected combinations are further narrowed down with motion estimation with non-integer pixel accuracy (step S711). Moreover, intra prediction is performed for the combination of the partition size, the reference picture and the picture structure that have been obtained as a result of the narrowing (step S712), and selection of intra prediction/inter prediction is performed.

Accordingly, it is not necessary to perform motion estimation with non-integer pixel accuracy and intra prediction for all of the partition sizes, all of the reference pictures and all of the picture structures, thus making it possible to reduce the processing amount.

(2)

In the above-described embodiment, the apparatus for coding the input image signal 30 for each image block pair 73 was described. Here, coding may not be performed for each image block pair. For example, coding may be performed for each square image block. In this case, the method explained in the above-described embodiment can be applied to a rectangular field structure block pair and a rectangular frame structure block pair.

Third Embodiment

An encoder according to a third embodiment of the present invention will be described with reference to FIGS. 19 to 20.
<Configuration of Encoder 90 >

Figure 19:
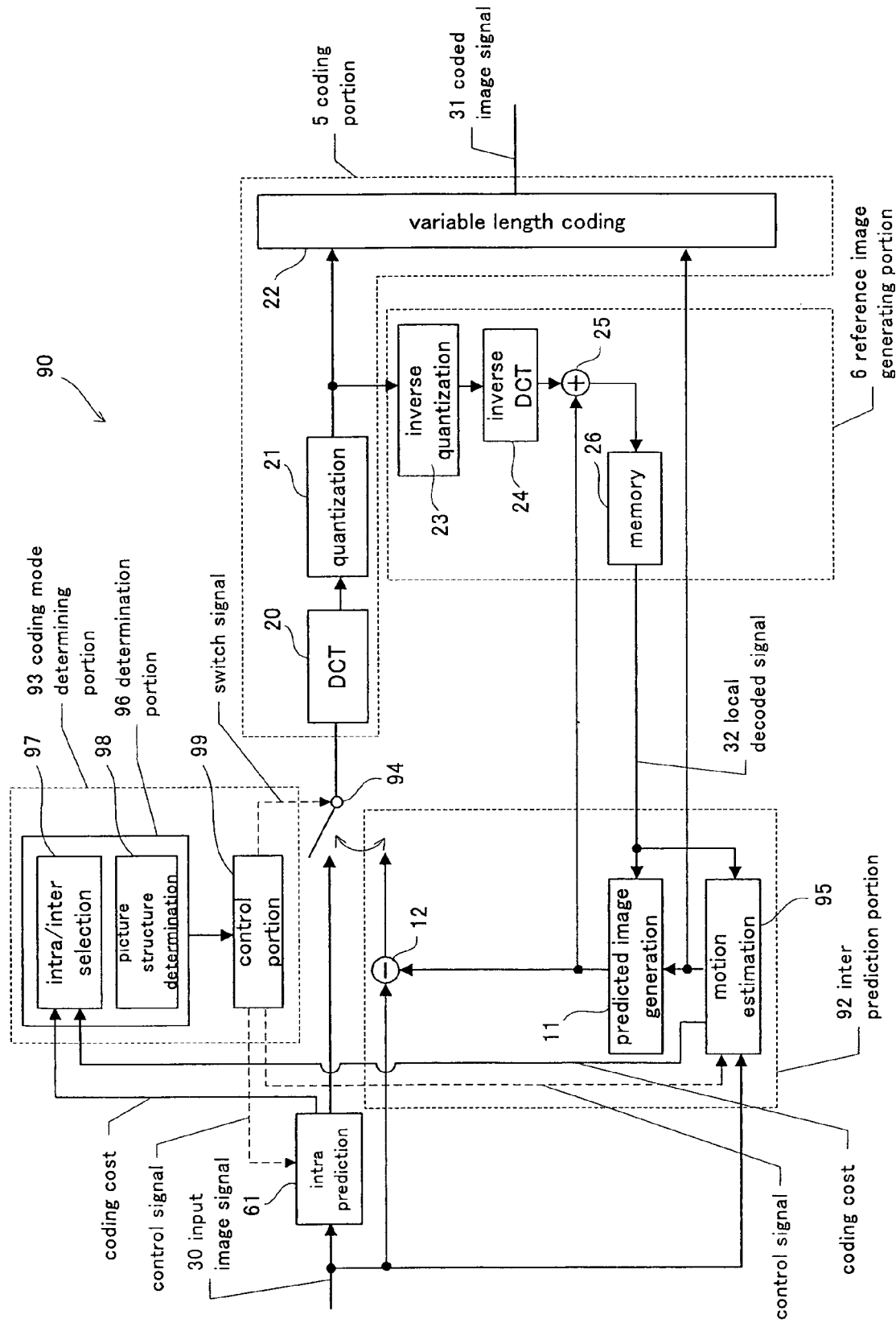
FIG. 19 is a diagram showing the configuration of an image coding apparatus according to a third embodiment of the present invention.

An encoder 90 shown in FIG. 19 includes: an intra prediction portion 91 that performs intra prediction of an input image signal 30; an inter prediction portion 92 that performs inter prediction of the input image signal 30; a coding mode determining portion 93; a switching portion 94 that switches between a prediction result of intra prediction and a prediction result of inter prediction; a coding portion 5 that codes an output from the switching portion 94 and outputs a coded image signal 31; and a reference image generating portion 6 that generates a local decoded signal 32 of the input image signal 30.

The intra prediction portion 91 can perform simple intra prediction and complex intra prediction. The simple intra prediction is, for example, intra prediction on a compressed image, and the complex intra prediction is, for example, intra prediction on an uncompressed image. The intra prediction portion 91 is controlled by a control portion 99, which is described below, in the coding mode determining portion 93, and performs simple intra prediction to derive a coding cost. Consequently, the intra prediction portion 91 performs intra prediction on the input image signal 30 for each image block, and outputs a result of the intra prediction to the switching portion 94.

The inter prediction portion 92 receives the input image signal 30 as a first input and the local decoded signal 32 as a second input, and outputs a result of the inter prediction to the switching portion 94. Furthermore, the inter prediction portion 92 outputs, as a second output, information relating to coding, such as the motion vector, of the inter prediction result to the coding portion 5.

The inter prediction portion 92 is made up of: a motion estimation portion 95 that receives the input image signal 30 as a first input and the local decoded signal 32 as a second input and that performs motion estimation; a predicted image generating portion 11 that receives an output from the motion estimation portion 95 as a first input and the local decoded signal 32 as a second input and that outputs a predicted image; and a subtractor 12 that receives the input image signal 30 as a first input and an output from the predicted image generating portion 11 as a second input. The motion estimation portion 95 performs full-pel inter prediction or sub-pel inter prediction to derive a coding cost. Further, of the output from the motion estimation portion 95, coding information such as the motion vector or the coding mode is also supplied to an input to a variable length coding portion 22.

The switching portion 94 receives a result of the intra prediction as a first input and a result of the inter prediction as a second input, and outputs one of the inputs to the coding portion 5, in accordance with a switch signal from the coding mode determining portion 93.

The configuration and the function of the coding portion 5 and the reference image generating portion 6 are the same as those in the above-described embodiment, and therefore the description has been omitted here.

The coding mode determining portion 93 includes a determination portion 96 and a control portion 99. The determination portion 96 has an intra/inter selecting portion 97 and a coding picture structure determining portion 98. The determination portion 96 receives, as inputs, a coding cost from the motion estimation portion 95 and a coding cost from the intra prediction portion 91. The intra/inter selecting portion 97 determines intra/inter. The coding picture structure determining portion 98 determines field/frame. The control portion 99 controls the intra prediction portion 91 or the motion estimation portion 95 to perform motion estimation for an image block pair 73 having the determined coding picture structure. That is, the control portion 99 either lets the intra prediction portion 91 perform complex intra prediction, or the motion estimation portion 95 perform sub-pel inter prediction. The control portion 99 further operates the switching portion 94 to code a result of the intra prediction or a result of the inter prediction.

The control portion may be included in any part of the encoder 90. It may not be included in the coding mode determining portion 93.

Figure 20:
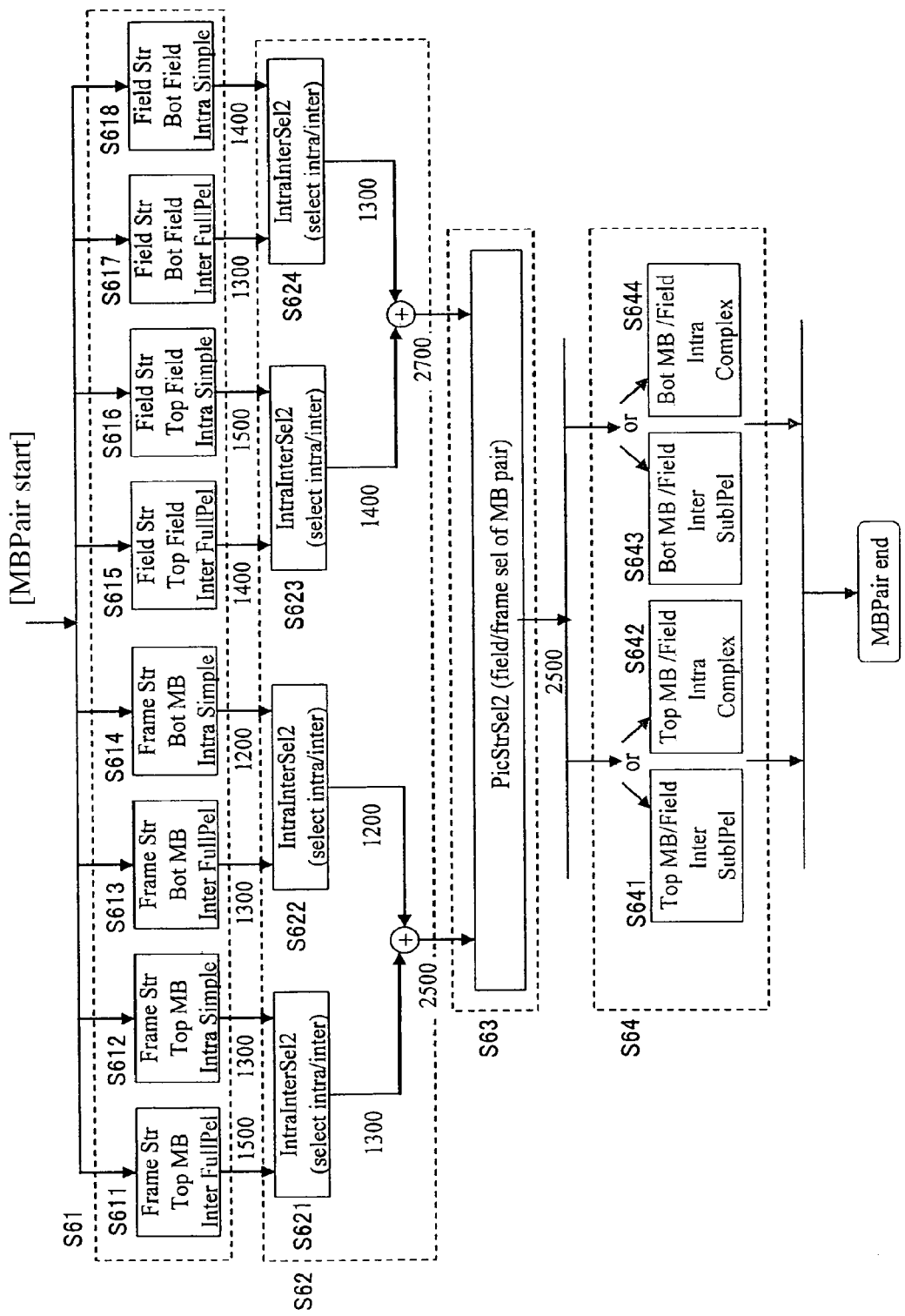
FIG. 20 is a diagram showing a process flow of an intra prediction portion, a motion estimation portion and a coding mode determining portion.

FIG. 20 is a process operation flow of the coding mode determination for the image block pair 73. This process operation includes a simple motion estimation step S61, which is performed by the intra prediction portion 91 or the motion estimation portion 95, an intra/inter selecting step S62, which is performed by the intra/inter selecting portion 97, and a coding picture structure determining step S63, which is performed by the coding picture structure determining portion 98, for the block pair 73. Additionally, it includes a complex motion estimation step S64, which is performed by the intra prediction portion 91 or the motion estimation portion 95, next to the coding picture structure determining step S63.

The simple motion estimation step S61 carries out full-pel inter prediction and simple intra prediction on the top MB and the bottom MB of the frame/field structure to derive their coding costs. The simple motion estimation step S61 includes first to eighth estimation steps S611 to S618. The first estimation step S611 performs full-pel inter prediction on the top MB 77 of the pair of frame structure blocks 77 and 78, and the second estimation step S612 performs simple intra prediction on the top MB 77 of the pair of frame structure blocks 77 and 78. The third estimation step S613 performs full-pel inter prediction on the bottom MB 78 of the pair of frame structure blocks 77 and 78, and the fourth estimation step S614 performs simple intra prediction on the bottom MB 78 of the pair of frame structure blocks 77 and 78. The fifth estimation step S615 performs full-pel inter prediction on the top MB 75 of the pair of field structure blocks 75 and 76, and the sixth estimation step S616 performs simple intra prediction on the top MB 75 of the pair of field structure blocks 75 and 76. The seventh estimation step S617 performs full-pel inter prediction on the bottom MB 76 of the pair of field structure blocks 75 and 76, and the eighth estimation step S818 performs simple intra prediction on the bottom MB 76 of the pair of field structure blocks 75 and 76. Thus, the simple motion estimation step S61 derives the coding cost of the pair of frame structure blocks 77 and 78, and the coding cost of the pair of field structure blocks 75 and 76, using inter prediction and intra prediction, so that it is possible to determine the coding picture structure such that the best compressing rate can be achieved even in the case of an image block pair 73 (71 and 72) for which the compressing rate is improved in one of inter prediction and intra prediction.

The intra/inter selecting step S62 selects smaller coding costs by comparing the coding cost of intra and inter predictions for each of four types of (frame, field)*(top, bottom).

The intra/inter selecting step S62 includes first to fourth selecting steps S621 to S624. The first selecting step S621 selects intra/inter for the frame structure top MB 77 by comparing the coding costs of the first estimation step S611 and the second estimation step S612. In this case, it selects the coding cost (1300) of the second estimation step S612. The second selecting step S622 selects intra/inter for the frame structure bottom MB 78 by comparing the coding costs of the third estimation step S613 and the fourth estimation step S614. In this case, it selects the coding cost (1200) of the fourth estimation step S614. The coding cost (1300) of the frame structure top MB 77 and the coding cost (1200) of the bottom MB 78, for which intra/inter has been selected, are summed up, obtaining the coding cost (2500) of the pair of frame structure blocks 77 and 78. The third selecting step S623 selects intra/inter for the field structure top MBs 75 and 76 by comparing the coding costs of the fifth estimation step S615 and the sixth estimation step S616. In this case, it selects the coding cost (1400) of the fifth estimation step S615. The fourth selecting step S624 selects intra/inter for the field structure bottom MB 76 by comparing the coding costs of the seventh estimation step S617 and the eighth estimation step S618. In this case, it selects the coding cost (1300) of the seventh estimation step S617. The coding cost (1400) of the field structure top MB 75 and the coding cost (1300) of the bottom MB 76, for which intra/inter has been selected, are summed up, obtaining the coding cost (2700) of the pair of field structure blocks 75 and 76.

The coding picture structure determining step S63 determines field/frame for the image block pair 73 by comparing the coding cost of the pair of frame structure blocks 77 and 78 and the coding cost of the pair of field structure blocks 75 and 76. In this case, the coding cost (2500) of the pair of frame structure blocks 77 and 78 is smaller than the coding cost (2700) of the pair of field structure blocks 75 and 76, so that the pair of frame structure blocks 77 and 78 are selected.

The complex motion estimation step S64 performs a complex motion estimation (one of sub-pel inter and complex intra) for each of the top MB 77 and bottom MB 78 of an image block pair 73 having the determined coding picture structure. The complex motion estimation step S64 includes first to fourth estimation steps S641 to S644. The first estimation step S641 performs sub-pel inter prediction on the top MB 77. The second estimation step S642 performs complex intra prediction on the top MB 77. It should be noted that only one of the first estimation step S641 and the second estimation step S642 is performed. The third estimation step S643 performs sub-pel inter prediction on the bottom MB 78. The fourth estimation step S644 performs complex intra prediction on the bottom MB 78. It should be noted that only one of the third estimation step S643 and the fourth estimation step S644 is performed.

As described above, the coding mode (specifically, the coding picture structure) is determined by the coding picture structure determining step S63, based on simple inter prediction and simple intra prediction in the simple motion estimation step S61. Accordingly, it is possible to reduce the processing amount for determining the coding mode.

Furthermore, the complex motion estimation step S64 carries out a complex motion estimation after the coding mode is determined. Since the image block pair 73 is coded with complex prediction in this way, the compression efficiency is improved. Moreover, since complex prediction is performed only on an image block pair 73 having the determined coding picture structure here, the number of times of complex prediction can be reduced to a smaller number than in the past. Consequently, it is possible to reduce the processing amount, while maintaining the coding efficiency.

Although the top MB and the bottom MB may not be coded with different coding picture structures, they may be coded with different coding prediction methods (intra/inter).

In addition, the contents described in the first and second embodiment can be applied to the third embodiment by appropriately modifying them.

Fourth Embodiment

Hereinafter, application examples of the moving image coding apparatus shown in the above-described embodiments, and a system using the same will be described.

Figure 21:
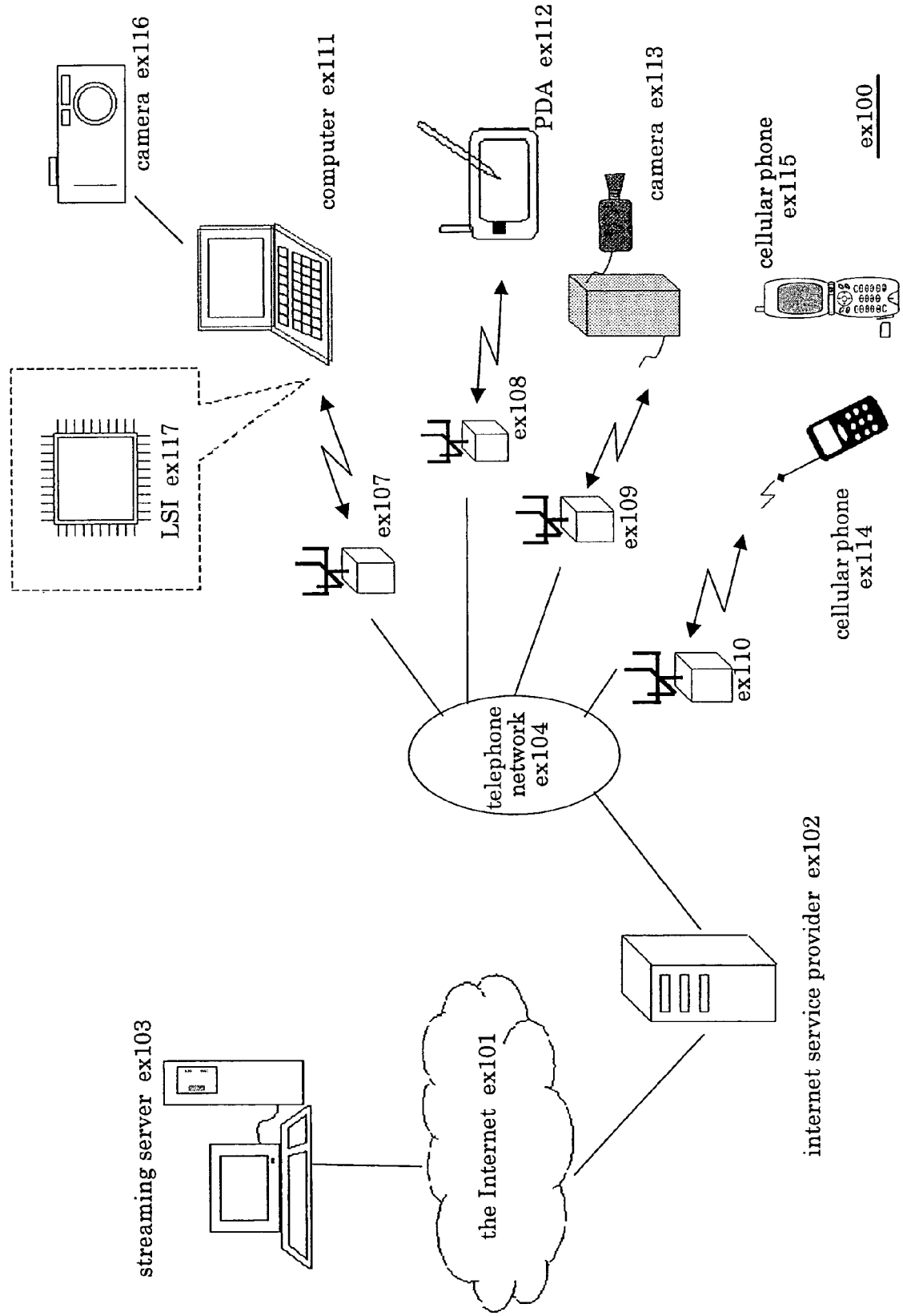
FIG. 21 is a block diagram showing the overall configuration of a content serving system.

FIG. 21 is a block diagram showing an overall structure of a content providing system ex100 that realizes a content delivering service. An area where a communication service is provided is divided into cells of a desired size, and base stations ex107-ex110 that are fixed radio stations are provided in the cells.

This content providing system ex100 includes a computer ex111, a personal digital assistant (PDA) ex112, a camera ex113, a cellular phone ex114, a cellular phone with camera ex115 and other equipment that are connected to the Internet ex101 for example via an internet service provider ex102, a telephone network ex104 and base stations ex107-ex110.

However, the content providing system ex100 can adopt any combination for connection without being limited to the combination shown in FIG. 21. In addition, each of the devices can be connected directly to the telephone network ex104 without the base stations ex107-ex110 that are fixed radio stations.

The camera ex113 is a device such as a digital video camera that can obtain a moving image. In addition, the cellular phone may be any type of PDC (Personal Digital Communications) method, CDMA (Code Division Multiple Access) method, W-CDMA (Wideband-Code Division Multiple Access) method, or GSM (Global System for Mobile Communications) method, or a cellular phone of PHS (Personal Handyphone System).

In addition, the streaming server ex103 is connected to the camera ex113 via the base station ex109 and the telephone network ex104, so that live delivery can be performed on the basis of coded data transmitted by a user of the camera ex113. The coding process of the obtained data may be performed by the camera ex113 or by a server for transmitting data. In addition, the moving image data obtained by the camera ex116 may be transmitted to the streaming server ex103 via the computer ex111. The camera ex116 is a device that can take a still image like a digital camera and a moving image. In this case, coding of the moving image data may be performed by the camera ex116 or by the computer ex111. In addition, the coding process may be performed by an LSI ex117 in the computer ex111 or the camera ex116. Note that it is possible to incorporate software for coding and decoding images into a storage medium (a CD-ROM, a flexible disk, a hard disk or the like) that is a recording medium readable by the computer ex111. Furthermore, the cellular phone with camera ex115 may transmit the moving image data. In this case, the moving image data is coded by the LSI in the cellular phone ex115.

In this content providing system ex100, content (for example, a moving image of a music concert) that the user is recording with the camera ex113 or the camera ex116 are coded as shown in the above-described embodiments and transmitted to the streaming server ex103, while the streaming server ex103 delivers a stream of the content data to a client who made a request. The client may be the computer ex111, the PDA ex112, the camera ex113, the cellular phone ex114 or the like that can decode the coded data. Thus, in the content providing system ex100, the client can receive and reproduce the coded data. The system can realize personal broadcasting when the client receives, decodes and reproduces the stream in real time.

To perform coding with the devices of this system, the moving image coding apparatus shown in the above-described embodiments may be used.

An example regarding a cellular phone will now be described.

Figure 22:
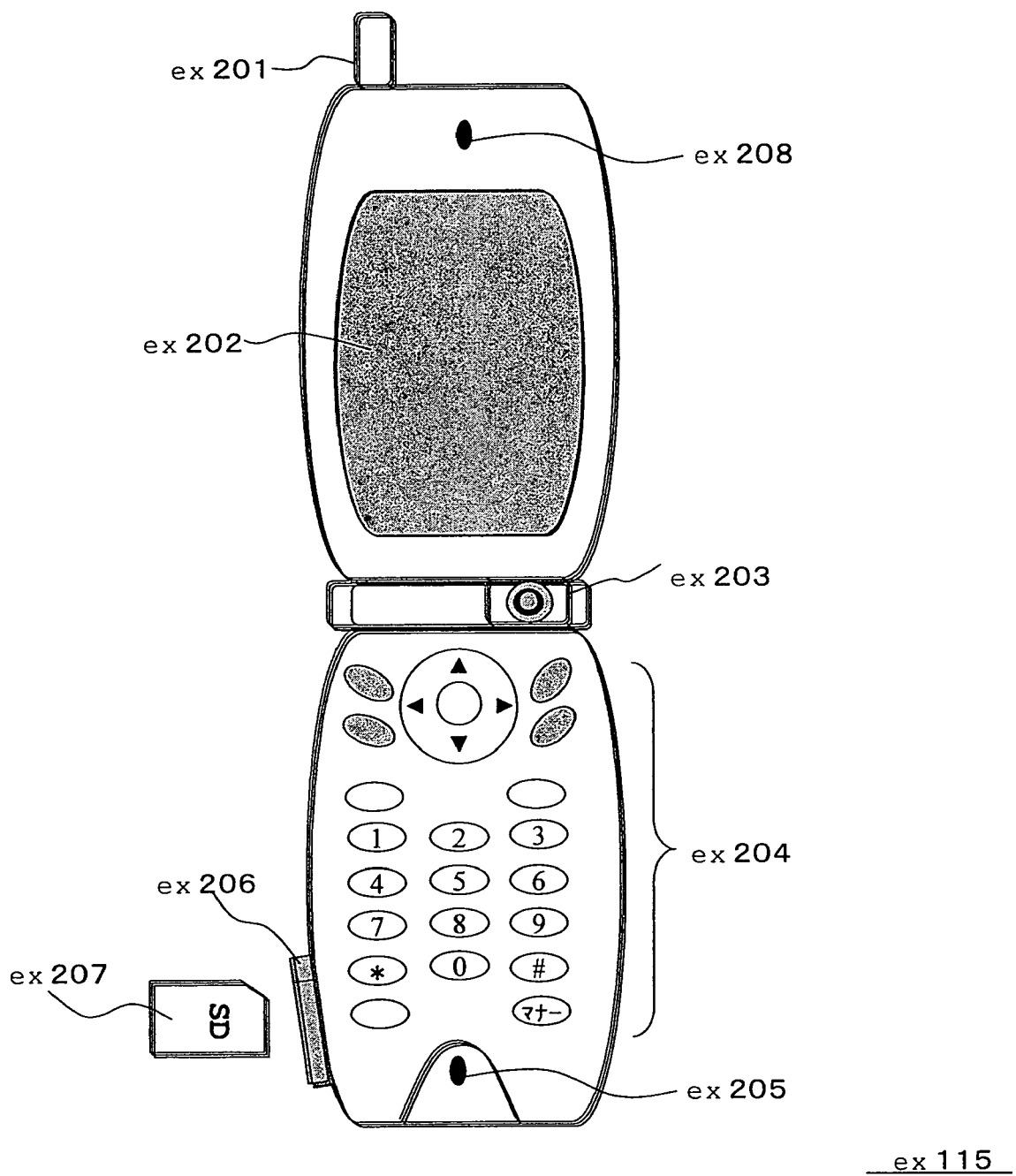
FIG. 22 shows an example of a mobile phone using a moving image encoding method and a moving image decoding method.

FIG. 22 shows the cellular phone ex115 that utilizes the moving image coding apparatus of the present invention. The cellular phone ex115 includes an antenna ex201 for transmitting and receiving radio waves with the base station ex110, a camera portion ex203 such as a CCD camera that can take a still image, a display portion ex202 such as a liquid crystal display for displaying images obtained by the camera portion ex203 or images received by the antenna ex201 after the image data are decoded, a main body portion including a group of operating keys ex204, a sound output portion ex208 such as a speaker for producing sounds, a sound input portion ex205 such as a microphone for receiving sounds, a recording medium ex207 for storing coded data or decoded data such as data of taken moving images or still images, data of received e-mails, moving images or still images, and a slot portion ex206 that enables the recording medium ex207 to be attached to the cellular phone ex115. The recording medium ex207 such as an SD card includes a plastic case housing a flash memory element that is one type of EEPROM (Electrically Erasable and Programmable Read Only Memory) nonvolatile memory that is electronically rewritable and erasable.

Furthermore, the cellular phone ex115 will be described with reference to FIG. 23. The cellular phone ex115 includes a main controller portion ex311 for controlling each portion of the main body portion having the display portion ex202 and the operating keys ex204, a power source circuit portion ex310, an operational input controller portion ex304, an image coding portion ex312, a camera interface portion ex303, an LCD (Liquid Crystal Display) controller portion ex302, an image decoding portion ex309, a multiplex separation portion ex308, a recording and reproduction portion ex307, a modem circuit portion ex306 and a sound processing portion ex305, which are connected to each other via a synchronizing bus ex313.

When the user turns on a clear and power key, the power source circuit portion ex310 supplies power from a battery pack to each portion so that the digital cellular phone with camera ex115 is activated.

The cellular phone ex115 converts a sound signal collected by the sound input portion ex205 during a sound communication mode into digital sound data by the sound processing portion ex305 under control of the main controller portion ex311 that includes a CPU, a ROM and a RAM. The digital sound data are processed by the modem circuit portion ex306 as a spectrum spreading process and are processed by the transmission and reception circuit portion ex301 as a digital to analog conversion process and a frequency conversion process. After that, the data are transmitted via the antenna ex201. In addition, the cellular phone ex115 amplifies a signal that is received by the antenna ex201 during the sound communication mode and performs the frequency conversion process and an analog to digital conversion process on the data, which is processed by the modem circuit portion ex306 as a spectrum inverse spreading process and is converted into a analog sound signal by the sound processing portion ex305. After that, the analog sound signal is delivered by the sound output portion ex208.

Furthermore, when transmitting electronic mail during a data communication mode, text data of the electronic mail are entered by using the operating keys ex204 of the main body portion and are given to the main controller portion ex311 via the operational input controller portion ex304. The main controller portion ex311 performs the spectrum spreading process on the text data by the modem circuit portion ex306 and performs the digital to analog conversion process and the frequency conversion process by the transmission and reception circuit portion ex301. After that, the data are transmitted to the base station ex110 via the antenna ex201.

When transmitting image data during the data communication mode, the image data obtained by the camera portion ex203 are supplied to the image coding portion ex312 via the camera interface portion ex303. In addition, if the image data are not transmitted, it is possible to display the image data obtained by the camera portion ex203 directly by the display portion ex202 via the camera interface portion ex303 and an LCD controller portion ex302.

The image coding portion ex312, which comprises the moving image coding apparatus of the present invention, converts the image data supplied from the camera portion ex203 into the coded image data by compressing and coding the data by the coding method which is used by the image coding apparatus shown in the above-described embodiments, and the coded image data are supplied to the multiplex separation portion ex308. In addition, the cellular phone ex115 collects sounds by the sound input portion ex205 while the camera portion ex203 is taking the image, and the digital sound data is supplied from the sound processing portion ex305 to the multiplex separation portion ex308.

The multiplex separation portion ex308 performs multiplexing of the coded image data supplied from the image coding portion ex312 and the sound data supplied from the sound processing portion ex305 by a predetermined method. Multiplexed data obtained as a result are processed by the modem circuit portion ex306 as a spectrum spreading process and are processed by the transmission and reception circuit portion ex301 as a digital to analog conversion process and a frequency conversion process. After that, the data are transmitted via the antenna ex201.

When receiving moving image file data that are linked to a web page during the data communication mode, a signal received from the base station ex110 via the antenna ex201 is processed by the modem circuit portion ex306 as a spectrum inverse spreading process. Multiplexed data obtained as a result are supplied to the multiplex separation portion ex308.

In addition, in order to decode multiplexed data received via the antenna ex201, the multiplex separation portion ex308 separates a coded bit stream of image data in the multiplexed data from a coded bit stream of sound data. Then, the multiplex separation portion ex308 supplies the coded image data to the image decoding portion ex309 via the synchronizing bus ex313 and supplies the sound data to the sound processing portion ex305.

Next, the image decoding portion ex309 generates reproduction moving image data by decoding the coded bit stream of the image data by the decoding method corresponding to the coding method shown in the above-described embodiments and supplies the data to the display portion ex202 via the LCD controller portion ex302. Thus, the moving image data included in a moving image file that is linked to a home page can be displayed. In this case, the sound processing portion ex305 converts the sound data into an analog sound signal, which is supplied to the sound output portion ex208. Thus, sound data included in the moving image file that is linked to a home page can be reproduced.

Figure 24:
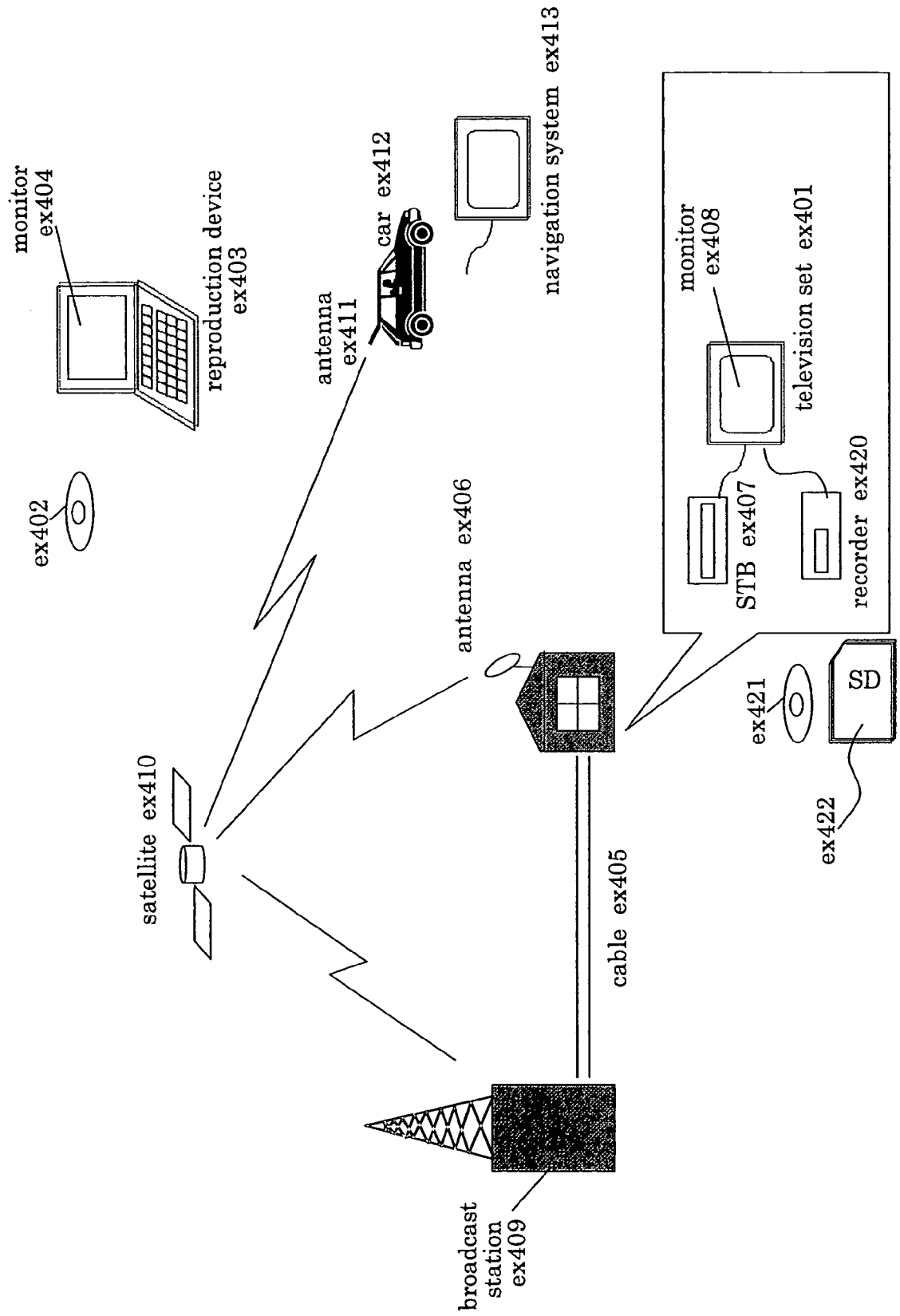
FIG. 24 shows an example of a digital broadcasting system.

Note that the present invention is not limited to the example of the system described above. Digital broadcasting by satellite or terrestrial signals has been a recent topic of discussion. As shown in FIG. 24, the image coding apparatus of the present invention can be incorporated into the digital broadcasting system, too.

More specifically, in a broadcast station ex409, a coded bit stream of image information is sent to a communication or a broadcasting satellite ex410 via a radio wave. The broadcasting satellite ex410 that received the coded bit stream of image information sends radio waves for broadcasting. These radio waves are received by an antenna ex406 of a house equipped with a satellite broadcasting reception facility, and a device such as a television set (a receiver) ex401 or a set top box (STB) ex407 decodes the coded bit stream and reproduces the same. In addition, a reproduction device ex403 for reading and decoding a coded bit stream that is recorded on a storage medium ex402 such as a CD or a DVD that is a recording medium may be equipped with the image decoding device. In this case, the reproduced image signal and text track are displayed on a monitor ex404. In addition, it is possible to mount the image decoding apparatus of the present invention in a set top box ex407 that is connected to a cable ex405 for a cable television or the antenna ex406 for a satellite or surface wave broadcasting, so that the image can be reproduced on a monitor ex408 of the television set. In this case, it is possible to incorporate the image decoding apparatus of the present invention not into the set top box but into the television set. In addition, it is possible that a car ex412 equipped with an antenna ex411 receives a signal from the broadcasting satellite ex410 or the base station ex107 and reproduces the moving image on a display of a navigation system ex413 in the car ex412.

Furthermore, it is possible to encode the image signal with the image coding apparatus and record the encoded image signal in a recording medium. As a specific example, there is a recorder ex420 such as a DVD recorder for recording image signals on a DVD disk ex421 or a disk recorder for recording image signals on a hard disk. Furthermore, it is possible to record on an SD card ex422. In addition, in case that the recorder ex420 includes the image decoding apparatus of the present invention, it is possible to reproduce image signals recorded on a DVD disk ex421 or a SD card ex422 via the image signal processing device, so as to display on the monitor ex408.

Figure 23:
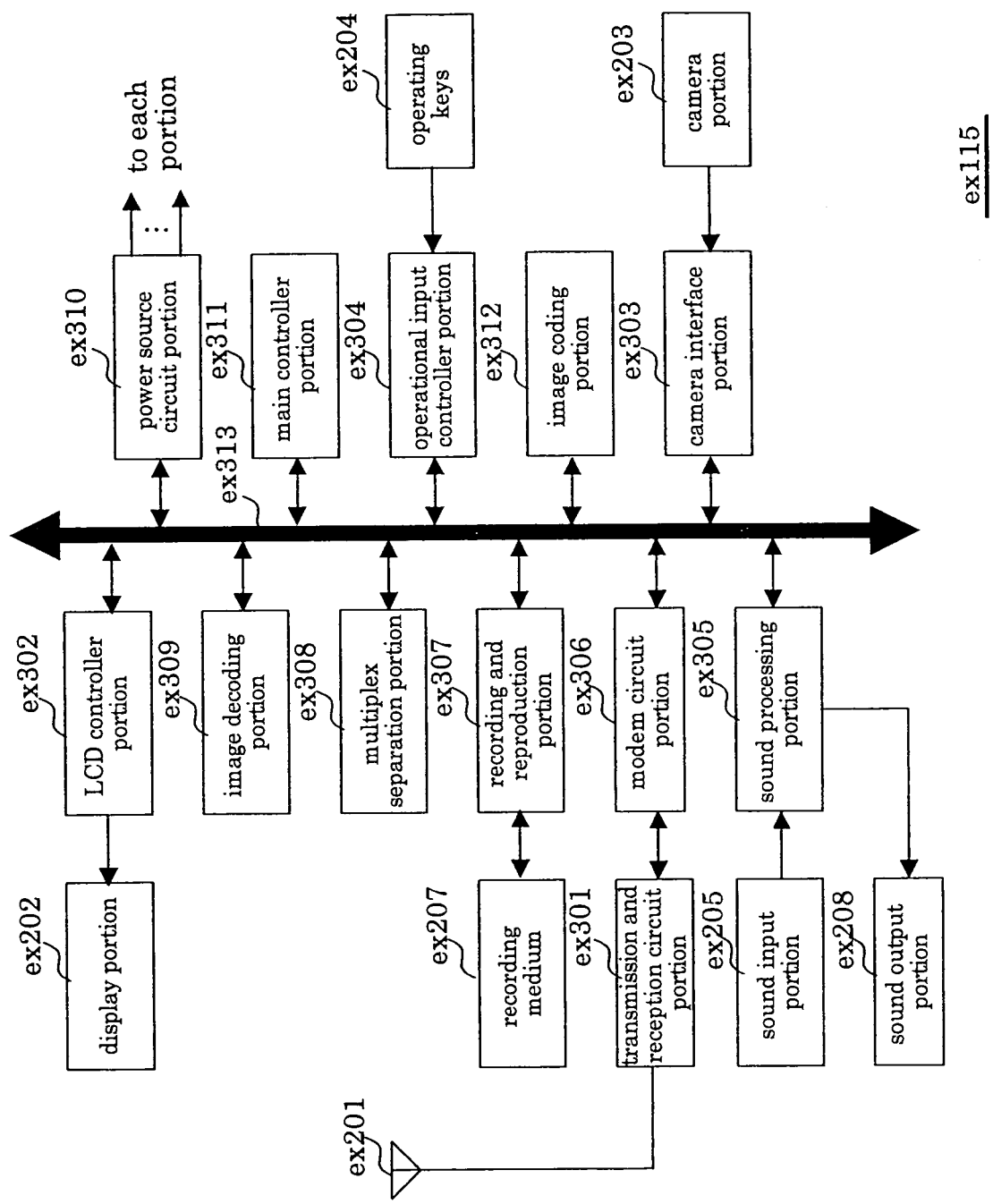
FIG. 23 is a block diagram of the mobile phone.

Note that in the structure of the navigation system ex413 shown in FIG. 23, the camera portion ex203, the camera interface portion ex303 and the image coding portion ex312 can be omitted. This can be also applied to the computer ex111 and the television set (the receiver) ex401.

In addition, the terminal device such as the cellular phone ex114 may include three types of assemblies. A first type is a transmission and reception terminal having both the coder and the decoder, a second type is a transmission terminal having only a coder and a third type is a reception terminal having only a decoder.

Thus, the moving image coding apparatus shown in the above-described embodiments can be used for any device and system described above, so that effects described above can be obtained.

Modified Example Common to all Embodiments

1

Figure 25:
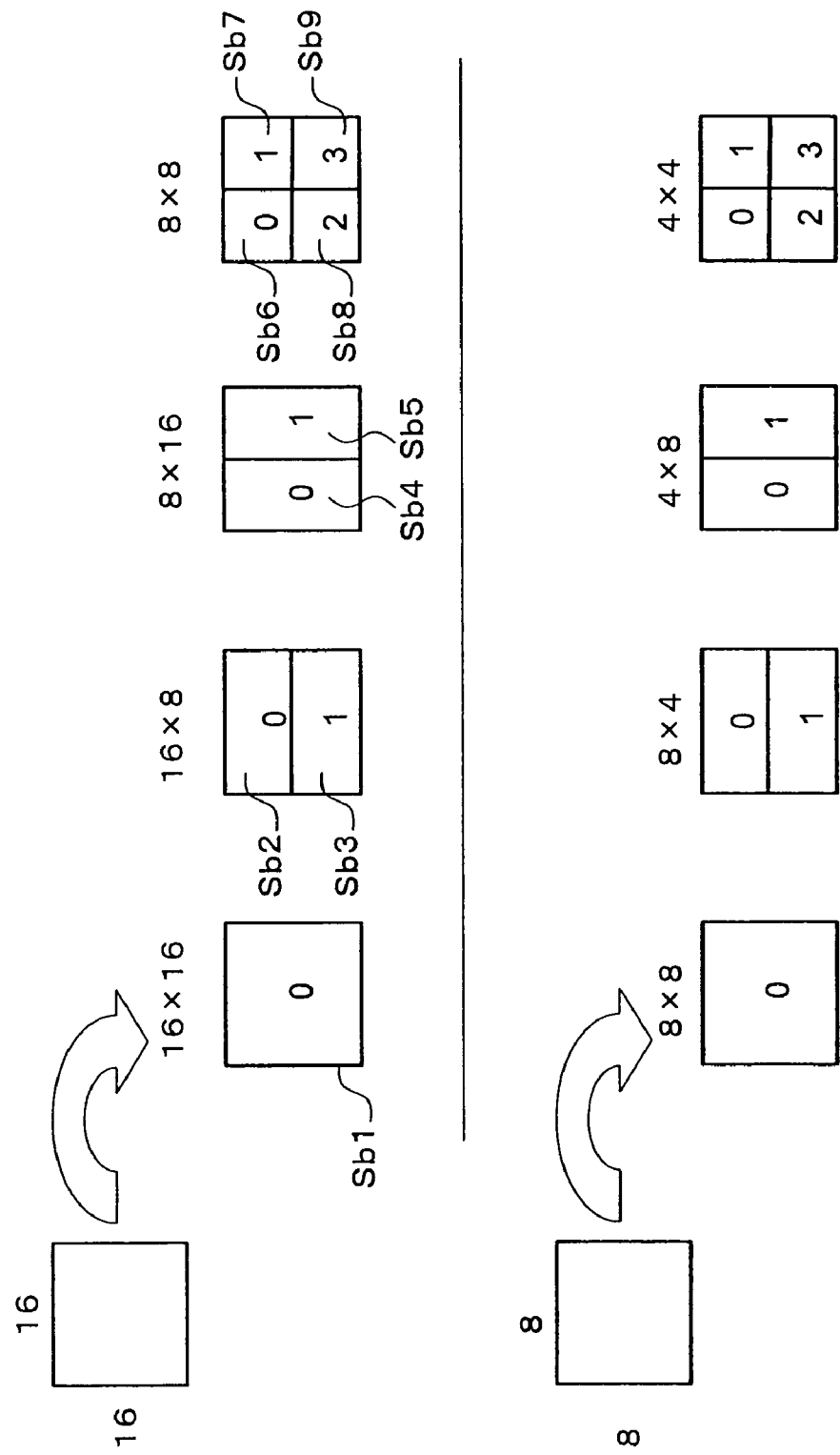
FIG. 25 is a diagram showing conventional candidate division methods of a macroblock.
Figure 26:
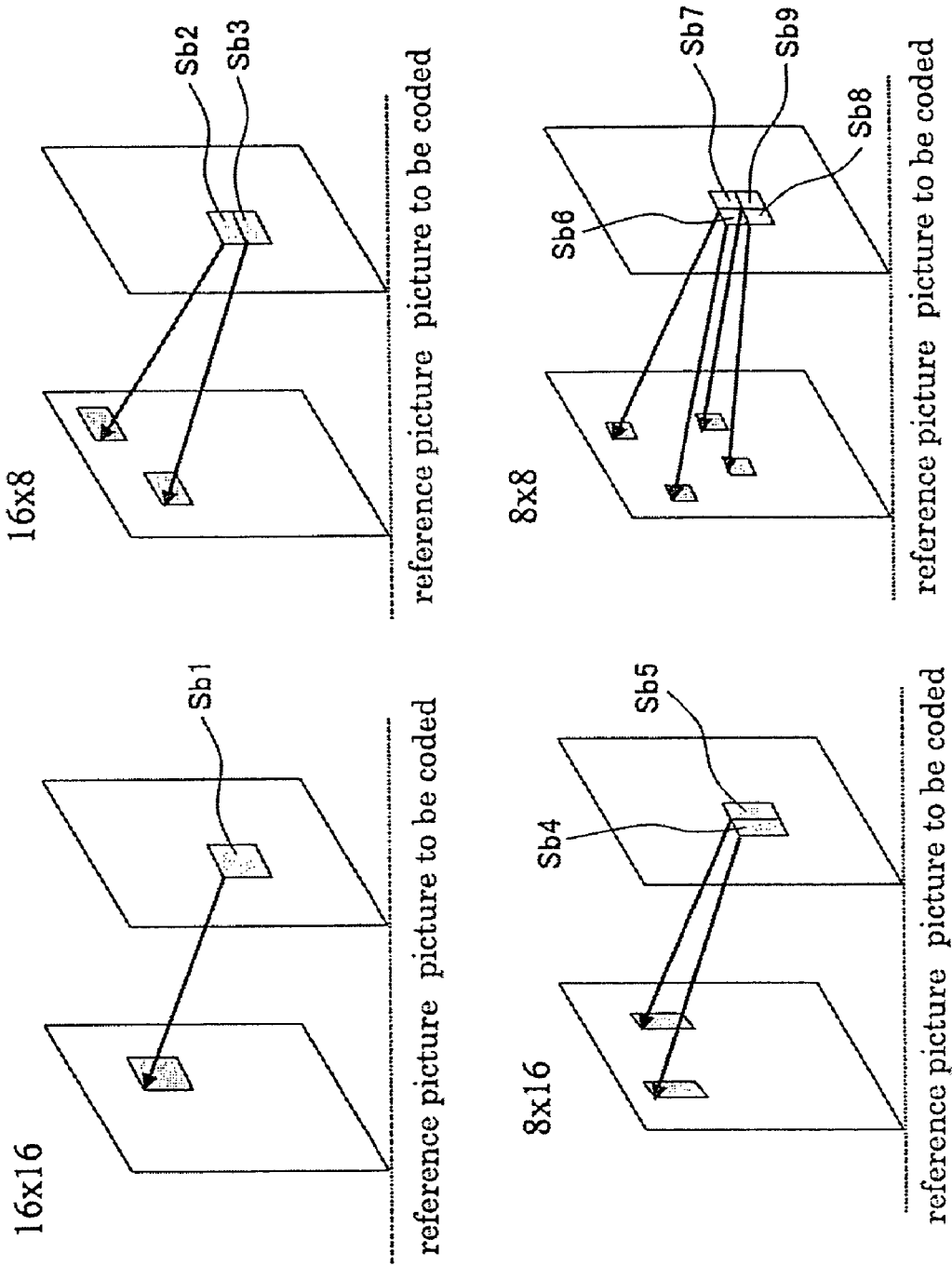
FIG. 26 is a diagram showing the relationship between a picture to be coded and a reference picture according to the conventional candidate division methods of a macroblock.
Figure 27:
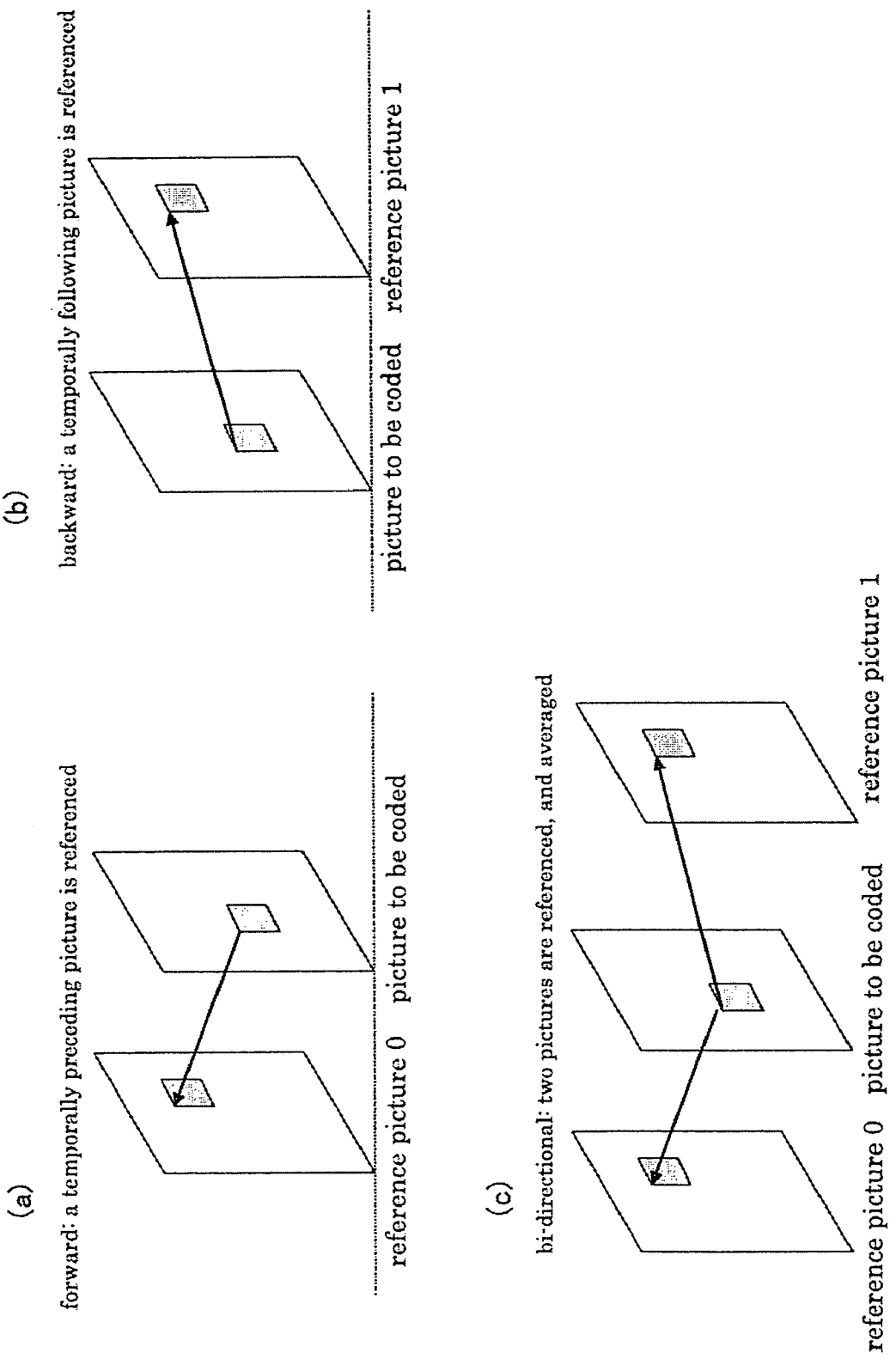
FIG. 27 is a diagram showing conventional prediction directions of a macroblock.

In the above-described embodiments, macroblock partitions obtained by dividing a macroblock of 16×16 with various candidate division methods were described as small blocks serving as the units for motion estimation. In this case, as shown in FIG. 25, small blocks obtained with the 8×8 division method can be further divided into sub-macroblock partitions of 8×8, 8×4, 4×8 and 4×4, and the present invention can be applied using these sub-macroblock partitions as the small blocks of the present invention.

2

Note that each functional block in block diagrams (for example, FIG. 1, FIG. 16, FIG. 19, FIG. 23) are typically realized as an LSI that is an integrated circuit. These may be one chip individually, and also may be one tip as a part of them or as a whole.

For example, the motion estimation portion 10 in FIG. 1 may be one chip. In this situation, each functional block in FIG. 1, exept for the memory 26, may be one chip. The inter prediction portion 3, the coding mode determining portion 63 and the intra prediction portion 61 in FIG. 16 may be one chip. In this situation, each functional block in FIG. 16, exept for the memory 26, may be one chip. The inter prediction portion 92 and the coding mode determining portion 93 may be one chip. In this situation, each functional block in FIG. 19, exept for the memory, may be one chip.

The LSI may be referred to as an IC, a system LSI, a super LSI or an ultra LSI in accordance with the degree of integration.

In addition, a method for integrating circuits is not limited to an LSI but it may be realized by an application specific integrated circuit or a versatile processing unit. It is possible to use an FPGA (Field Programmable Gate Array) that is programmable after the LSI is produced or a silicon figurable processor that can restructure connection or setting of circuit cells in the LSI.

Furthermore, if another technique for integrating circuits rather than he LSI appears with the progress of semiconductor technology, then that technique may be utilized for integrating the functional blocks. Biotechnology has the potential for such technology.

INDUSTRIAL APPLICABILITY

With the coding mode determining apparatus, the image coding apparatus, the coding mode determining method and the coding mode determining program according to the present invention, it is possible to select an appropriate coding mode with a smaller processing amount, which is useful in the above-described fields.

The invention claimed is:

1. A coding mode determining apparatus for determining at least one of a plurality of candidate coding modes of an image block, the plurality of coding modes determining at least one of (i) a division method in which the image block is divided into small blocks and (ii) a picture reference direction in motion estimation for the small blocks, the coding mode determining apparatus comprising:

a simple motion estimation portion that derives a first coding cost for each of the plurality of coding modes, based on a simple motion estimation for the small blocks, the small motion blocks being partitions of the image block obtained using each of the plurality of coding modes;

a coding mode selecting portion that selects a subset of the plurality of coding modes, based on the first coding cost derived for each of the plurality of coding modes by the simple motion estimation portion;

a complex motion estimation portion that derives a second coding cost for each of the plurality of coding modes, based on a complex motion estimation for the small blocks obtained using at least a subset of the selected subset of the plurality of coding modes, such that based on a result of the simple motion estimation by the simple motion estimation portion, (i) when the first coding cost of a forward prediction is substantially equal to the first coding cost of a backward prediction, the complex motion estimation portion sets picture reference directions to a forward direction, a backward direction, and a bi-direction, performs the complex motion estimation for the small blocks for the forward direction, the backward direction and the bi-direction, and calculates the second coding cost for the forward direction, the second coding cost for the backward direction, and the second coding cost for the bi-direction, respectively, and (ii) when the first coding cost of the forward prediction differs from the first coding cost of the backward prediction, the complex motion estimation portion selects one of the forward prediction and the backward prediction having a smaller first coding cost, and calculates the second coding cost for the small blocks for one of the forward direction and the backward direction corresponding to the selected one of the forward prediction and the backward prediction; and a coding mode determining portion that determines, from the plurality of coding modes, a coding mode of the image block, the coding mode being determined based on the second coding cost derived for each of the plurality of coding modes by the complex motion estimation portion.

2. The coding mode determining apparatus according to claim 1, wherein, when deriving the first coding cost of each of the plurality of coding modes, the simple motion estimation portion (i) performs the simple motion estimation in a plurality of picture reference directions on each of the small blocks obtained using each of the plurality of coding modes to calculate the first coding cost of each of the plurality of coding modes, then (ii) selects a picture reference direction, of the plurality of picture reference directions, having a lowest coding cost for each individual small block, and then (iii) sums up the first coding costs derived for all of the small blocks relating to the selected picture reference direction for each of candidate division methods individually to derive the first coding cost of the coding mode of each of the candidate division methods.

3. The coding mode determining apparatus according to claim 1, wherein, when deriving the first coding cost of each of the plurality of coding modes, the simple motion estimation portion (i) performs the simple motion estimation in a plurality of picture reference directions on each of the small blocks obtained using each of the plurality of coding modes to calculate the first coding cost of each of the plurality of coding modes, and then (ii) converts the first coding cost of each of the small blocks for each picture reference direction individually into a coding cost per image block to derive the first coding cost of the coding mode of each of candidate division methods for each of the plurality of picture reference directions.

4. The coding mode determining apparatus according to claim 2, wherein the simple motion estimation in the plurality of picture reference directions in the simple motion estimation portion includes only the forward prediction, in which a temporally preceding picture is referenced, and the backward prediction in which a temporally following picture is referenced.

5. The coding mode determining apparatus according to claim 3, wherein the simple motion estimation in the plurality of picture reference directions in the simple motion estimation portion includes only the forward prediction, in which a temporally preceding picture is referenced, and the backward prediction in which a temporally following picture is referenced.

6. The coding mode determining apparatus according to claim 2, wherein the simple motion estimation in the plurality of picture reference directions in the simple motion estimation portion includes the forward prediction, in which a temporally preceding picture is referenced, the backward prediction, in which a temporally following picture is referenced, and a bi-directional prediction, in which pictures that are on both sides in time are referenced.

7. The coding mode determining apparatus according to claim 3, wherein the simple motion estimation in the plurality of picture reference directions in the simple motion estimation portion includes the forward prediction, in which a temporally preceding picture is referenced, the backward prediction, in which a temporally following picture is referenced, and a bi-directional prediction, in which pictures that are on both sides in time are referenced.

8. The coding mode determining apparatus according to claim 2,
wherein the simple motion estimation in the plurality of picture reference directions in the simple motion estimation portion includes the forward prediction, in which a temporally preceding picture is referenced, and the backward prediction, in which a temporally following picture is referenced, and
wherein the simple motion estimation portion derives a coding cost where a bi-directional prediction, in which pictures that are on both sides in time are referenced, is performed, based on the forward prediction and the backward prediction.

9. The coding mode determining apparatus according to claim 3,
wherein the simple motion estimation in the plurality of picture reference directions in the simple motion estimation portion includes the forward prediction, in which a temporally preceding picture is referenced, and the backward prediction, in which a temporally following picture is referenced, and
wherein the simple motion estimation portion derives a coding cost where a bi-directional prediction, in which pictures that are on both sides in time are referenced, is performed, based on the forward prediction and the backward prediction.

10. The coding mode determining apparatus according to claim 1, wherein the complex motion estimation portion selects at least a further subset of the selected subset of the plurality of coding modes, based on the simple motion estimation for the small blocks.

11. The coding mode determining apparatus according to claim 10, wherein the complex motion estimation portion (i) selects each of the plurality of coding modes in an ascending order of the first coding cost, (ii) derives the second coding cost by repeatedly selecting coding modes of the plurality of coding modes in the ascending order of the first coding cost, while a sum of a processing amount of the selected coding mode does not exceed a margin for the processing amount, and (iii) stops selecting coding modes when the sum of the processing amount of the selected coding modes exceeds the margin for the processing amount, and does not derive the second coding cost after a time when the sum of the processing amount of the selected coding modes exceeds the margin for the processing amount.

12. The coding mode determining apparatus according to claim 1, wherein the simple motion estimation portion changes, depending on an image attribute, a method of motion estimation in the simple motion estimation in such a manner that a processing amount for the simple motion estimation remains substantially constant.

13. The coding mode determining apparatus according to claim 1,
wherein the simple motion estimation is motion estimation having integer pixel accuracy, and
wherein the complex motion estimation is motion estimation having non-integer pixel accuracy.

14. An integrated circuit comprising the coding mode determining apparatus according to claim 1.

15. An image coding apparatus comprising:
the coding mode determining apparatus according to claim 1; and
a coding apparatus that codes the image block, based on the coding mode of the image block determined by the coding mode determining apparatus.

16. An integrated circuit comprising the image coding apparatus according to claim 15.

17. A coding mode determining method for determining at least one of a plurality of candidate coding modes of an image block, the plurality of coding modes determining at least one of (i) a division method in which the image block is divided into small blocks and (ii) a picture reference direction in motion estimation for the small blocks, the coding mode determining method comprising:
a simple motion estimation step of deriving a first coding cost for each of the plurality of coding modes, based on a simple motion estimation for the small blocks, the small motion blocks being partitions of the image block obtained using each of the plurality of coding modes;
a coding mode selecting step of selecting a subset of the plurality of coding modes, based on the first coding cost derived for each of the plurality of coding modes by the simple motion estimation step;
a complex motion estimation step of deriving a second coding cost for each of the plurality of coding modes, based on a complex motion estimation for the small blocks obtained using at least a subset of the selected subset of the plurality of coding modes, such that based on a result of the simple motion estimation performed by the simple motion estimation step, (i) when the first coding cost of a forward prediction is substantially equal to the first coding cost of a backward prediction, the complex motion estimation step sets picture reference directions to a forward direction, a backward direction, and a bi-direction, performs the complex motion estimation for the small blocks for the forward direction, the backward direction and the bi-direction, and calculates the second coding cost for the forward direction, the second coding cost for the backward direction, and the second coding cost for the bi-direction, respectively, and (ii) when the first coding cost of the forward prediction differs from the first coding cost of the backward prediction, the complex motion estimation step selects one of the forward prediction and the backward prediction having a smaller first coding cost, and calculates the second coding cost for the small blocks for one of the forward direction and the backward direction corresponding to the selected one of the forward prediction and the backward prediction; and a coding mode determining step of determining, from the plurality of coding modes, a coding mode of the image block, the coding mode being determined based on the second coding cost derived for each of the plurality of coding modes by the complex motion estimation step.

18. A non-transitory computer-readable recording medium having a coding mode determining program recorded thereon, the coding mode determining program for determining, with a computer, at least one of a plurality of candidate coding modes of an image block, the plurality of coding modes determining at least one of (i) a division method in which the image block is divided into small bocks and (ii) a picture reference direction in motion estimation for the small blocks, the coding mode determining program causing the computer to execute a method comprising:

a simple motion estimation step of deriving a first coding cost for each of the plurality of coding modes, based on a simple motion estimation for the small blocks, the small motion blocks being partitions of the image block obtained using each of the plurality of coding modes;

a coding mode selecting step of selecting a subset of the plurality of coding modes, based on the first coding cost derived for each of the plurality of coding modes by the simple motion estimation step;

a complex motion estimation step of deriving a second coding cost for each of the plurality of coding modes, based on a complex motion estimation for the small blocks obtained using at least a subset of the selected subset of the plurality of coding modes, such that based on a result of the simple motion estimation performed by the simple motion estimation step, (i) when the first coding cost of a forward prediction is substantially equal to the first coding cost of a backward prediction, the complex motion estimation step sets picture reference directions to a forward direction, a backward direction, and a bi-direction, performs the complex motion estimation for the small blocks for the forward direction, the backward direction and the bi-direction, and calculates the second coding cost for the forward direction, the second coding cost for the backward direction, and the second coding cost for the bi-direction, respectively, and (ii) when the first coding cost of the forward prediction differs from the first coding cost of the backward prediction, the complex motion estimation step selects one of the forward prediction and the backward prediction having a smaller first coding cost, and calculates the second coding cost for the small blocks for one of the forward direction and the backward direction corresponding to the selected one of the forward prediction and the backward prediction; and a coding mode determining step of determining, from the plurality of coding modes, a coding mode of the image block, the coding mode being determined based on the second coding cost derived for each of the plurality of coding modes by the complex motion estimation step.

19. The coding mode determining apparatus according to claim 1, wherein the complex motion estimation portion performs the complex motion estimation by selecting each of the plurality of coding modes (i) in an ascending order of the first coding cost and (ii) within a range in which a sum of a processing amount of the plurality of coding modes does not exceed an allowable value of the image block.

20. The coding mode determining apparatus according to claim 19, wherein the processing amount is determined, such that the processing amount is proportional to a pixel number of a small block of the image block.

21. The coding mode determining apparatus according to claim 19, wherein the processing amount is determined, such that the processing amount is proportional to a number of picture reference directions.

22. The coding mode determining apparatus according to claim 21, wherein the processing amount is determined, such that the processing amount is proportional to the number of picture reference directions derived by:

not counting picture reference directions when the simple motion estimation in the plurality of picture reference directions is performed through a bi-directional prediction direction, in which pictures that are on both sides in time are referenced; and counting picture reference directions when the simple motion estimation in the plurality of picture reference directions is performed through a prediction, other than the bi-directional prediction in which pictures that are on both sides in time are referenced.

23. The coding mode determining apparatus according to claim 1, wherein the complex motion estimation portion changes, depending on an image attribute, a method of motion estimation in the complex motion estimation in such a manner that a processing amount for the complex motion estimation remains substantially constant.

24. The coding mode determining apparatus according to claim 1, wherein the simple motion estimation portion and the complex motion estimation portion respectively change, depending on an image attribute, a method of motion estimation in such a manner that a sum of a processing amount for the simple motion estimation by the simple motion estimation portion and a processing amount for the complex motion estimation by the complex motion estimation portion remains substantially constant.

25. The coding mode determining apparatus according to claim 12, wherein the image attribute is at least one of (i) a size of the image block, (ii) a coding method for a picture type, including I-picture, P-picture, and B-picture, of the image block, (iii) a format for a scanning method, including progressive and interlaced, and a chroma format of the image block, and (iv) a motion amount of the image block.

26. The coding mode determining apparatus according to claim 23, wherein the image attribute is at least one of (i) a size of the image block, (ii) a coding method for a picture type, including I-picture, P-picture, and B-picture, of the image block, (iii) a format for a scanning method, including progressive and interlaced, and a chroma format of the image block, and (iv) a motion amount of the image block.

27. The coding mode determining apparatus according to claim 24, wherein the image attribute is at least one of (i) a size of the image block, (ii) a coding method for a picture type, including I-picture, P-picture, and B-picture, of the image block, (iii) a format for a scanning method, including progressive and interlaced, and a chroma format of the image block, and (iv) a motion amount of the image block.

28. The coding mode determining apparatus according to claim 25, wherein at least one of the simple motion estimation portion and the complex motion estimation portion changes a method of motion estimation in the simple motion estimation and the complex motion estimation, such that a product of a size of an input image constituted by the image block, a number of reference pictures and a number of partition sizes remain substantially constant.

29. The coding mode determining apparatus according to claim 25, wherein at least one of the simple motion estimation portion and the complex motion estimation portion renders a number of reference pictures for B-pictures smaller than those for P-pictures, such that the processing amount for the simple motion estimation and the complex motion estimation for each picture remains substantially constant.

30. The coding mode determining apparatus according to claim 25, wherein at least one of the simple motion estimation portion and the complex motion estimation portion keeps the processing amount for the simple motion estimation and the complex motion estimation constant for each picture through one of the following:

at least one of the simple motion estimation portion and the complex motion estimation portion references a preceding four pictures for P-pictures, and references a preceding two pictures and a subsequent two pictures for B-pictures;

at least one of the simple motion estimation portion and the complex motion estimation portion references a preceding three pictures for P-pictures, and references a preceding two pictures and a subsequent one picture for B-pictures; and at least one of the simple motion estimation portion and the complex motion estimation portion references a preceding two pictures for P-pictures, and references a preceding one picture and a subsequent one picture for B-pictures.

31. The coding mode determining apparatus according to claim 25, wherein at least one of the simple motion estimation portion and the complex motion estimation portion renders a number of partition sizes of B-pictures smaller than that of P-pictures, such that the processing amount for the simple motion estimation and the complex motion estimation for each picture remains substantially constant.

32. The coding mode determining apparatus according to claim 25, wherein at least one of the simple motion estimation portion and the complex motion estimation portion keeps the processing amount for the simple motion estimation and the complex motion estimation constant for each picture through one of the following:

at least one of the simple motion estimation portion and the complex motion estimation portion (A) references a preceding one picture for P-pictures, and performs a prediction for four partition sizes of 16×16, 16×8, 8×16 and 8×8, and (B) selects two of the above-described four partition sizes for B-pictures, and performs the forward prediction and the backward prediction for both of the selected two; and at least one of the simple motion estimation portion and the complex motion estimation portion (C) references a subsequent one picture for P-pictures, and performs a prediction for four partition sizes of 16×16, 16×8, 8×16 and 8×8, and (D) selects two of the above-described four partition sizes for B-pictures, and performs the forward prediction and the backward prediction for both of the selected two.

33. The coding mode determining apparatus according to claim 25, wherein at least one of the simple motion estimation portion and the complex motion estimation portion renders a number of reference pictures or a number of partition sizes when an input image is an interlaced image smaller than the number of reference pictures or the number of partition sizes when the input image is a progressive image.

34. The coding mode determining apparatus according to claim 25, wherein at least one of the simple motion estimation portion and the complex motion estimation portion:

in a case of P-pictures, references a preceding two frames for progressive P-pictures, and references a preceding two fields for interlaced P-pictures; and in the case of P-pictures, (A) references a preceding one frame for progressive P-pictures, and performs a prediction for each of four types of partition sizes of 16×16, 16×8, 8×16 and 8×8, and (B) references a preceding two fields for interlaced P-pictures, and performs a prediction for two types of the partition sizes for each of selected two partition sizes.

35. The coding mode determining apparatus according to claim 25, wherein at least one of the simple motion estimation portion and the complex motion estimation portion changes a number of reference pictures or a number of partition sizes, in accordance with a motion of the image block.

36. The coding mode determining apparatus according to claim 11, wherein the processing amount is determined, such that the processing amount is proportional to a pixel number of a small block of the image block.

37. The coding mode determining apparatus according to claim 11, wherein the processing amount is determined, such that the processing amount is proportional to a number of picture reference directions.

* * * * *